United States Patent
Khattab et al.

(10) Patent No.: US 7,025,003 B2
(45) Date of Patent: Apr. 11, 2006

(54) DROPPED DECK CENTER BEAM RAIL ROAD CAR WITH SHALLOW CENTER SILL

(75) Inventors: Mohamed A. Khattab, Burlington (CA); David J. Keats, Brantford (CA)

(73) Assignee: National Steel Car Limited, (CA)

( * ) Notice: Subject to any disclaimer, the term of this patent is extended or adjusted under 35 U.S.C. 154(b) by 0 days.

(21) Appl. No.: 10/435,683

(22) Filed: May 9, 2003

(65) Prior Publication Data

US 2004/0221764 A1    Nov. 11, 2004

(51) Int. Cl.
*B61D 3/00* (2006.01)
(52) U.S. Cl. .................................... 105/238.1
(58) Field of Classification Search ............ 105/238.1, 105/355, 356, 396, 404, 407, 416
See application file for complete search history.

(56) References Cited

U.S. PATENT DOCUMENTS

| | | | | |
|---|---|---|---|---|
| 4,543,887 A | * | 10/1985 | Baker ......................... | 105/355 |
| 4,784,067 A | * | 11/1988 | Harris et al. ................ | 105/355 |
| 4,951,575 A | * | 8/1990 | Dominguez et al. ..... | 105/406.1 |
| 6,431,085 B1 | * | 8/2002 | Saxton et al. .............. | 105/355 |

FOREIGN PATENT DOCUMENTS

| | | |
|---|---|---|
| CA | 1265388 | 2/1990 |
| CA | 2313834 | 1/2002 |
| EP | 0 306 584 | 3/1989 |
| NL | 37659 | 1/1933 |

OTHER PUBLICATIONS

Car Builders' Cyclopedia of American Practice, 14th ed., Simmons-Boardman Publishing Corporations, New York, NY, 1937, pp. 209-214.
Car Builders' Cyclopedia of American Practice, 18th ed., Simmons-Boardman Publishing Corporation, New York, NY, 1949-51, pp. 155.

(Continued)

*Primary Examiner*—S. Joseph Morano
*Assistant Examiner*—Robert J. McCarry, Jr.
(74) *Attorney, Agent, or Firm*—Hahn Loeser & Parks LLP; Michael H. Minns

(57) ABSTRACT

A center beam rail road car has a center sill that runs along the car from end to end. The center sill is dog-legged, having end portions mounted over rail car trucks, and a downwardly stepped central portion between the trucks. A central beam assembly stands upwardly of the center sill. A lading supporting deck structure extends laterally to either side of the center sill. The deck structure has a depressed medial portion between the trucks, and raised end portions over the trucks. The deck portions have lading bearing interfaces. The medial portion of the center sill has a top flange that is carried at a height that lies flush with, or below, the level of the lading bearing interface of the medial portion of the center sill. In one embodiment, a column member for carrying buff and draft loads is spaced upwardly from the medial portion of the center sill. The car may be constructed in a version having a top truss, or having a top chord member that lies within the profile of vertical posts of the central beam assembly. In embodiments having a narrow top chord, the car may be provided with a top chord cover.

21 Claims, 39 Drawing Sheets

OTHER PUBLICATIONS

The Car Builders' Cyclopedia of American Practice, 19th ed., Simmons-Boardman Publishing Corporation, New York, NY, 1953, pp. 284 & 285.

Railway Age Weekly, Simmons-Boardman Publishing Corporation, Boston, Conn., Jan. 5, 1959, pp. 19.

The Car Builders' Cyclopedia of American Practice, 21st ed., Simmons-Boardman Publishing Corporation, New York, NY, 1961, pp. 168-172.

The Car Builders' Cyclopedia of American Practice, 21st ed., Simmons-Boardman Publishing Corporation, New York, NY, 1961, pp. 447 & 448.

Railway Age Weekly, Simmons-Boardman Publishing Corporation, Boston, Conn., 1965, pp. 22 & 23.

Blodgett, Omer, W., "Rigid-Frame Knees (Elastic Design)" in Design of Welded Structures., James F. Lincoln Arc Welding Foundation, Jun. 1966, pp. 5.11-1 to 5.11-20.

Railway Age Weekly, Simmons-Boardman Publishing Corporation, Boston, Conn., Mar. 20, 1967, pp. 15.

Railway Age Weekly, Simmons-Boardman Publishing Corporation, Boston; Conn., Dec. 18, 1967, pp. 58.

Railway Age Weekly, Simmons-Boardman Publishing Corporation, Boston, Conn., Feb. 19, 1968.

Railway Age Weekly, Simmons-Boardman Publishing Corporation, Boston, Conn., Apr. 29, 1969.

Car and Locomotive Cyclopedia of American Practice, 2nd ed., Simmons-Boardman Publishing Corporation, New York NY, 1970, pp. 126.

Car and Locomotive Cyclopedia of American Practice, 2nd ed., Simmons-Boardman Publishing Corporation, New York, NY, 1970, pp. 287 and 289.

Car and Locomotive Cyclopedia of American Practice, 3rd ed., Simmons-Boardman Publishing Corporation, New York, NY, 1974, pp. S3-165 and S3-173 to S3-176.

The Car Locomotive Cyclopedia of American Practice, 4th ed., Simmons-Boardman Publishing Corporation, Omaha, Nebraska, © 1980, pp. 73 & 76.

The Car Locomotive Cyclopedia of American Practice, 4th ed., Simmons-Boardman Publishing Corporation, Omaha, Nebraska, © 1980, pp. 242, 243 and 256.

The Car and Locomotive Cyclopedia of American Practice, 5th ed., Simmons-Boardman Publishing Corporation, Omaha, Nebraska, 1984, pp. 169.

Various photographs showing a dropped deck center beam car bearing mondel No. THRX 3001 manufactured by Thrall (date and location unknown).

Photograph showing a flatcar bearing model No. BCOL 866688 (date and location unknown).

Various photographs showing a center beam car bearing model No. BNSF 564128 (date and location unknown).

Illustration showing a model of a car built for Pulpwood Service in 1963.

Various photographs taken on Sep. 19, 2000, Chicago, Illinois, U.S.A., showing a dropped deck center beam car bearing model No. THRX 3001 manufactured by Thrall.

Various photographs taken on Sep. 27, 2000, Campbellville, Ontario, Canada, showing a flatcar bearing model No. CN 602376.

Various photographs taken on Sep. 27, 2000, Milton, Ontario, Canada, showing a flatcar bearing model No. BCOL 52098.

* cited by examiner

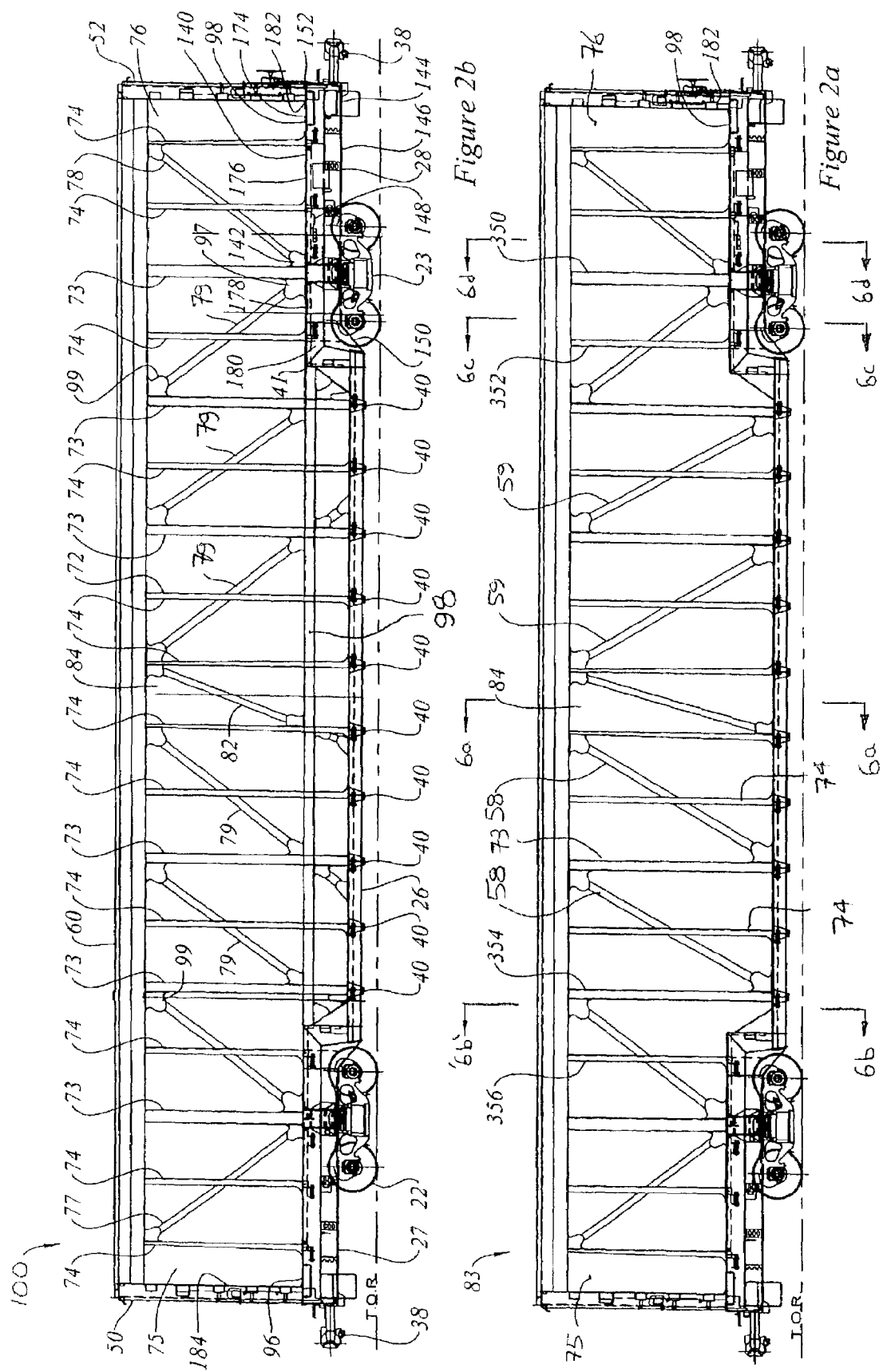

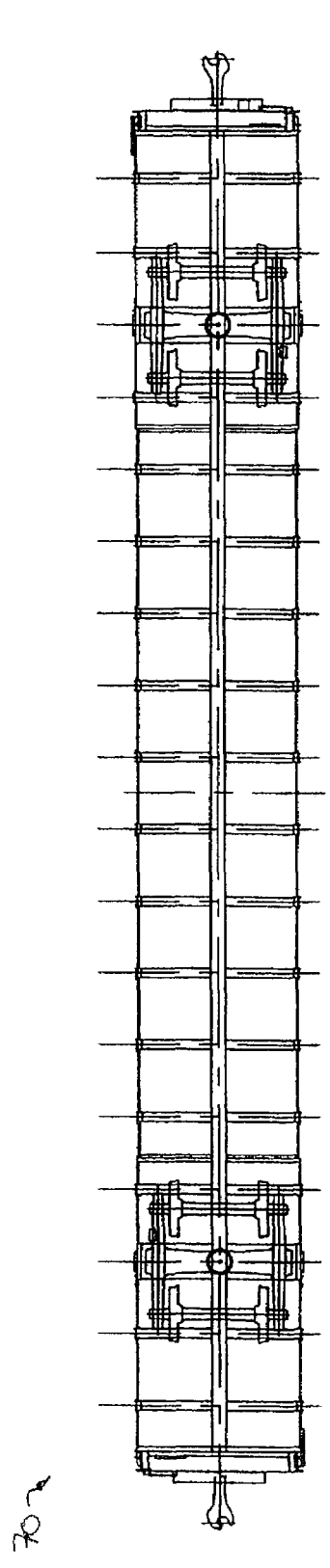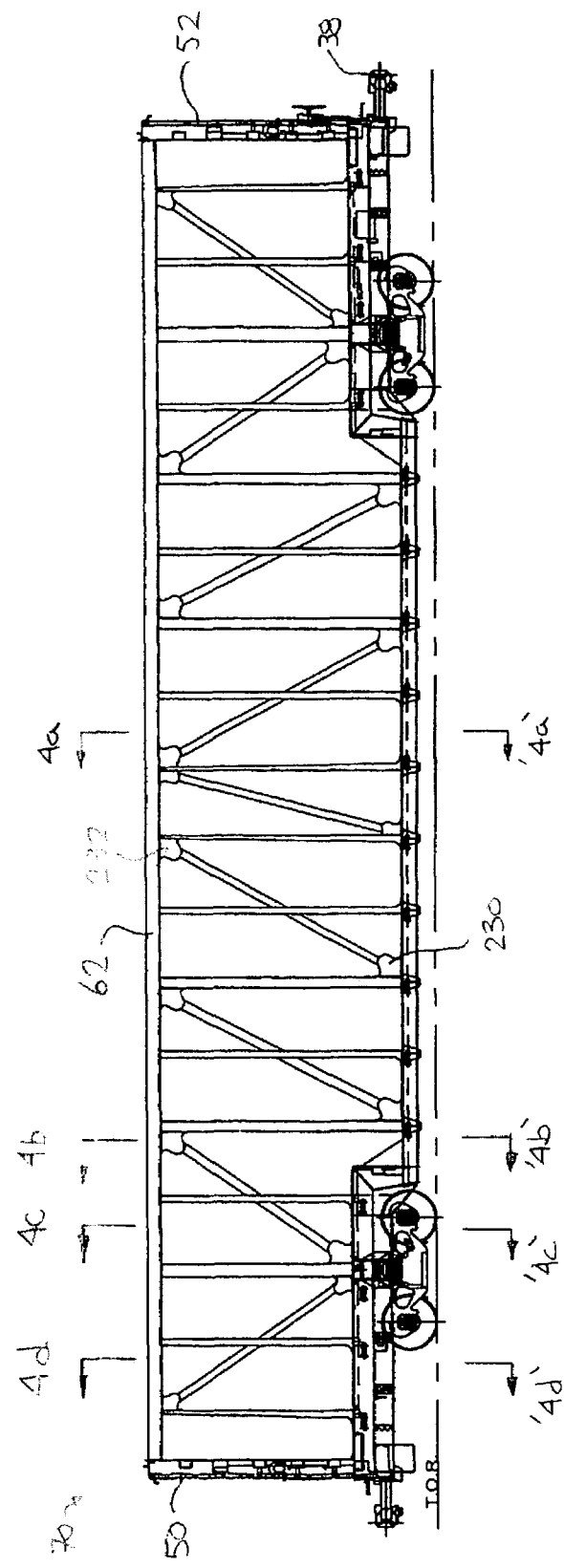
FIGURE 2d
FIGURE 2c.

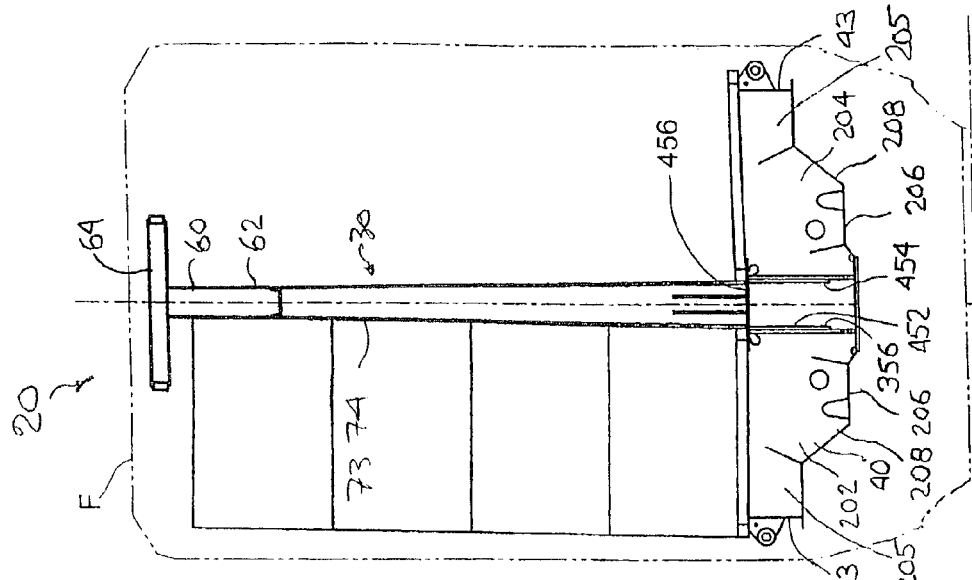
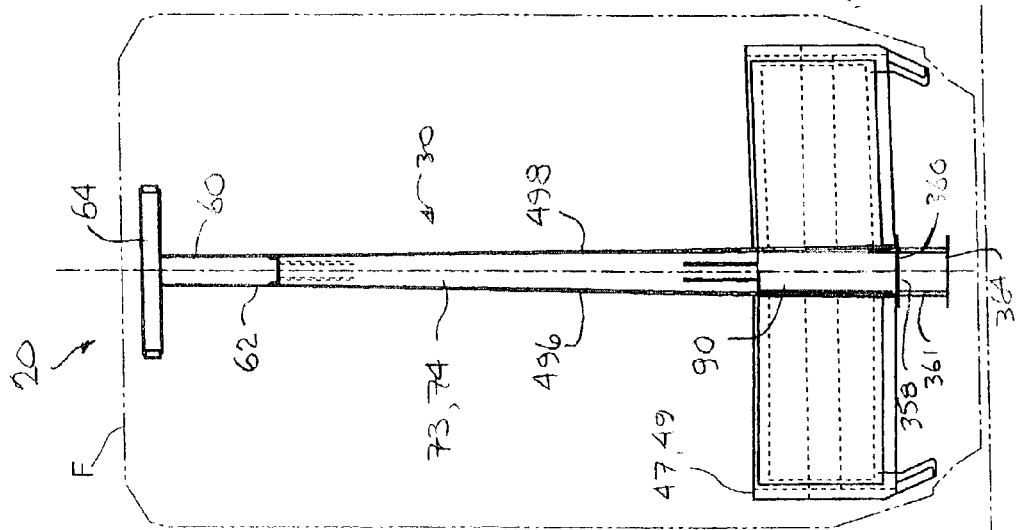
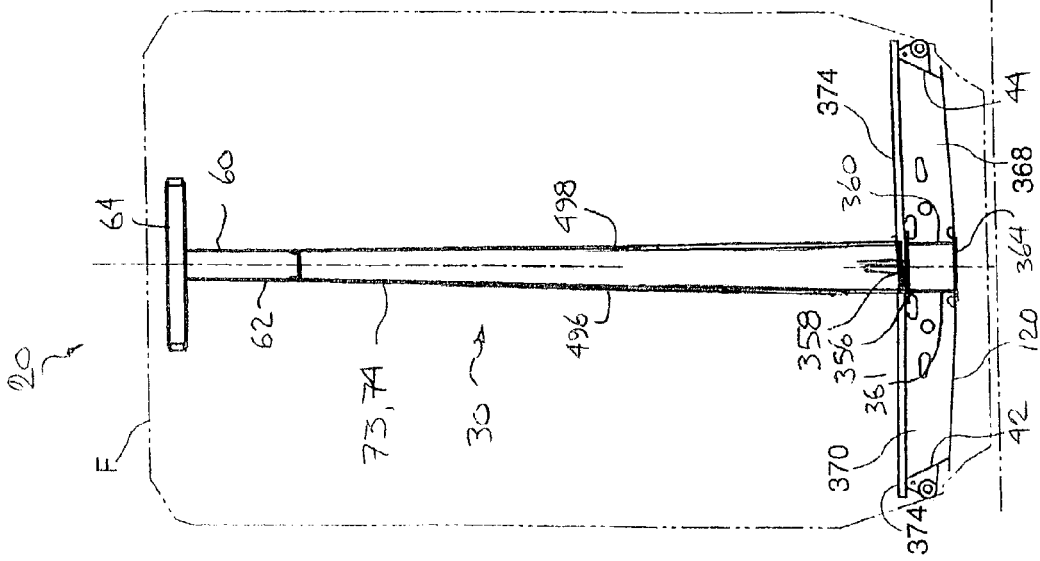

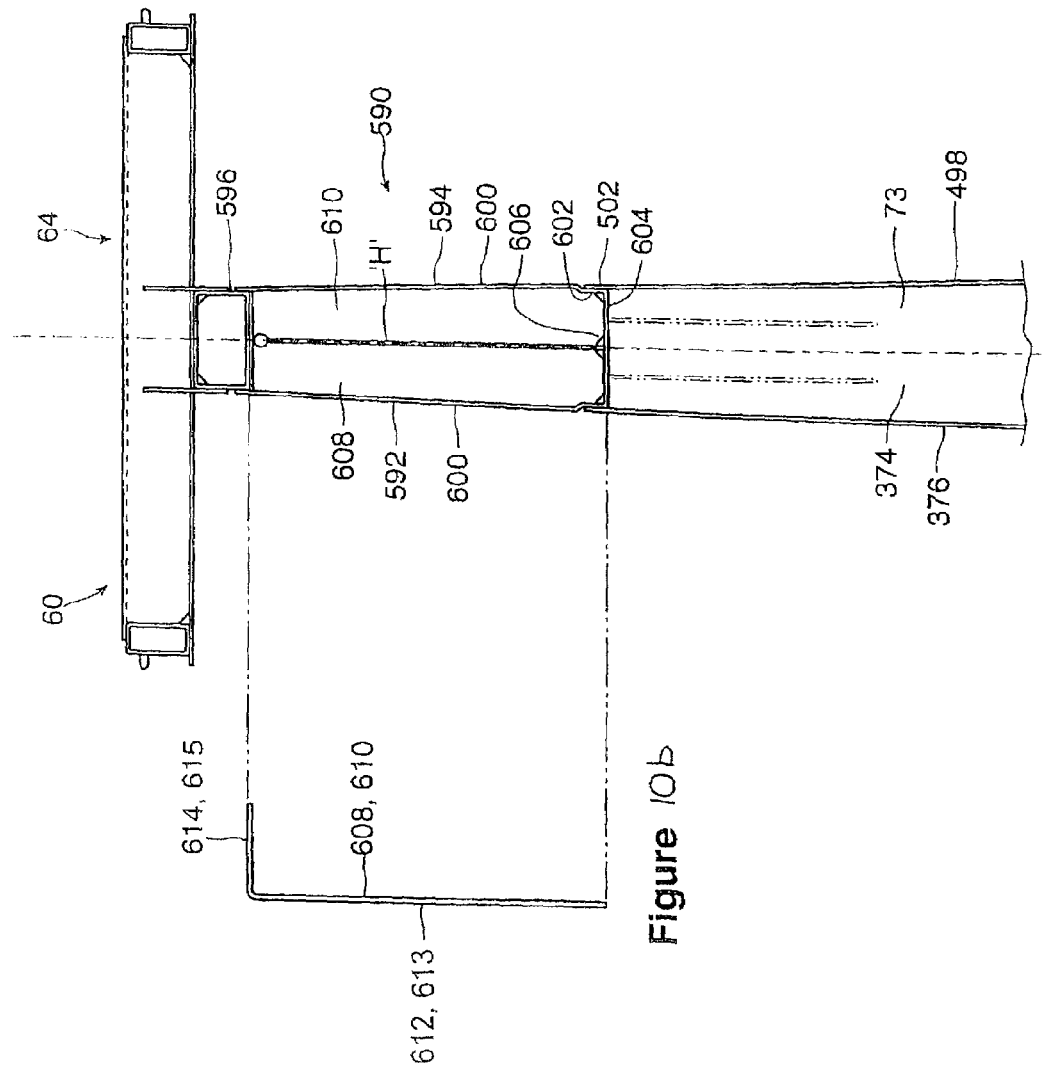

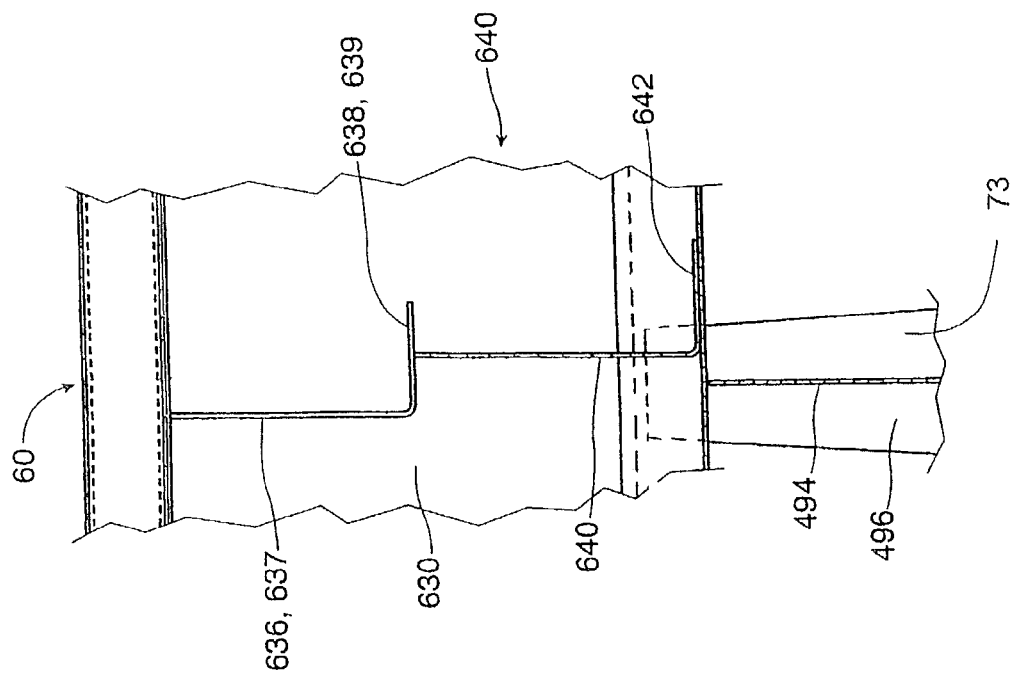
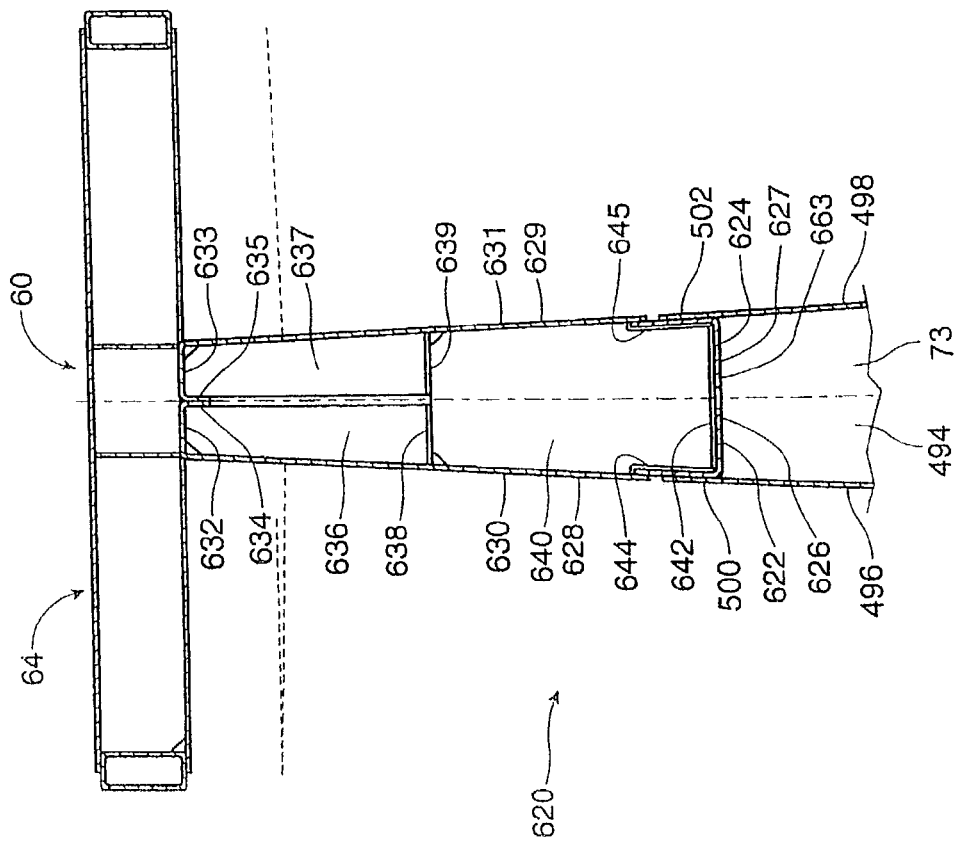
Figure 11b
Figure 11a

DROPPED DECK CENTER BEAM RAIL ROAD CAR WITH SHALLOW CENTER SILL

FIELD OF THE INVENTION

This invention relates generally to center beam rail road cars, and, in particular, to center beam cars having a depressed deck portion between a pair of rail car trucks.

BACKGROUND OF THE INVENTION

Center beam rail road cars generally have a rack-like body, in which there is a longitudinally extending deck and an upstanding center beam assembly running down the center of the car. The center beam structure is carried on a pair of rail car trucks. The cars have a pair of end bulkheads that extend transversely to the rolling direction of the car. The lading supporting structure of the beam includes laterally extending decking mounted above, and spanning the space between, the trucks. A center beam web structure, typically in the nature of an open frame truss for carrying vertical shear loads, stands upright from the deck and runs along the longitudinal centerline of the car between the end bulkheads. This kind of webwork structure can be constructed from an array of parallel uprights and appropriate diagonal bracing. Most often, a top truss assembly is mounted on top of the vertical web and extends laterally to either side of the centerline of the car. The top truss is part of an upper beam assembly, (that is, the upper or top flange end of the center beam) and is usually manufactured as a wide flange, or wide flange-simulating, truss, both to co-operate with the center sill to resist vertical bending, and also to resist bending due to horizontal loading of the car while travelling on a curve. Typically, a center sill extends the length of the car. The center beam thus formed is conceptually a deep girder beam whose bottom flange is the center sill, and whose top flange is the top truss (or analogous structure) of the car.

Center beam cars are commonly used to transport packaged bundles of lumber, although other loads such as pipe, steel, engineered wood products, or other goods can also be carried. The space above the decking and below the lateral wings of the top truss on each side of the vertical web of the center beam forms left and right bunks upon which bundles of wood can be loaded. The base of the bunk may include risers that are mounted to slant inward, and the vertical web of the center beam is generally tapered from bottom to top, such that when the bundles are stacked, the overall stack leans inward toward the longitudinal centerline of the car.

Lading is most typically secured in place using straps or cables. Generally, the straps extend from a winch device mounted at deck level, upward outside the bundles, to a top fitting. The top fitting can be located at one of several intermediate heights for partially loaded cars. Most typically, the cars are fully loaded and the strap terminates at a fitting mounted to the outboard wing of the upper beam assembly. Inasmuch as the upper beam assembly is narrower than the bundles, when the strap is drawn taut by tightening the winch, it binds on the upper outer corner of the topmost bundle and exerts a force inwardly and downwardly, tending thereby to hold the stack in place tight against the center beam web.

Each bundle typically contains a number of pieces of lumber, commonly the nominal 2"×4", 2"×6", 2"×8" or other standard size. The lengths of the bundles vary, typically ranging from 8' to 24', in 2' increments. The most common bundle size is nominally 32 inches deep by 49 inches wide, although 24 inch deep bundles are also used, and 16 inch deep bundles can be used, although these latter are generally less common. A 32 inch nominal bundle may contain stacks of 21 boards, each 1½ inch thick, making 31½ inches, and may include a further 1½ inches of dunnage for a total of 33 inches. The bundles are loaded such that the longitudinal axes of the boards are parallel to the longitudinal, or rolling, axis of the car generally. The bundles are often wrapped in a plastic sheeting to provide some protection from rain and snow, and also to discourage embedment of abrasive materials such as sand, in the boards. The bundles are stacked on the car bunks with the dunnage located between the bundles such that a fork-lift can be used for loading and unloading. For bundles of kiln dried softwood lumber the loading density is taken as 1600 to 2000 Lbs. per 1000 board-feet.

It has been observed that when the straps are tightened, the innermost, uppermost boards of the topmost bundle bear the greatest portion of the lateral reaction force against the center beam due to the tension in the straps or cables. It has also been observed that when these bundles bear against the vertical posts of the center beam, the force is borne over only a small area. As the car travels, it is subject to vibration and longitudinal inertia loads. Consequently the plastic sheeting may tend to be torn or damaged in the vicinity of the vertical posts, and the innermost, uppermost boards can be damaged. The physical damage to these boards may tend to make them less readily saleable. Further, whether or not the boards are damaged, if the plastic is ripped, moisture can collect inside the sheeting. This may lead to the growth of molds, and may cause discolouration of the boards. In some markets the aesthetic appearance of the wood is critical to its saleability, and it would be advantageous to avoid this discolouration.

In part, the difficulty arises because the bearing area may be too small. Further, the join between the upstanding web portion of the center beam and the upper beam assembly can coincide with the height of the topmost boards. This join is not always smooth. Further still, when the posts are fabricated the flanges may not stand perfectly perpendicular to the web, such that one edge of the flange may bear harder against the bundles than another.

It is also desirable that the bundles stack squarely one upon another. Although it is possible to use wooden battens at the top end of the center beam web, this will tend to cause the top bundle to sit outwardly of its neighbours. It has been observed that a thin wooden batten, of ¾" thickness may tend to bow inwardly between adjacent posts, and may not spread the wear load as much as may be desired. A 1½ inch thick wooden batten may have a greater ability to resist this bowing effect. However, the space available for employing a batten may tend to be limited by the design envelope of the car. Inasmuch as it is advantageous to load the car as fully as possible, and given that the design of the car may usually reflect a desire to maximize loading within the permissible operational envelope according to the applicable AAR standard, the use of a relatively thick wooden batten may tend to push the outside edge of the top bundle outside the permissible operational envelope. Wooden battens may also be prone to rotting if subject to excessive exposure to moisture, or may be consumable wear items that may require relatively frequent periodic replacement.

It would be desirable to have an upper beam assembly that is integrated into the structure, that is formed to spread the bearing load across a larger area, that would tend to resist the bowing phenomenon, that would tend not to require frequent replacement, and that would tend not to be prone to rotting.

Existing center beam cars tend to have been made to fall within the car design envelope, or outline, of the American Association of Railroads standard AAR Plate C, and tend to have a flat main deck that runs at the level of the top of the main bolsters at either end of the car. In U.S. Pat. No. 4,951,575, of Dominguez et al., issued Aug. 28, 1990, a center beam car is shown that falls within the design envelope of plate C, and also has a depressed center deck between the car trucks. It would be advantageous to be able to operate center beam cars that exceed Plate C and fall within AAR Plate F, with a full load of lumber in bundles stacked 5 bundles high. A five bundle high load of 33 inch bundles requires a vertical clearance in the left and right hand bunks of at least 165 inches. This significantly exceeds the vertical loading envelope of a plate C car.

In known center beam cars, such as those shown in U.S. Pat. No. 4,951,575 and in U.S. Pat. No. 4,802,420 of Butcher et al., issued Feb. 7, 1989, the deck structure of the cars has included inwardly tapering risers mounted above the cross bearers, with longitudinally extending side sills running along the ends of the cross-bearers. The side sills have been angle or channel sections. In U.S. Pat. No. 4,951,575 the side sills are z-sections with the upper leg of the Z extending outward, the lower leg extending inward, and the web between the two legs running vertically. In U.S. Pat. No. 4,802,420 of Butcher et al., the side sill is a channel section, with the legs extending laterally outward and the web, being the back of the channel, extending vertically between the two legs In both cases the winch is mounted outward of the vertical web.

In center beam cars it is desirable that the center sill be aligned with the couplers to reduce or avoid eccentric draft or buff loads from being transmitted. In dealing with lateral loads, the side sills act as opposed flanges of a beam. The loads in the side sills, whether in tension, compression, vertical shear or lateral bending, tend to be transferred to the main sill through a main bolster assembly at each end of the car. In general the bolster is located at a level corresponding to the height of the main sill, and the shear plate, if one is used, is typically at a level corresponding to the level of the upper flange of the main sill.

It is desirable to have a well deck, also called a depressed center deck or dropped deck, between the trucks, to increase the load that can be carried, and so to increase the overall ratio of loaded weight to empty weight of the car, and also to reduce the height of the center of gravity of the car when loaded, as compared to a car having a flat, straight through deck from end to end carrying the same load. In the case of a well deck, longitudinal compression and tension loads in the side sills must be carried from the level of the side sills in the well, to a second, higher level of the side sills to clear the trucks, and then through the bolster structure and into the main sill. The transmission of forces through the vertical distance of the eccentricity of the rise from the side sills height in the well to the side sill height of the end deck adjoining the bolster results in the generation of a moment. When the side sill has a knee at the transition from the well to the end structure of the car, the height of the knee defines the arm of the moment.

The centerline height of a coupler of a rail road car, when new, may be 34½" above top of rail (TOR). This is a standard height to permit interchangeable use of various types of rail cars. The main sill, or stub sill if used, tends to have a hollow box or channel section, the hollow acting as a socket into which the coupler is mounted. The minimum height of the main sill at the trucks (or stub sill, if one is used) and end structure bolsters tends to be determined by the coupler height, and the height required to clear the wheels. The height of the well deck is limited by the design envelope, be it Plate C, Plate F, or some other. In general, however, the height of the shear plate, or top flange of the bolster, to the well decking is less than the desired 33 inch bundle height. It is desirable for the top of the first layer of bundles stacked in the well to be at a height that permits the next layer of bundles to match the height of bundles stacked over the trucks. Consequently it would be advantageous to have a false deck, or staging, mounted above the shear plate, or if there is no end structure shear plate, then above the bolster, at a level to match the level of the top of the bundles carried in the well between the trucks.

One way to reduce the stress concentration at the knee is to make the side sill section of the end portion of the sill deeper. Another way to reduce the stress concentration at the knee is to make the knee member wider. On the longitudinally inwardly facing side of the knee (that is, the side oriented toward the lading in the well) the flange of the vertical leg of the knee may tend to extend perpendicularly. On the longitudinally outboard side, that is, the side facing the truck, the longitudinally outboard flange can be angled, or swept, resulting in a tapering leg, rather than one with parallel flanges. An increase in the section width, due to tapering the longitudinally outboard flange is desirable, as it permits a reduction in the stress concentration in the side sill assembly at the knee, and tends to provide greater truck clearance.

Where a dropped deck center beam car is used, the juncture between the posts and the medial portion of the center sill may leave a discontinuity in the lading contacting surface. That is, where the center sill is a straight-through center sill, such that (subject to any cumber) the top flange of the center sill runs continuously from one end of the rail road car to the other in a single horizontal plane, the lower bundles of the lading in the medial portions of the car are nestled snug against the laterally outwardly facing bearing surfaces of the medial portion of the center sill. The upper bundles nestle against, and the load securement cables are tightened to encourage snug securement against, the laterally outwardly facing flanges of the center beam assembly posts. Due to the practicalities of manufacturing, there may be a discontinuity between the lading contacting interface surface, or surfaces, of the medial portion of the center sill and the outwardly facing flanges of the posts. This discontinuity may be deliberate—as when the center sill has parallel, vertical webs, and the posts are tapered, or it may be inadvertent, as when the posts are slightly misaligned on installation, either being angularly mis-oriented such that the join is skewed, or translationally mismatched such that the join is not co-planar, or the weld at the join may not be ground flush and smooth, leaving a protruding asperity to damage adjacent lading.

It may therefore be advantageous to have, in the medial portion of the car, posts whose flanges extend the full height from the top chord to the deck of the medial section, presenting one continuous, planar bearing surface. Such a continuous surface may tend not to have local asperities due to mis-aligned adjacent members or poorly executed and finished weldments. To achieve this objective of a continuous bearing surface, it may be desirable, as shown and described herein, to employ a center sill medial portion whose external surfaces lie shy of (or put differently, not proud of) the profile of the bearing surfaces of the posts. To that end it may be advantageous to employ a shallow center sill, as in one aspect of the present invention, in which the upper flange of the center sill is not continuously planar, but rather has a depressed medial portion lying lower than the end portions. Further, it may be advantageous to employ a shallow, or very shallow, center sill in the medial, or dropped deck portion of the car, in which the upper flange of the center sill lies at a level corresponding to, or shy of, the level of the upwardly facing lading bearing interface of the medial portion of the deck structure. For example, the upwardly facing lading bearing interface of the deck structure may be either the support array formed by the upwardly facing surfaces of a series of risers, such as may be mounted over pitched cross-members, or, in a riserless car, may by the generally flat surface of the deck in a riserless car.

Optionally, a shallow center sill as shown and described in one aspect of the invention herein, may result in an eccentric moment being placed upon the center sill, as, for example, when the car is subjected to a longitudinal squeeze (i.e., buff) load. Such a squeeze load may be idealized as a longitudinal compressive load applied at the centerline of the couplers, with the tendency to cause the center sill to buckle. Where the centroid of the cross-section of the shallow portion of the center sill (or of the medial section of the deck in a center-sill-less medial portion, should such a novel structural feature be adopted in a center beam car) lies below the centerline of the couplers, there may tend to be a moment carried through the knees. In that circumstance it may be advantageous to provide a longitudinal reinforcement member for carrying at least a portion of the squeeze load, and, additionally, it may be advantageous for that longitudinal compression (or, indeed tension) carrying member to have the centroid of its cross sectional area located at a level at or above the centerline of the couplers. In such an instance, as shown and described herein in another aspect of the present invention, the compression member spaced upwardly from the center sill would also lie within the profile of the flanges of the posts.

It may be advantageous to be able to carry loads other than, for example, bundles of lumber, on at least a part of the return journey. While this can be done with center beam cars presently in use, the overhanging wings of the top truss may tend to complicate loading of the car from above. For example, it may be more convenient to load pipe, or other objects, using an overhead crane rather than to employ side loading using a fork-lift of perhaps more limited lifting capacity. Such loading would be facilitated by removal of the top truss. Further still, in addition to removal of the top truss, truncation of the central web at a level below the bottom of the uppermost row of bundles permits the top row of bundles to be loaded side by side. Strapping for securing the load, rather than being attached to the wings of the top truss, can be carried fully over the load to the winches at deck level on opposite sides of the car. In addition, the top chord can be made wider than the posts, such that the bundles bear against the smooth outside face of the top chord at a stand-off distance clear of the flanges of the posts.

Further, where, as described in one aspect of the invention herein, the top chord is relatively narrow, and is not surmounted by a top truss structure of significant lateral extent, it may be advantageous to provide a low-abrasion cover. It would be further advantageous if that cover could be manufactured from a single piece of stock, and if it could be installed in a manner where gravity might tend aid in keeping the cover in place.

Torsional loads applied to the center beam assembly are transmitted through the trucks and reacted at the rails. A significant portion of this load is transferred into the deck and main sill structure at the longitudinal location of the truck center by the main posts that extend upwardly from the deck above the truck center. It may be that the main post is narrower than the center sill top cap (i.e., upper flange), and narrower than the underlying center sill webs. It such circumstances it may be advantageous to provide web and flange continuity in the center sill beneath the main post.

SUMMARY OF THE INVENTION

In an aspect of the invention there is a center beam railroad car having a longitudinal centerline. The railroad car is supported by rail car trucks at either end thereof. The railroad car comprises a cargo support structure borne between the trucks, upon which cargo can be carried. The center portion of the cargo support structure is depressed relative to the end portions. The rail road can has full height posts that extend from the depth of the depressed portion to the top chord. In this portion of the car, the top flange of the center sill is flush with, or lies below, the plane of contact of the lading with the load bearing interface of the deck of the depressed portion.

In another aspect of the invention there is a dropped deck center beam rail road car. It has a lading support structure carried on rail road car trucks for rolling motion along rail road tracks. The lading support structure has upstanding bulkheads mounted at opposite ends thereof, a laterally extending deck structure, and a central beam assembly standing upwardly of the laterally extending deck structure. A coupler is mounted at one of the ends of the lading support structure. The coupler has a coupler centerline height. The deck structure has a pair of end portions and a medial portion. The end portions are stepped upwardly relative to the medial portion. Each of the end portions and the medial portion of the deck structure have lading bearing interfaces upon which lading can be placed. The central beam assembly includes a webwork assembly extending upwardly of the medial portion of the deck structure to a longitudinally extending top chord member. At least a portion of the web work assembly extending to a height lower than the lading bearing interface of one of the end portions of the deck structure.

In an additional feature of that aspect of the invention, a coupler is mounted to at least one of the ends of the lading support structure. The coupler has a coupler centerline height, and at least a portion of the web work assembly extends lower than the coupler centerline height. In another feature, the web work assembly includes laterally outwardly facing lading contact surfaces against which to secure lading. The medial portion of the deck structure has an upwardly facing load bearing interface upon which to place lading, and the lading contacting surface extends downward to a level corresponding to the load bearing interface of the medial portion of the deck structure. In a further feature, the load bearing interface of the medial portion of the deck structure apparatus is chosen from the set of apparatus consisting of (a) an array of risers upon which to place lading; and (b) deck sheeting upon which to place lading. In a still further feature, the web work assembly includes a laterally outwardly facing continuous load contacting surface that extends over a range of height greater than 140 inches from bottom to top.

In a further aspect of the invention, there is a dropped deck center beam rail road car. It has a center sill carried by rail car trucks for rolling motion along rail road tracks, and a deck structure upon which lading can be side loaded. The deck structure extends laterally outward from the center sill and has a depressed medial portion. Upstanding bulkheads are mounted at opposite end of the deck structure. A central beam assembly stands upwardly of the center sill and runs longitudinally between the bulkheads. The center sill has end portions and a downwardly stepped medial portion. The end portions have uppermost flange members, and the downwardly stepped medial portion has an uppermost flange member. The uppermost flange member of the medial portion lies at a lower height than the uppermost flange member of one of the end portions.

In an additional feature of that aspect of the invention, a coupler is mounted at one end of the rail road car. The coupler has a coupler centerline height. The uppermost flange member of the medial portion lies at a lower height than the coupler centerline height. In another additional feature, the medial portion has a cross-sectional area. The cross sectional area has a centroid. The centroid lies between 12 and 18 inches below the coupler centerline. In a further additional feature, the depressed medial portion of the deck structure has a load bearing interface upon which to place lading, and the uppermost flange member of the medial portion of the center sill lies at in a location chosen from the set of locations consisting of (a) flush with the load bearing interface of the medial portion of the deck structure; and (b) shy of the load bearing interface of the medial portion of the deck structure.

In a still further additional feature, the downwardly stepped medial portion of the center sill is located between two end portions of the center sill. The end portions are upwardly stepped relative to the medial portion of the center sill. A longitudinally extending reinforcement member is spaced upwardly from the medial portion of the center sill. The longitudinally extending reinforcement member is connected to carry longitudinal loads between the end portions of the center sill. In another additional feature, the end portions of the center sill include respective center sill top flange portions, and the longitudinally extending reinforcement member has a flange portion mounted at a height to pass loads between the top flange portions of the end portions of the center sill.

In still yet another additional feature, the rail road car has a coupler, and a coupler centerline height, the longitudinally extending reinforcement member has a cross-sectional area, the cross-sectional area has a centroid, and the centroid of the cross sectional area lies at a level that is at least as high as the centerline height of the coupler. In a further feature of that feature, the centroid lies 12 to 18 inches above the coupler centerline height. In an alternate, or additional further feature of that feature, the medial portion of the center sill has a cross-sectional area, and the cross-sectional area of the medial portion of the center sill lies at a height between 12 and 18 inches lower than the coupler centerline height. In a yet further feature a first distance is defined between the centroid height of the reinforcement member and the coupler centerline height, a second distance is defined between the coupler centerline height and the height of the centroid of the medial portion of the center sill, and a ratio R is defined as (a) the product of the first distance multiplied by the cross sectional area of the reinforcement member, divided by (b) the product of the second distance multiplied by the cross sectional area of the medial portion of the center sill, and the ratio R lies in the range of 0.70 to 1.40. In a still further feature, a ratio R is defined as (a) the first distance divided by (b) the second distance; and the ratio R lies in the range of 0.5 to 2.0.

In a still further aspect of the present invention, there is a dropped deck center beam rail road car. It has a lading support structure carried on rail road car trucks for rolling motion along rail road tracks. The lading support structure has upstanding bulkheads mounted at opposite ends thereof, a laterally extending deck structure, and a central beam assembly standing upwardly of the laterally extending deck structure. The deck structure has a pair of end portions and a medial portion, the end portions being stepped upwardly relative to the medial portion. The central beam assembly includes a webwork assembly extending upwardly of the medial portion of the deck structure to a longitudinally extending top chord member. The web work assembly presents a laterally outwardly facing lading contact surface against which lading can be placed. The laterally outwardly lading contact surface is continuous from the medial portion of the deck structure to the top chord.

In an additional feature of that aspect of the invention, the outwardly facing lading contact surface of the web work assembly has slope continuity with the top chord. In another feature, the top chord has side faces against which lading can be secured. In a still further feature, the top chord is chosen from the set of top chords consisting of (a) a top chord mounted at a partial height elevation relative to the end bulkheads, wherein lading can be placed to either side of the top chord, and also carried thereabove; (b) a top chord mounted at a full height elevation relative to the bulkheads, and lading can be placed to either side thereof to bear laterally thereagainst, the top chord being unencumbered by laterally extending top truss members; and (c) a top chord member surmounted by a top truss mounted at a full height elevation relative to the bulkheads.

In another aspect of the invention there is a centerbeam rail road car having a truss-less top chord member. A removable plastic cover is provided for the top chord. The cover is made of a high molecular weight polymer, and provides a low friction surface against which to secure bundles of lading.

In an additional feature of that aspect of the invention, the cover is held in place by gravity. In a further additional feature, the cover is supplied in a plurality of sections to permit partial removal and replacement. In another feature, the cover is made from a roll formed plastic sheet. In another feature, the top chord has securement fittings be which to attach the cover to the top chord. In still another feature, the cover has an interference fit with the top chord. In another feature, the cover is resilient, whereby the cover can be flex to permit installation, and the cover is biased to snap or spring into place into place. That is, it is biased to retain itself in position. In another feature, the cover has an inwardly turned lip, and the lip is relieved to accommodate flanges of posts of the center beam assembly.

BRIEF DESCRIPTION OF THE DRAWINGS

FIG. 2a shows a side view of the center beam rail road car similar of FIG. 1a;

FIG. 2b shows a side view of an alternate embodiment of center beam rail road car to that shown in FIG. 2a, having a longitudinal compression bearing member spaced upwardly from the medial deck structure;

FIG. 2c shows a side view of the center beam railroad car of FIG. 1c;

FIG. 2d shows a top view of the center beam rail road car of FIG. 2a with deck sheets removed to reveal the location of the underlying cross-members;

FIG. 3a shows a perspective view of a detail of a deck transition section of the center beam car of FIG. 2a;

FIG. 3b shows a closer view of the transition section of FIG. 3a;

FIG. 6a shows a cross-section of the car of FIG. 2a taken on section '6a—6a';

FIG. 6b shows a cross-section of the car of FIG. 1a taken on section '6b—6b';

FIG. 6c shows a cross-section of the car of FIG. 1a taken on section '6c—6c' looking toward the main bolster;

FIG. 7a shows an enlarged detail of FIG. 6a;

FIG. 7f shows a detail of the embodiment of FIG. 2b taken on a section corresponding to FIG. 6a;

FIG. 9b shows a side sectional view of the detail of FIG. 9a;

FIG. 10a shows an alternate detail to that of FIG. 9a;

FIG. 10b shows a side sectional view of the detail of FIG. 10a;

FIG. 11a shows an alternate detail to that of FIG. 9a;

FIG. 11b shows a side sectional view of the detail of FIG. 11a;

FIG. 12a shows an alternate detail to that of FIG. 9a;

FIG. 12b shows a side sectional view of the detail of FIG. 12a;

FIG. 13a shows an alternate detail to that of FIG. 9a;

FIG. 13b shows a side sectional view of the detail of FIG. 13a;

FIG. 14a shows an alternate detail to that of FIG. 9a;

FIG. 14b shows a side sectional view of the detail of FIG. 14a;

FIG. 15 shows an alternate detail to that of FIG. 9a;

FIG. 16 shows an alternate detail to that of FIG. 9a;

FIG. 17a shows an alternate detail to that of FIG. 9a;

FIG. 17b shows an alternate detail to that of FIG. 17a;

FIG. 17c shows an alternate detail to that of FIG. 17a;

FIG. 17e shows an alternate detail to that of FIG. 17c;

FIG. 18 shows an alternate detail to that of FIG. 9a;

FIG. 19 shows an alternate detail to that of FIG. 9a;

FIG. 20 shows an alternate detail to that of FIG. 9a; and

FIG. 21 shows an alternate detail to that of FIG. 9a.

DETAILED DESCRIPTION OF THE PREFERRED EMBODIMENT

Figure 1A:
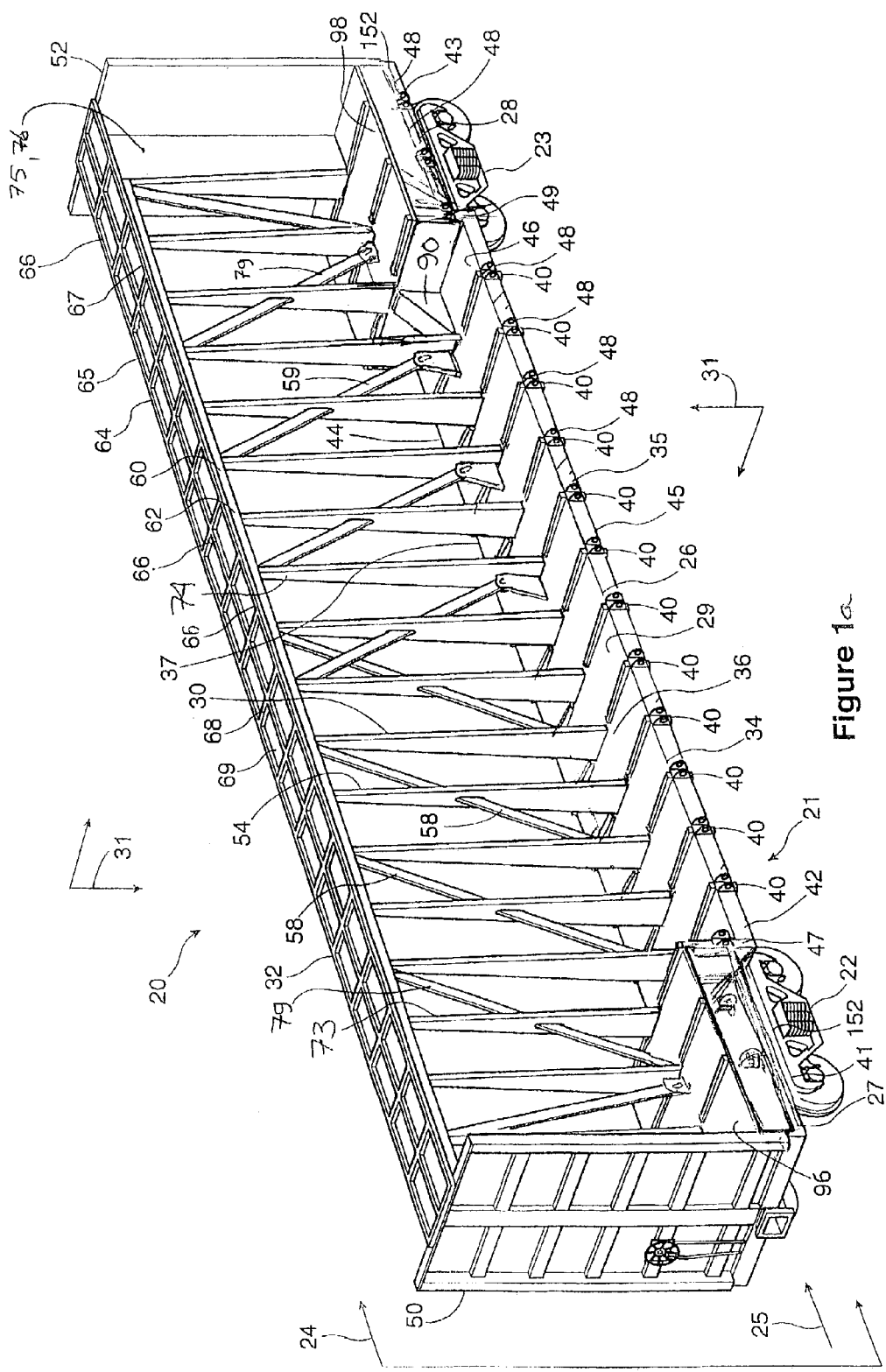
FIG. 1a shows an isometric, general arrangement view of an embodiment of a center beam rail road car having a depressed center deck and a center sill having a shallow medial portion according to an aspect of the present invention, that embodiment having tapered posts and a laterally extending top truss.

The description that follows, and the embodiments described therein, are provided by way of illustration of an example, or examples of particular embodiments of the principles of the present invention. These examples are provided for the purposes of explanation, and not of limitation, of those principles and of the invention. In the description which follows, like parts are marked throughout the specification and the drawings with the same respective reference numerals. The drawings are not necessarily to scale and in some instances proportions may have been exaggerated in order more clearly to depict certain features of the invention.

In terms of general orientation and directional nomenclature, for each of the rail road cars described herein, the longitudinal direction is defined as being coincident with the rolling direction of the car, or car unit, when located on tangent (that is, straight) track. In the case of a car having a center sill, whether a through center sill or stub sill, the longitudinal direction is parallel to the center sill, and parallel to the side sills, if any. Unless otherwise noted, vertical, or upward and downward, are terms that use top of rail TOR as a datum. The term lateral, or laterally outboard, refers to a distance or orientation extending cross-wise relative to the longitudinal centerline of the railroad car, or car unit, indicated as CL—Rail Car. The term "longitudinally inboard", or "longitudinally outboard" is a distance or orientation relative to a mid-span lateral section of the car, or car unit.

A center beam railroad car is indicated in FIG. 1a generally as 20. It has a center beam rail road car body 21 carried on a pair of longitudinally spaced apart railroad car trucks 22 and 23 and operable to roll in a rolling, direction along rails in the generally understood manner of rail cars. Car 20 has a longitudinal centerline 25 lying at the center of the coupler height and in a longitudinal plane of symmetry, indicated generally as 24, which intersects the truck centers of trucks 22 and 23. Car 20 has a deck structure 26 that has end deck portions 27, 28 and a medial deck portion 29, carried between the trucks at a height, relative to the top of rail (TOR) that is lower than the height of the end deck portions 27, 28.

The structure of a center beam car is analogous to a deep beam having a tall central structure to approximate the web of a beam, or a web-like structure or truss assembly, a wide flange at the bottom, and a wide flange at the top. In the case of car 20, the central web assembly is indicated generally as 30 and runs in the longitudinal direction (that is, the rolling direction of the car), the top flange function is served by a top truss assembly 32, and the lower flange function is performed by center sill 3b, from which extends an assembly that includes a lateral support structure 34, in the nature of a deck, or frame, or staging upon which cargo can be placed. Lateral support structure 34 generally includes deck structure 26, and its outboard left and right hand side sills 42 and 44.

It will be appreciated that aside from fittings such as hand grabs, ladders, brake fittings, and couplers, the structure of car 20 (and the other embodiments of railroad cars shown and described herein) are symmetrical about the longitudinal plane of symmetry 24, and also about a transverse plane of symmetry 31 at the mid-length station of the car. In that light, a structural description of one half of the car will also serve to describe the other half. The features of car 20 thus enumerated are basic structural features of a center beam car having a depressed center deck.

In detail, center sill 36, is a fabricated steel box beam that extends longitudinally along car 20, having couplers 38 mounted at either end. Cross bearers 40 extend outwardly from center sill 36 to terminate at a pair of longitudinal left and right hand side sills 42, 44 that also run the length of the car. In the various embodiments of rail cars shown herein, cross-bearers are indicated as item 40 and cross-ties are indicated as item 41. These cross bearers and cross ties extend laterally outward from center still 36 on approximately 4 ft centers. Decking 46 is mounted to extend between cross-bearers 40, and cross-ties 41 providing a shear connection between adjacent cross-bearers when side loads are imposed on the car. Structural members in the nature of tapered risers 48 may be mounted above the cross-bearers and cross-ties to form the base of a bunk for carrying loads. Risers 48 are tapered so that loads stacked thereupon will tend to lean inwardly toward the center-line of car 20. Where risers are used, the upper surfaces of risers 48 define respective end decking portion and medial decking portion load-bearing interfaces upon which lading my be placed.

As noted above, deck structure 26 has a first end portion, namely end deck portion 27, a second end deck portion, namely end deck portion 28, and a medial deck portion 29. At each of the transitions from either end deck portion 27 or 28 to medial deck portion 29 there is a knee, indicated as either 47 or 49. Not only is deck structure 26 stepped in this manner, but so too are side sills 42 and 44, each having end members 41, 43, and a medial span member 45.

At either end of car 20 there are vertically upstanding fore and aft end bulkheads 50 and 52 which extend from side to side, perpendicular to the central longitudinal plane 24 of car 20. Running the full length of car 20 between end bulkheads 50 and 52 is an array 54 of upright posts 73, 74. Array 54 may include tapered fabricated posts 73 having a generally H-shaped cross-section and tapered posts 74 having a generally C-channel shaped section. In alternate embodiments, as noted below, variations of array 54 with straight-sided posts may include seamless steel tubes of rectangular cross-section, identified as 56, and square steel tubes of main posts 55 mounted over the truck centers in some embodiments, and channel members of constant section identified as 57. Posts 56, 57, 73 and 74 may be employed in either long or short versions, the long versions being for employment in the medial deck portion of the cars, and the short versions being for employment with the end deck portions of the cars. In several embodiments, the end bays have solid shear bay panels 75, 76 respectively. End diagonal struts 77, 78 extend upwardly and longitudinally outboard away from the respective truck centers. Structural reinforcement members in the nature of left and right hand short two-bay inboard diagonal braces, are indicated as 79, 80. Array 54 is reinforced by long diagonal braces 58, 59, that provide a shear path for vertical loads. There are many different possible configurations of posts and diagonal bracing.

The array 54 of posts 56, 57 is surmounted by an upper beam assembly 60 and deep beam top chord assembly 62. An open framework top truss 64 is mounted atop deep beam top chord assembly 62. Truss 64 has lateral wings 65 and 67 that are mounted to extend outboard from the central plane of car 20 in a cantilevered manner. Truss 64 has longitudinal stringers 66, cross members 68 and shear plates 69.

In each embodiment shown and described herein, and the combinations of features of the various embodiments that may be made without departing from the spirit and scope of the present invention, the array of posts 54 surmounted by an upper beam structure form a central beam assembly standing upwardly of the deck structure. In this central beam structure, array 54, and the diagonal braces co-operate to provide a shear transfer web-like structure between center sill 36 and the top chord, whether in the form of a single beam top chord, or top chord, both indicated generically as assembly 62, as may be the case, such that the overall structure may tend to perform like a deep truss under vertical bending loads.

Figure 4A:
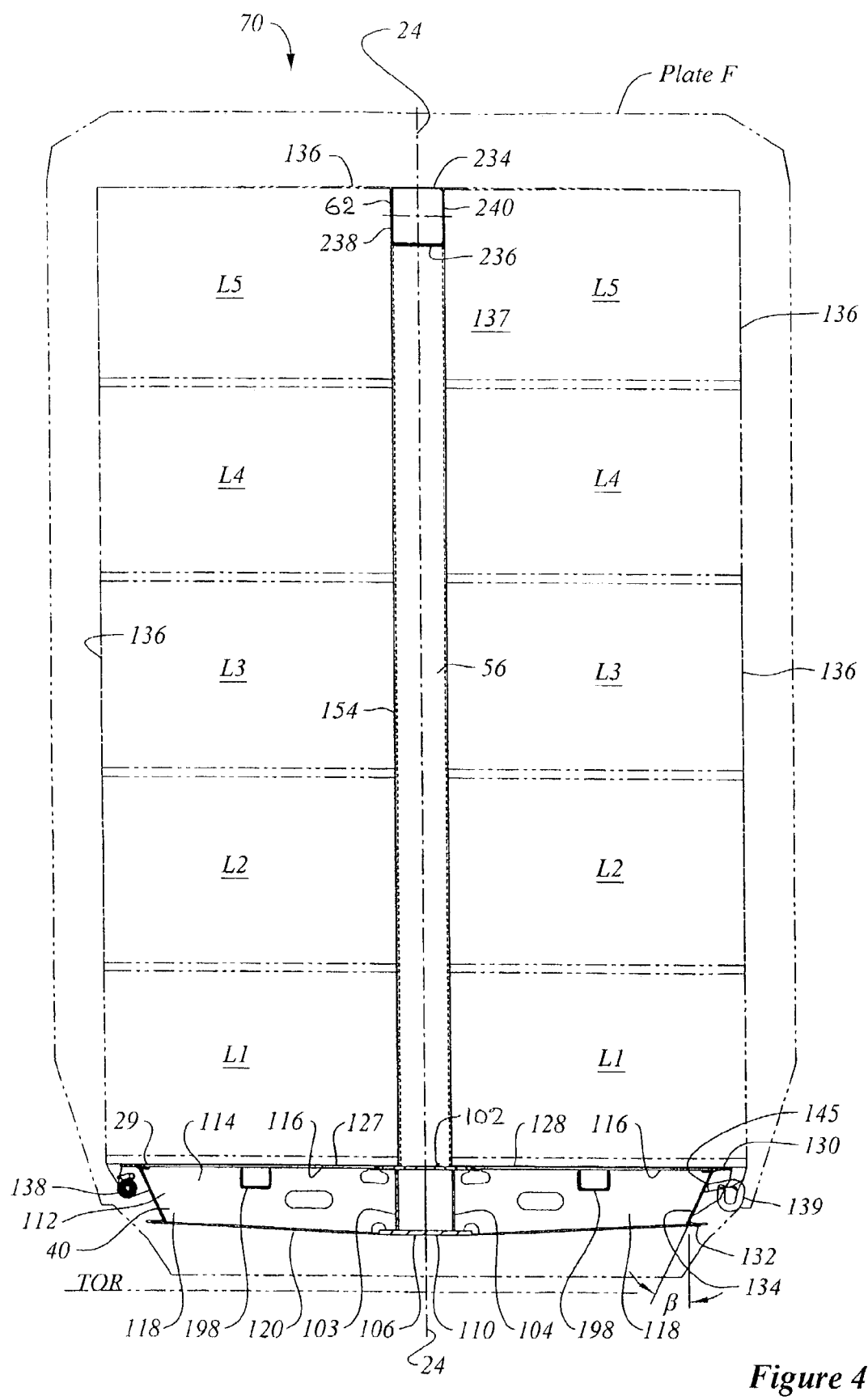
FIG. 4a shows a mid-span cross section of the center beam rail road car of FIG. 2c taken on section '4a—4a'.

In car 20, and in all of the other rail road cars described herein, staging, or other end deck support structure upon which lading can be placed is carried above the respective end deck portions. This support structure of the end deck portions is offset from the lading supporting structure of medial deck portion 29 by an upward step height increment indicated as 6 (FIG. 4a). Although other heights could be used, in all of the embodiments illustrated and described herein, it is understood that the step increment is advantageously 30 inches or more, and may correspond to the height of a nominal 32 inch bundle of lumber, plus dunnage, (that is, 31 and ½ inches of lumber plus 1 and ½ inches of dunnage) totalling 33 inches, plus a ⅝ inch tolerance, for an actual step height of 33⅝" (+/−1;8"). If the bundle of lumber is a lesser height, such as 30 inches, the discrepancy may be made up by additional dunnage.

Figure 1B:
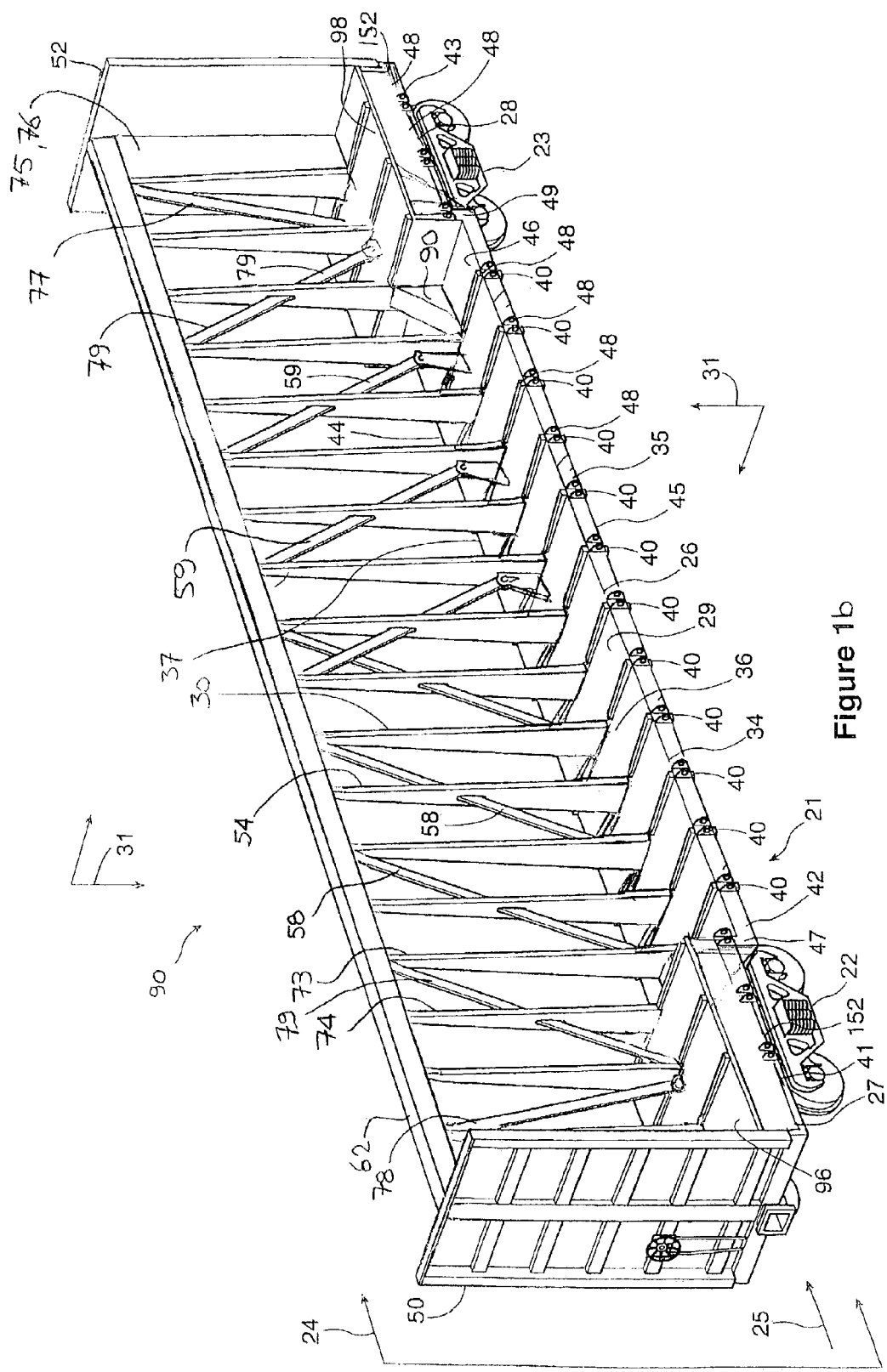
FIG. 1b shows an isometric, general arrangement view of an alternate embodiment of a center beam rail road car to that of FIG. 1a, that embodiment having tapered posts and a full height top chord without a top truss.
Figure 1C:
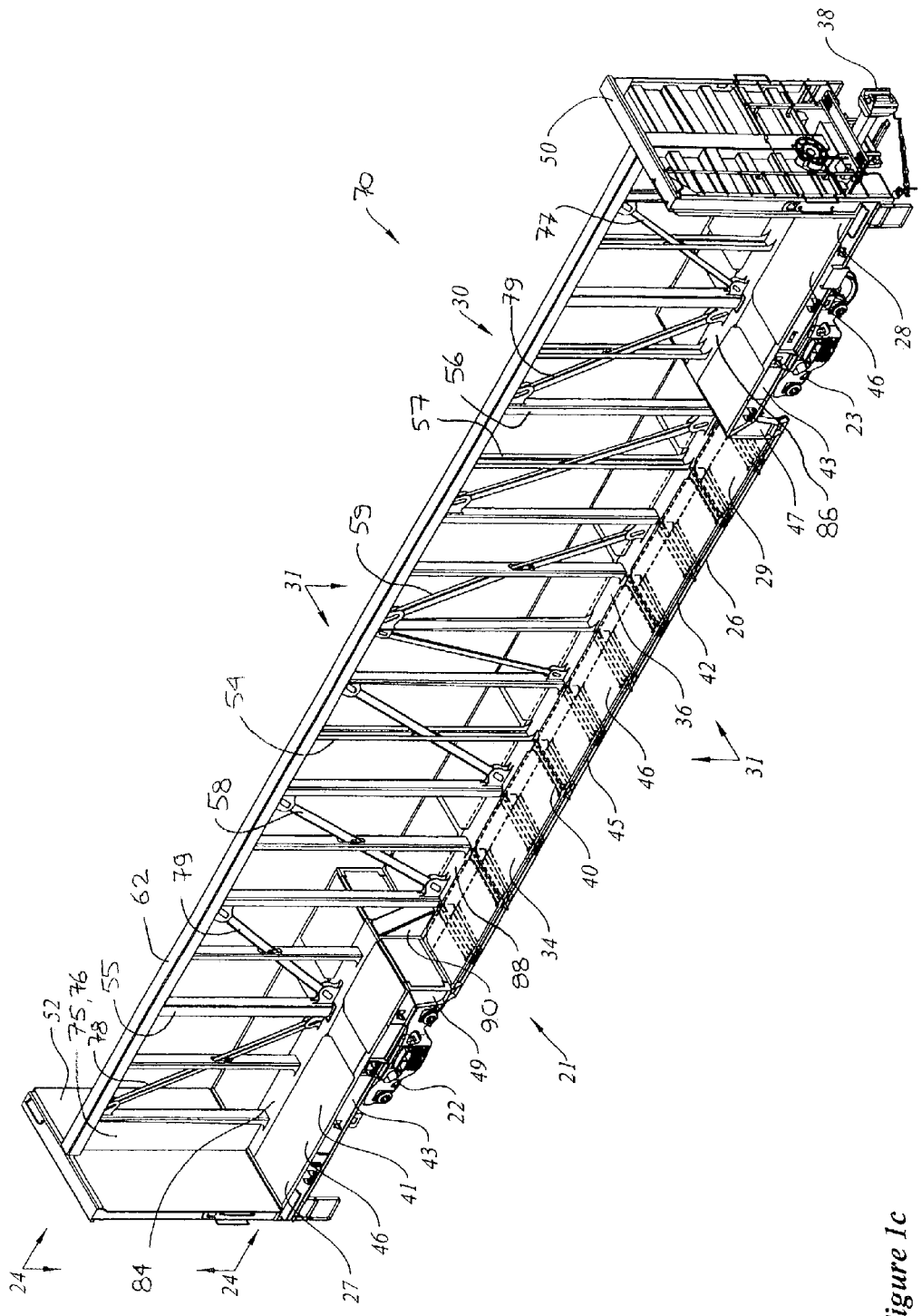
FIG. 1c shows an isometric, general arrangement view of an alternate embodiment of a center beam rail road car to that of FIG. 1a, that embodiment having parallel sided posts and a full height top chord without a top truss.
Figure 1D:
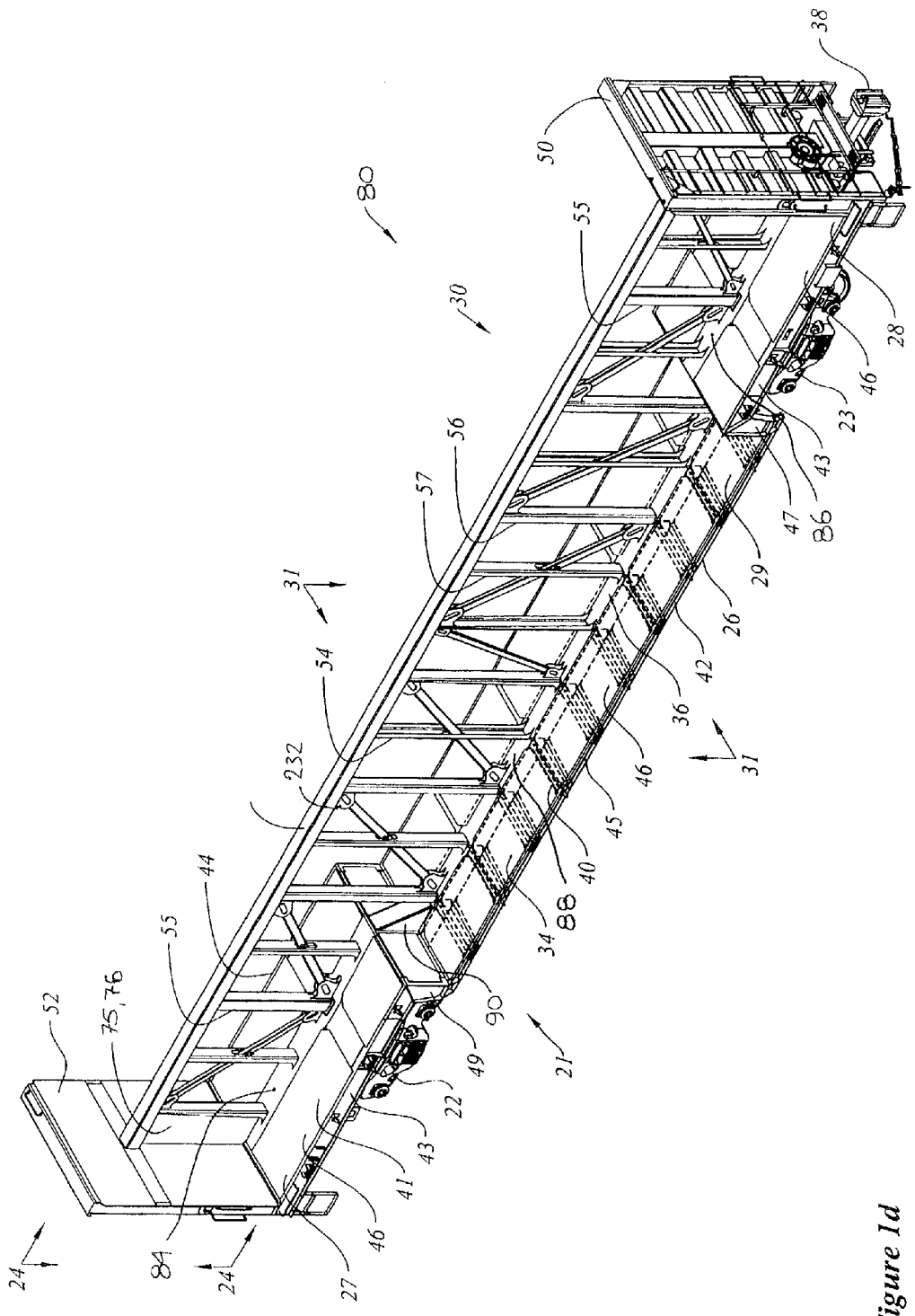
FIG. 1d shows an isometric, general arrangement view of an alternate embodiment of a center beam rail road car to that of FIG. 1a, that embodiment having parallel sided posts and a reduced height top chord.

The following description will address straight post cars, such as cars 70 and 80 of FIGS. 1c and 1d first, to be followed by a description of tapered post cars, such as cars 20 and 90 of FIGS. 1*a* and 1*b*. Description of the variations of possible top truss configurations follows thereafter.

Figure 4B:
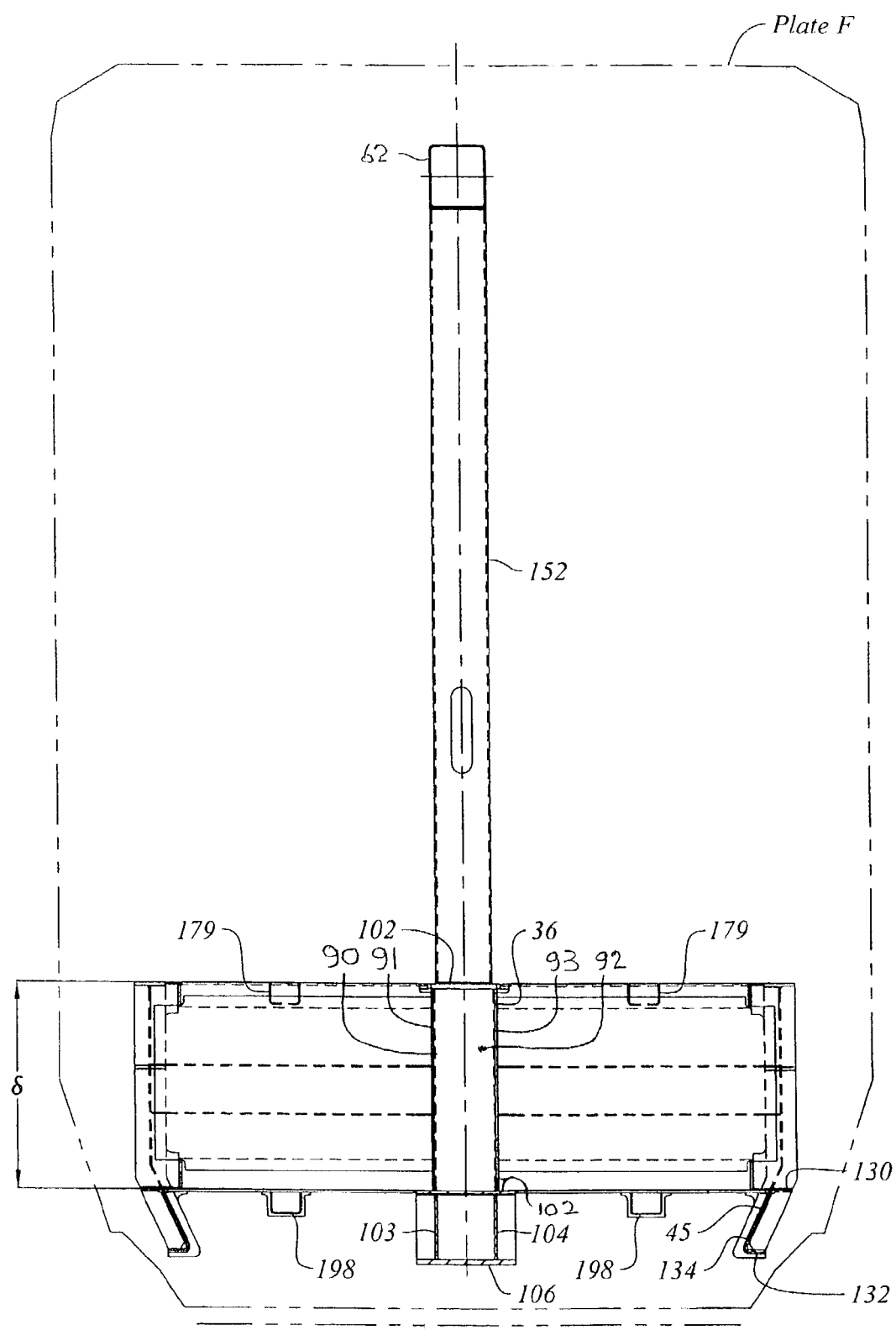
FIG. 4b shows a cross-section of the car of FIG. 2c taken on section '4b—4b' looking toward the transition bulkhead from the well.

FIGS. 4*a* is a sectional view of center beam railroad car 70 taken at mid-span of medial deck portion 29, looking toward the nearest adjacent cross-bearer 40. FIG. 4*b* is a half sectional view facing knee 47 (or 49, as may be). The outline of AAR Plate F is indicated generally as 'F'.

Center sill 36 has a pair of first and second end portions, 84, 86, and a medial portion 88 lying therebetween. Medial portion 88 is joined to end portions 84, 86, respectively, by first and second center sill transition sections, or knees 89, such that a dog leg is formed at each knee and medial portion 88 is eccentrically offset downward relative to end portions 84 and 86. Center sill 36 has an upper horizontal member in the nature of upper flange 102, and a pair of spaced apart vertical shear carrying members in the nature of left and right hand center sill webs 103, 104, thus forming three sides of a box. The fourth side of the box is formed by a lower horizontal member, in the nature of a center sill lower flange 106. Lower flange 106 has an end portion, running along the outboard portion of center sill 36, in a manner similar to a stub sill, indicated in FIG. 4*e* as 108, at a height for mounting upon truck 22 or 23 as the case may be. Outboard portion 108 of bottom flange 106 of center sill 36 terminates outboard of the truck center to allow for the installation of draft gear. An internal web, or false flange, 226, noted below, is mounted between webs 103 and 104 at a height part way between the height of portion and upper flange 102. A rectangular female socket, identified as draft pocket 224, is defined between the inner wall surfaces of items 226, 103, and 104. Draft pocket 224 is of a size and shape for receiving the male end, or shank, of a coupler, such as coupler 38.

Figure 3A:
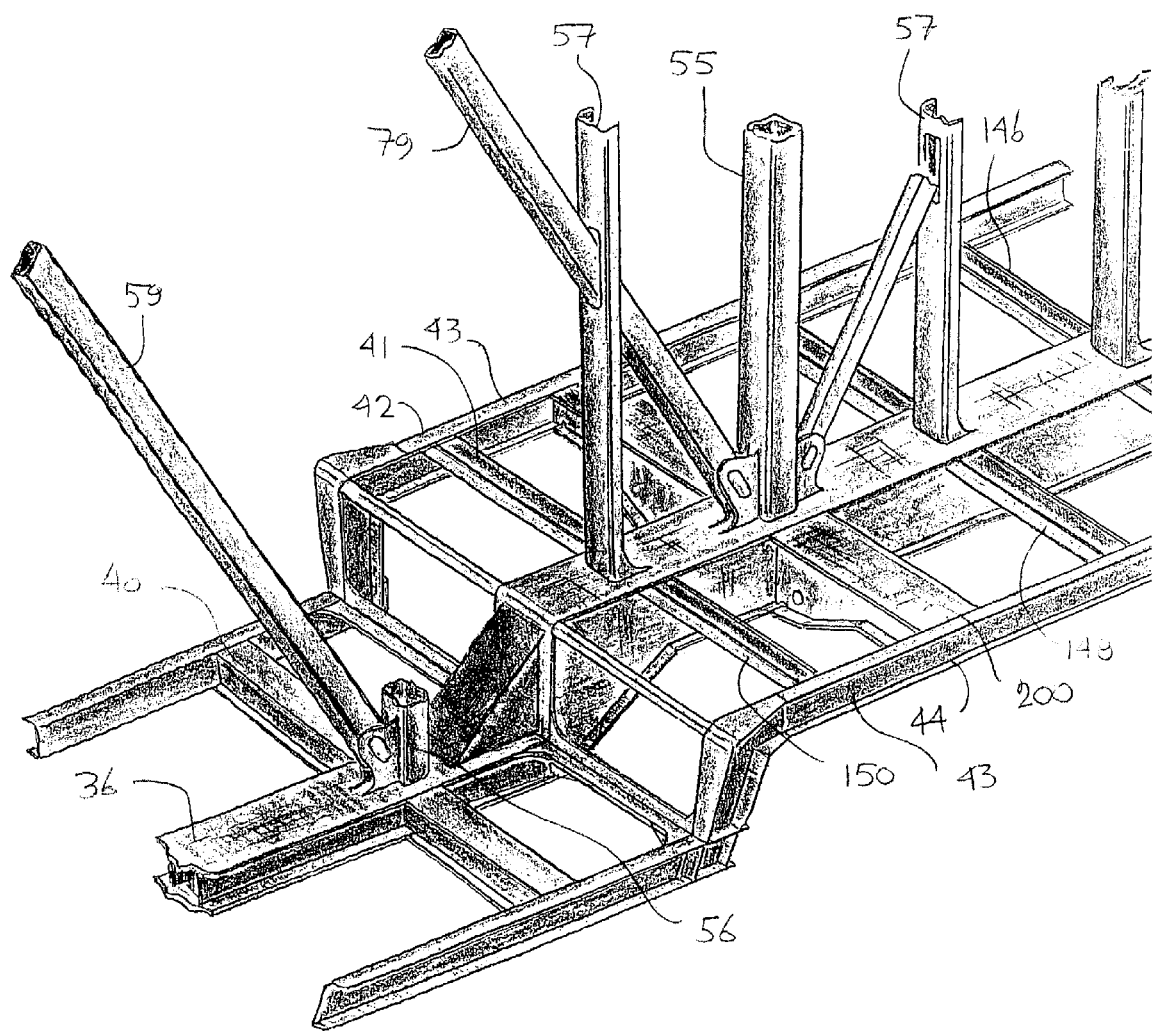
Figure 36:
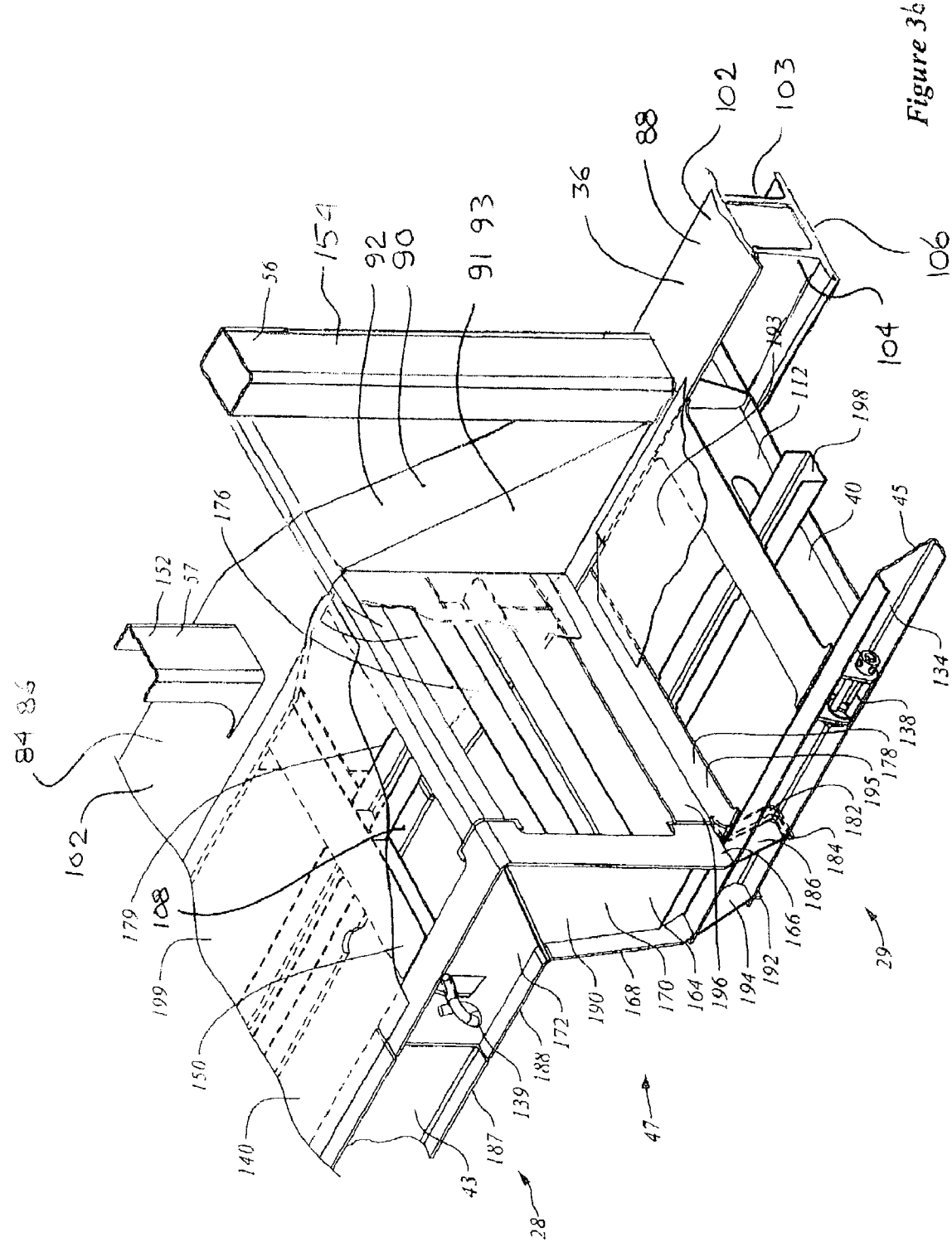
Figure 4C:
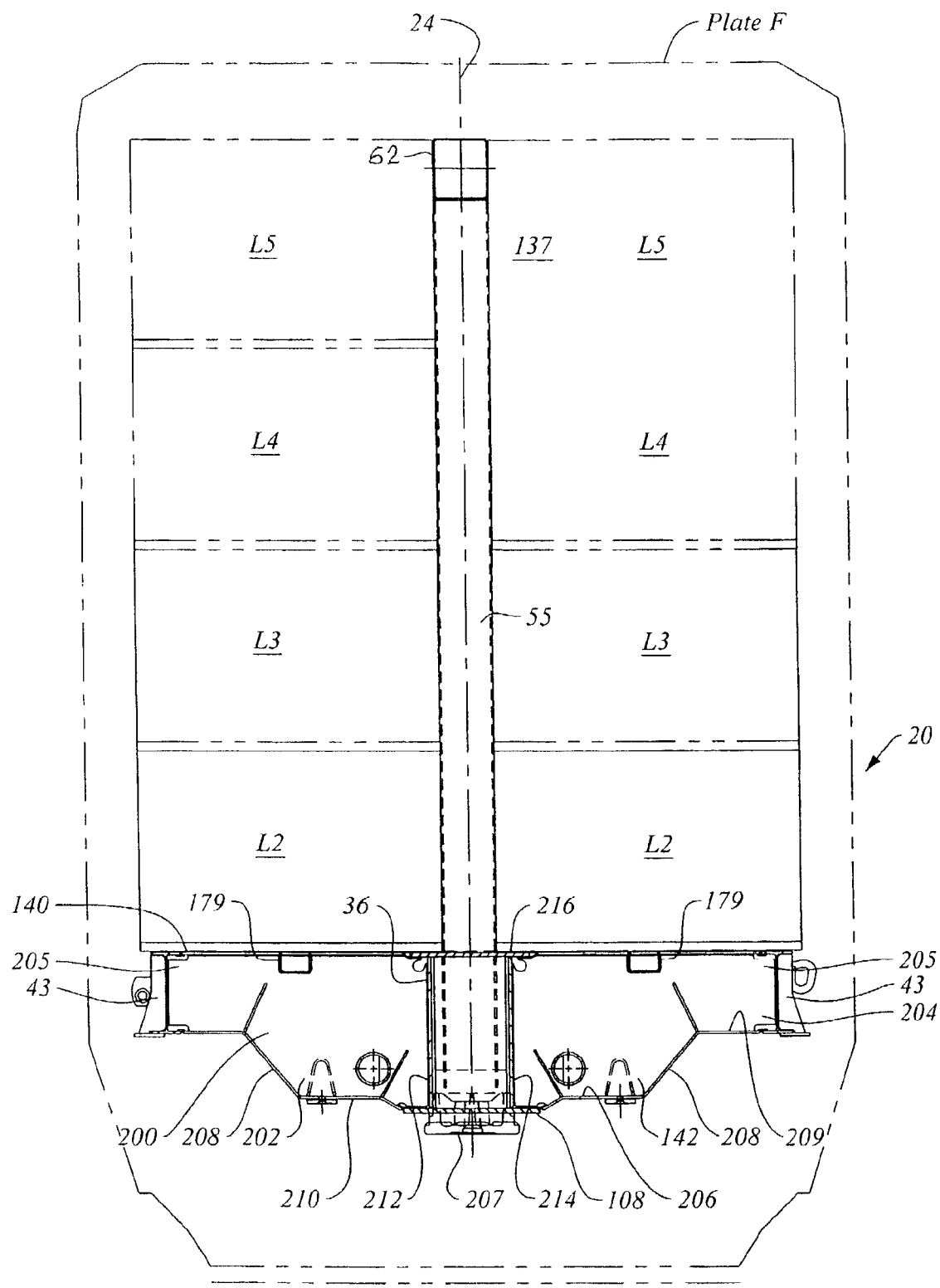
FIG. 4c shows a cross-section of an end deck looking toward the main bolster of the car of FIG. 2c taken on Section '4c—4c'.
Figure 4D:
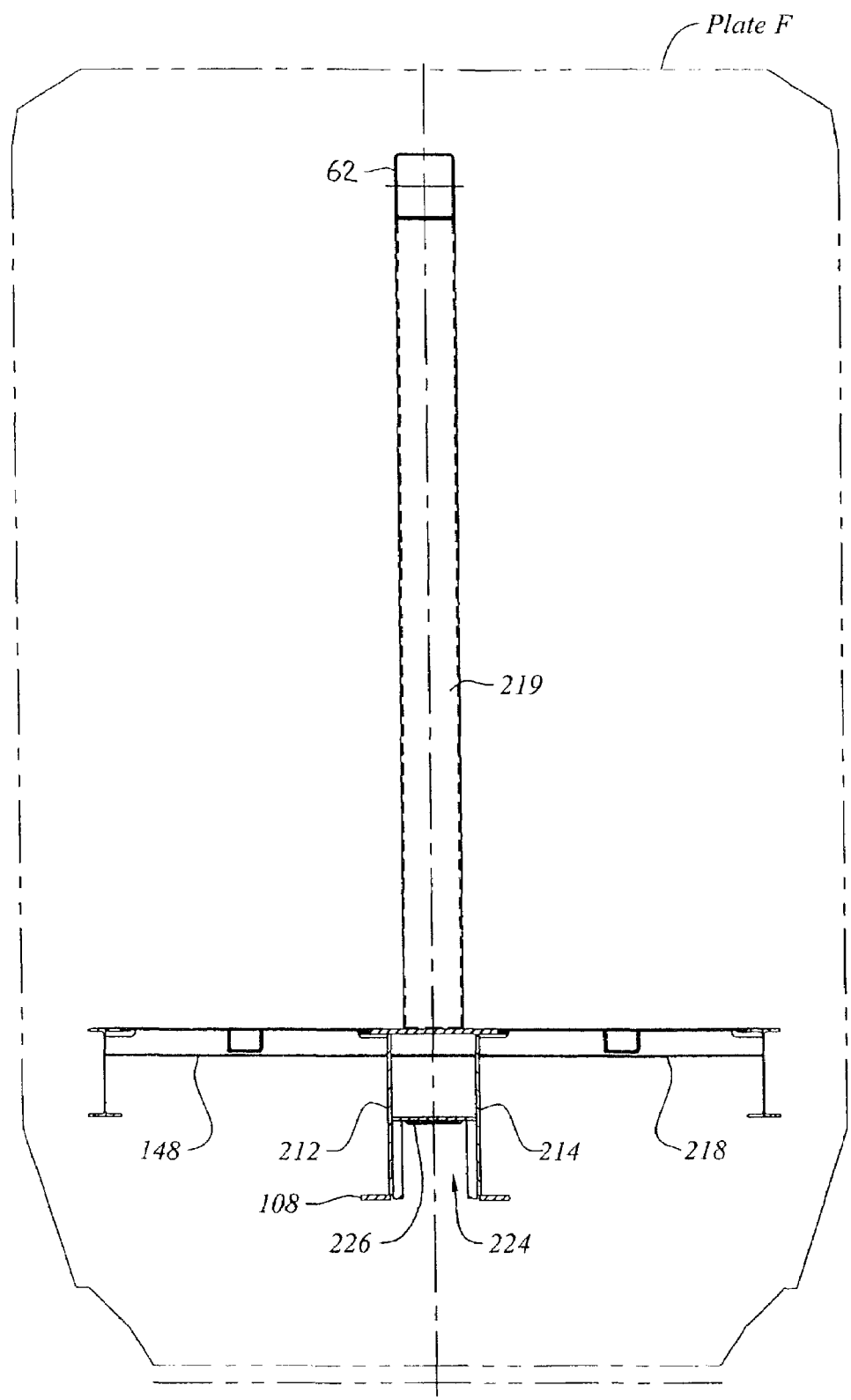
FIG. 4d shows a cross-section of an end deck looking toward a cross-tie of the car of FIG. 2c taken on Section '4d—4d'.
Figure 4E:
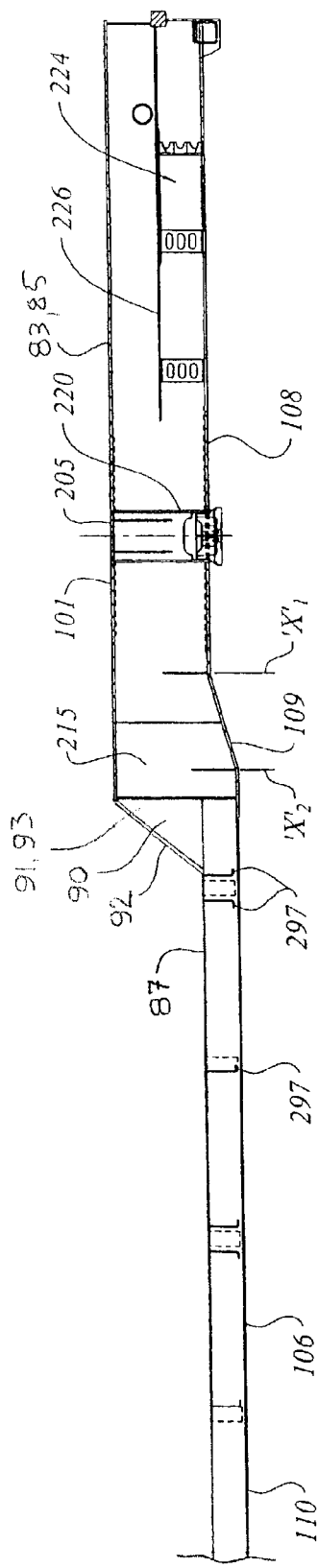
FIG. 4e is a cross-section of the center sill of the railcar of FIG. 1d looking horizontally.

As seen in FIG. 3*a* and 4*e*, the inboard portion of lower flange 106 of center sill 36, descends along the inclined edge of the underside of each transition section, to a level portion 110, running along medial deck portion 29. Medial level portion 110 lies at a height relative to TOR that is lower than portion 108. Lower flange portions 108 and 110 are joined by a smoothly swept transition section 109, as indicated in FIG. 4*e*. Upper flange 102 of center sill 36 also has end portions 83, 85 and a medial portion 87. Upper flange end portions 83 and 85 are carried at a level commensurate with that of the deck sheet of end portions 27 and 28 of deck structure 26. While they can be flush, it is preferred that the deck sheets of the end deck portions overlap the laterally outboard margins of upper flange end portions 83 and 85 to permit a lap joint to be made. Similarly, medial portion 87 of top flange 102 is carried at a level corresponding generally to the level of the deck sheets of medial deck portion 29. The margins of medial portion 87 stand laterally proud of the medial portions of vertical webs 103 and 104 of center sill 36. While medial portion 87 of flange 102 may be flush, and in abutting relationship with the deck sheets of medial portion 29 of deck structure 26, it is preferred that the deck sheets overlap the flanges of the respective side sills, cross-bearers and top flange portion 87 to permit welded lap joints to be made. It is also preferred that there be web continuity of the cross bearers through the medial portion of center sill 36 by the use of internal webs 292 welded inside center sill 36 on assembly. The centroid of the cross-section of the medial portion 88 of center sill 36 is shown as 96. It lies well below the center line 25 of coupler 38 by a distance $D_4$. Centroid 96 may be of the order of 12 to 18 inches above TOR, and is preferably about 14–16 inches above TOR. $D_4$ may therefore be of the order of roughly 16 to 22 inches, preferably 18 to 20 inches.

Generally triangular knee brace portions 90 are formed from center sill web extension portions 91, 93 and inclined top flange transition portion 92, portion 92 being formed to extend as the hypotenuse of the triangular shape so formed. The inboard end of portion 92 is rooted to flange 87 immediately longitudinally outboard of the first vertical post longitudinally inboard of each respective knee. The spacing of web extension portions 91, 93, and the width of flange transition portion 92 is less than the width of posts 73, 74, such that the transition lies shy of the plane of contact of the posts with the lading.

In car 20, the posts along the middle section of the deck structure, designated the "long posts", whether they are channels, H-shaped, or four sided seamless steel tubes of rectangular cross section (as illustrated in FIG. 3*a*), and whether they are tapered or parallel sided, extend fully from the level of the deck sheets of the medial portion of deck structure 26 to the top chord, thus presenting a continuous, laterally outboard facing smooth surface against which to secure the lading.

It will be noted that in this example, the side flanges of the long posts, namely those facing laterally outward toward the lading, extend from the top chord 62 downward to a level lying below the level of the top flange of the end portion of center sill 36, below the level of the upper wall of the draft pocket, below the level of the centerline 25 of the coupler, and below the level of the bottom flange of the end portion of center sill 36.

Figure 7A:
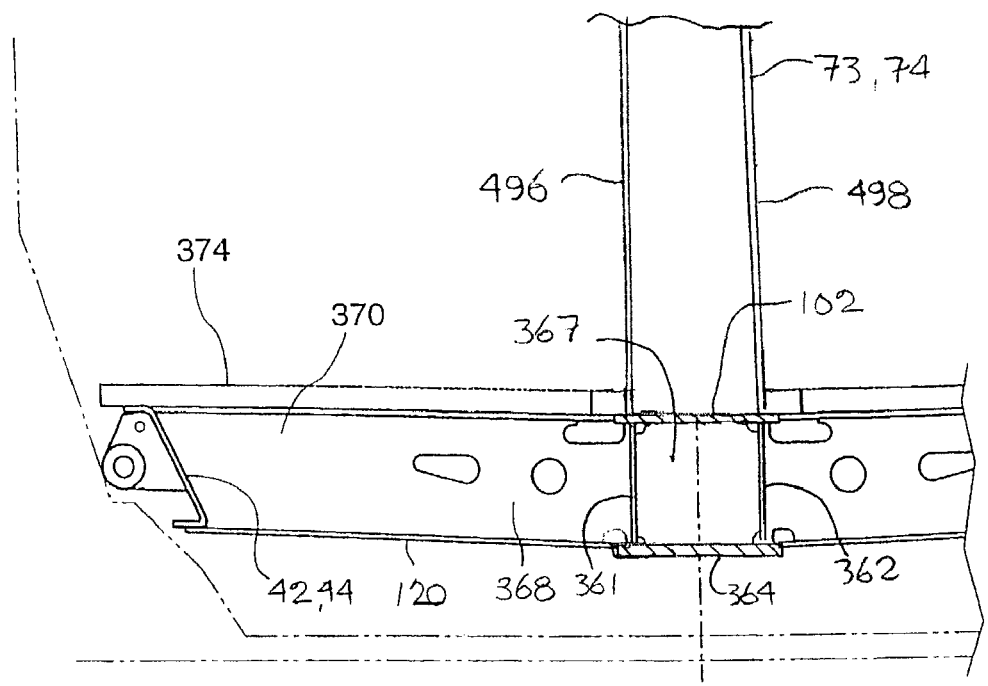
Figure 7B:
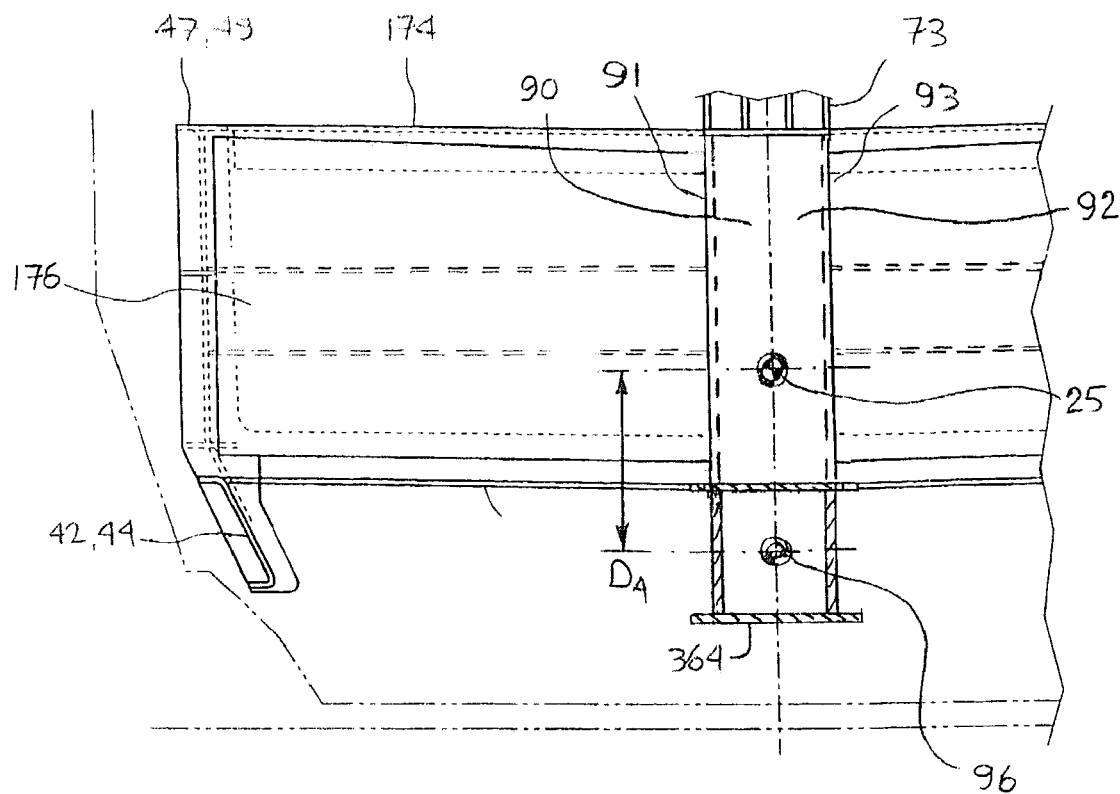
FIG. 7b shows an enlarged detail of FIG. 6b.
Figure 7C:
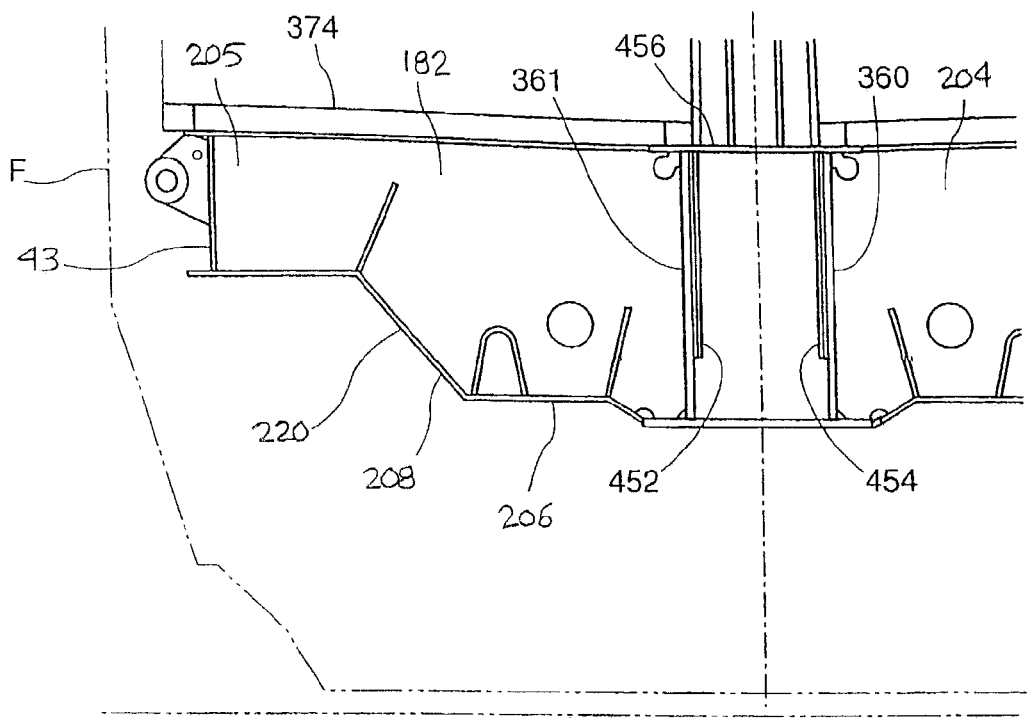
FIG. 7c shows an enlarged detail of FIG. 6c.
Figure 7D:
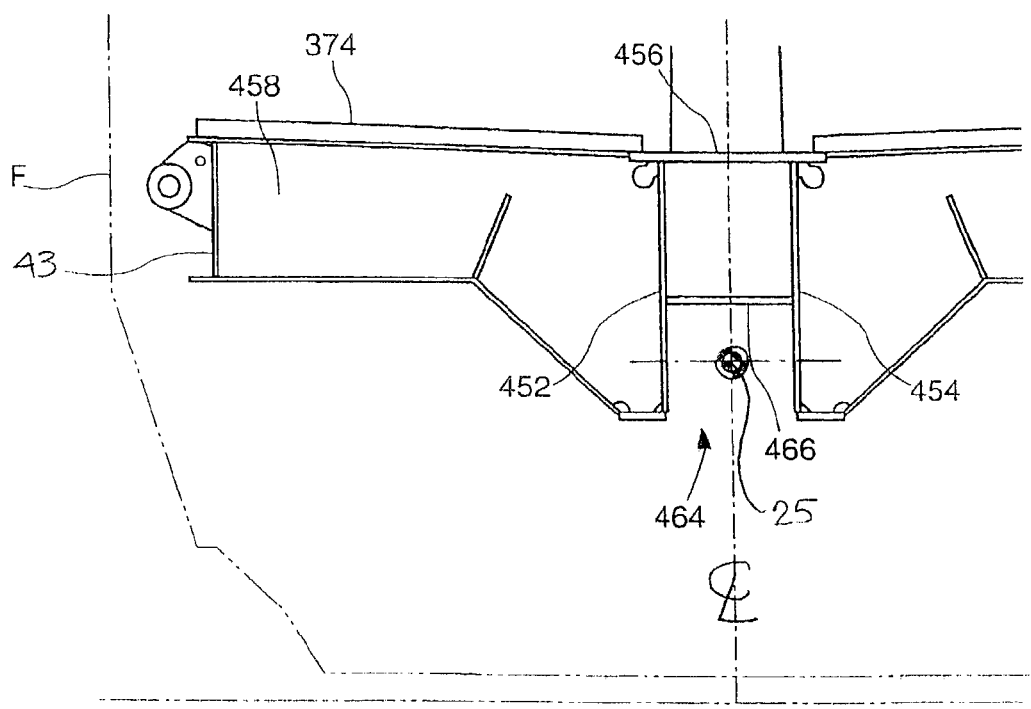
FIG. 7d shows an enlarged detail of FIG. 6d.
Figure 7E:
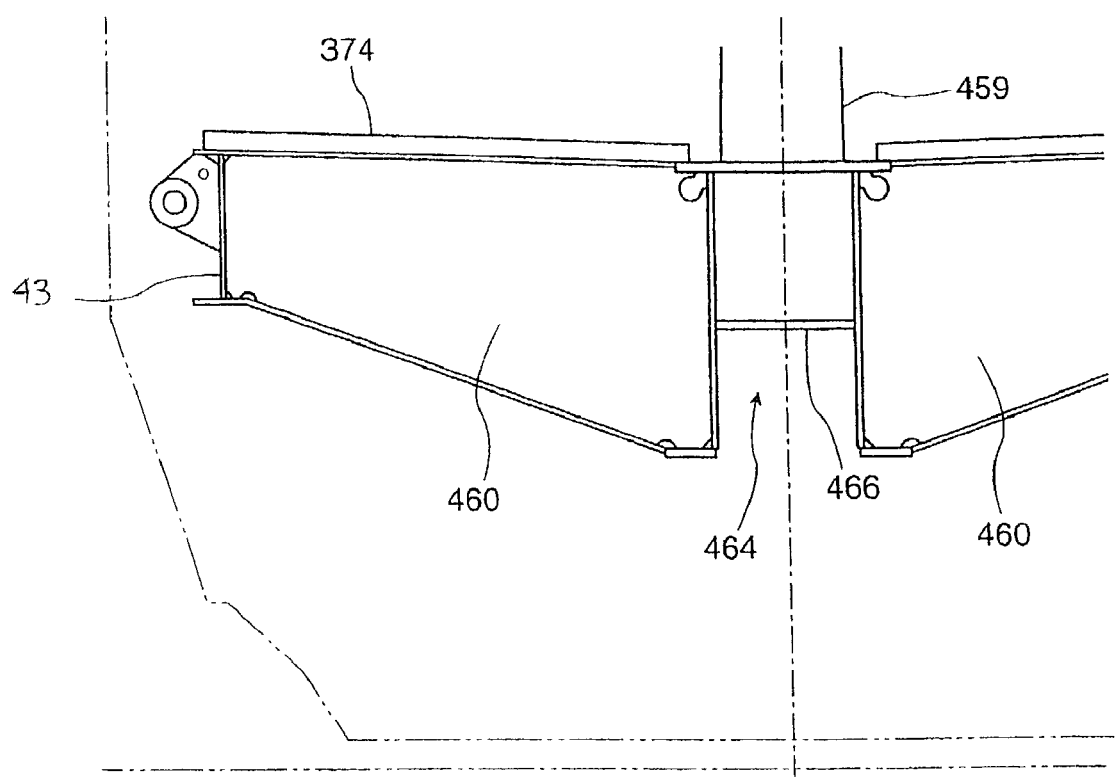
FIG. 7e shows an enlarged detail of FIG. 6e.
Figure 7G:
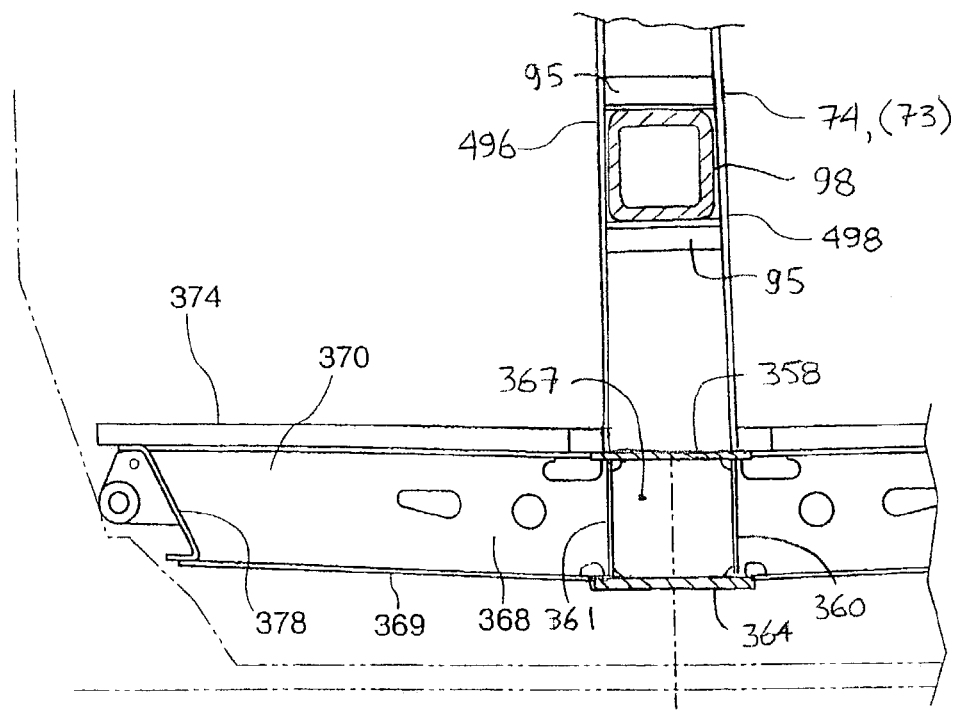
FIG. 7g shows a detail of the embodiment of FIG. 2b taken on a section corresponding to FIG. 6b.
Figure 7F:
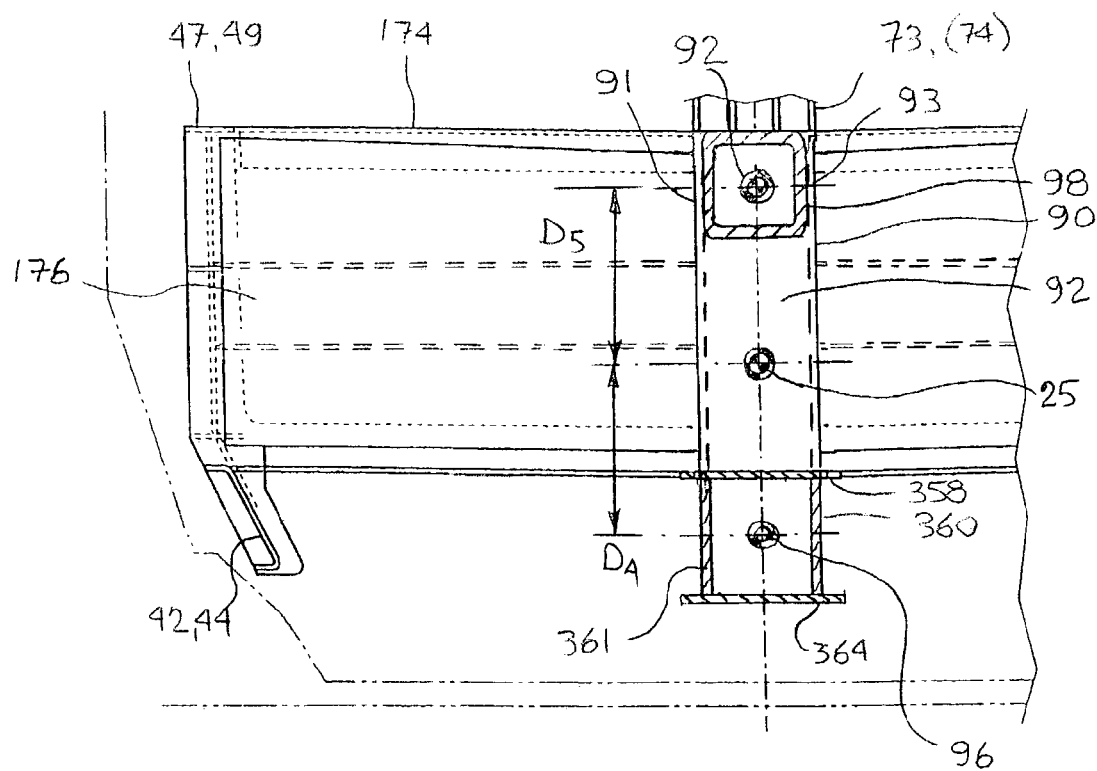

In the embodiment of FIGS. 2*b*, 7*f* and 7*g*, car 100 differs from car 20 insofar as car 100 has a longitudinally extending structural member in the nature of a reinforcement identified as column member 98. Column member 98 is spaced upwardly from the medial portion of center sill 36. Column member 98 runs between knees 47 and 49, and provides a longitudinal through connection to the end portions of center sill 36. Column 98 may have a circular cross section, but is advantageously a closed hollow section, preferably a rectangular steel tube or a size to pass through the vertically extending webs of such ones of posts 56, 57, 73 or 74 as may stand between knees 47 and 49. The centroid 92 of the cross section of column member 98 may advantageously, and preferably lie at a height as high (relative to TOR) as the centerline 25 of couplers 38, and may also lie at a greater height. The vertical distance between coupler centerline 25 and centroid 92 is indicated as $D_5$. $D_5$ is preferably greater than zero, and may be in the range of 12–18 inches, more advantageously in the range of 14–16 inches. It is desirable that $D_5$ be with 30% of the magnitude of $D_4$, and that the product of cross section area, times distance be such that $A_{92} \times D_5$ be within 50% of $A_{96} \times D_4$ where $A_{92}$ is the area of the section of column member 98 and $A_{96}$ is the area of center sill 36 at the corresponding section. Column 98 is preferably connected to each of the various posts through which it passes, angle brackets 95 being provided to permit larger weldment fillest to be made. Diagonal members are provided as before between the adjacent posts, the diagonal members terminating above and below column member 98. Column member 98 may tend to enhance resistance to longitudinal squeeze loads, and to reduce the stresses carried by the knees of center sill 36.

As seen in FIGS. 3*a*, 4*a*, and 4*b*, in the medial, or drop deck portion of the car, namely that of medial deck portion 29, there are cross-bearers, 40, as noted above. The endmost cross bearer of portion 29 next to knee 47 is indicated as 112. Cross bearer 112 is typical of the cross bearers of medial deck potion 29. Cross bearer 112 is mounted to, and extends transversely away from, center sill 36. Cross bearer 112 has a vertically standing web, 114, and an upper flange 116. Flange 116 lies flush, and co-planar, with the adjacent outboard margin of upper flange portion 87 of center sill 36. (That is, flush with the portions of flange portion 87 that stand outwardly proud of vertical webs 103 and 104). As viewed from above, the join between flanges 115, 116 and flange portion 87 is smoothly radiused.

Web 114 has a tapered portion 118, and a continuous lower flange 120 that follows the profile of the lower edge of portion 118 between side sill 42 (or 44, as may be) and center sill 36. Each upper flange 116 of each cross bearer 112 may have mounted on it a riser 124 that is tapered in profile, being shallowest closest to the car centerline 25, and deepest at its outboard extremity so that lading borne thereon will tend to have an inward slant. As viewed from above, the distal, or outboard, end of upper flange 116 and lower flange 120 are flared and radiused to meet the inner face of longitudinally extending medial side sill portion 126. The upper flange 130 of side sill portion 126 lies flush, and co-planar with, upper flange 116, the outboard end of riser 124 overlying side sill flange 130. As noted above, those portions of flange 87, flange 116, and flange 130 that remain exposed provide a peripheral lap surface upon which floor sheets 127, 128 can be welded, providing a shear connection between those elements.

As seen in FIGS. 4*a* and 4*b,* medial side sill portion 45 has a channel-like profile, having top or upper flange 130, noted above, a bottom or lower flange 132, and a back, or web, 134. However, while top flange 130 and bottom flange 132 lie in parallel horizontal planes, web 134 does not stand perpendicular to them, and does not stand vertically perpendicular. Rather, web 134 is canted upward and outward at an angle δ measured from the vertical, such that flange 130 is displaced, or skewed, or stepped, outward relative to flange 132. As seen in FIG. 4*a,* the extent of this outward positioning is such that both upper and lower flanges fall within the envelope of Plate C. A load securing device in the nature of a winch 138 is mounted to the outboard face of web 134 for tightening strapping 136 about the lading 137. The slanted incline of web 134 permits the center of rotation of winch 138 to be drawn inward toward the center line of the rail car, be it 20, 70, 80, or 90, thus tending to permit the medial portion 29 of deck structure 26 to be carried at a lower height than might otherwise be the case.

Straps 136 (FIG. 4*a*) are provided to wrap about the load, and to be tightened by a winch type of mechanism, noted above as 138, or similar tightening device mounted to the respective side sill 42 or 44. In the case of the embodiments of FIGS. 1*a* and 1*b,* there are winches along both side sills of the car, and the webs are tightened to the outboard extremities of the wings of the top truss, or to intermediate height fastening points on the various posts of array 54. In the case of the embodiments of FIGS. 1*c* and 1*d,* the web may be longer, and may pass fully over the lading to be anchored on the far side of the car, either at another winch, if provided, or at a rigid anchor point provided along the opposite side sill. An operator may then turn winch 138 with the aid of an extension bar or handle (not shown). When tightened, straps 136 bear against the outboard, upper corners of the L5 bundles, tending to force their inboard, upper regions, indicated tightly together, and tending to cause the L5 bundles to be drawn down tightly atop the L4 bundles, thus tightening the stack from L1 to L5. Straps 136 are anchored on the far side of the car to load securing, or anchoring, means in the nature of bent-rod hooks 139.

The construction of the embodiment of end deck portion 28 (or 27) of car 70 or 80, is shown in FIGS. 1*c,* 1*d,* 3*a* and 4*c*. Main bolster 200 (FIG. 4*c*) extends laterally outward from the main sill 36 at the longitudinal station corresponding to the truck center, whether of truck 22 or 23, the car being symmetrical about its mid span transverse plane 31. The lower flange 208 of bolster 200 (FIG. 4*c*) is formed to follow an upwardly and outwardly stepped profile to clear the wheels of truck 22 (or 23) through the turning envelope of the truck relative to the car body generally. End deck structure 140 (FIG. 3*a*) includes a cross tie 146 located roughly 8 ft longitudinally outboard of main bolster 200, (FIG. 4*c*); a cross tie 148 located roughly 4 ft. longitudinally outboard of main bolster 20*c;* and a cross tie 150 (FIG. 3*b*) located roughly 4 foot longitudinally inboard of main bolster 200. A side sill end portion is indicated as 43 (FIG. 3*a*), and extends along the transversely outboard, or distal, ends of main bolster 200, and cross ties 146, 148 and 150 (FIG. 3*a*).

Knee 47 (or 49 of opposite hand) is located at the transition, or step, between end portion 28 (or 27) and medial deck portion 29. Knee 47 is located at a mid-bay longitudinal station between the longitudinal stations of formed post 152 and post 154 (FIG. 3*b*). As above, the dropped deck portion of the deck (that is, medial deck portion 29) ends at left and right hand knees, indicated as 47, 49. Other than being of opposite hands, they are of identical construction. The medial portion of the side sills, 45, has been described above. The end portions 43 are formed from deep wide flange beams. As noted above, in the preferred embodiment the depth of the beam may be determined at the lower flange by the height required to give adequate clearance over the wheels when the car is fully loaded and cornering, and the upper height limit of the upper flange corresponds to the 33N" (+/−Λ") height increment of the layers of bundles at the step in the deck at knees 47 and 49. End portions 43 terminate, at their inboard ends at knees 47 and 49, at a corner, 160, that is enclosed with an angled end gusset 162 running on the diagonal between the upper and lower flanges of end portion 43.

The upright portion, 164 (FIG. 3*b*) of side sills 42 and 44, has a front flange member 166 facing the well, a rear facing flange member 168 facing the adjacent truck, an irregular quadrilateral lower web portion 170 (FIG. 3*b*) and a trapezoidal upper web portion 172. Front flange member 166 is a formal metal plate, with one leg mounted in a vertical plane. The metal plate is trimmed to provide smoothly radiused transitions to mate with an upper cross member 174, a medial bulkhead stiffener 176, and a bottom cross member 178. At its lower extremity front flange member 166 has a sill engagement fitting, or seat, in the nature of a hook-shaped cut-out conforming to the inward profile of medial side sill portion 45. That is, the cut-out conforms to the medial side sill portion, the outboard edge of the inwardly curving leg 182 conforms to the back, or web, of the medial side sill portion, and the smoothly curved toe 184 conforms to the bottom flange of the medial side sill portion. A gusset 186 seats within medial side sill portion 45, in the plane of front flange member 166, providing flange continuity to complete the section. The upper bent back leg of front flange member 166 extends in the plane of the upper flange of side sill and portion 43. The inward cant of the bottom portion of knee 47 (or 49) is such that medial decking portion 29 is narrower than end decking portions 27 or 28. That is, the laterally outboard edge of the upper flange of medial side sill portion 45 lies closer to central plane 24 than does the laterally outboard edge of end side sill portion 43, the margin of the lading supporting decking of medial decking portion 29 lying laterally inboard relative to the laterally outboard margin of end decking portion 27 or 28.

Longitudinally outboard rear facing flange member 168 is made from a bent plate cut to the desired profile. An upper leg 188 of member 168 runs along the lower edge of upper web portion 170 to abut the lower flange 187 of side sill end portion 43; and a lower leg 190 that runs downwardly from the end of leg 188 on an angle along the edge of quadrilateral web portion 170. Leg 190 also has an inwardly tending toe 192 cut to a similar profile to leg 182 and toe 184. A gusset 194 seats within the end section of side sill medial section 45 in the plane of toe 192, in a manner similar to gusset 186.

As thus described, the upright portion of knee 47, (or 49) is tapered, being narrower at the bottom and wider at the top. That is, the width measured between items 166 and 168 at the level of lower flange 187 of side end portion 43 is greater than the width measured between items 166 and 168 at the level of upper flange 130 of side sill portion 45.

Lower cross member 178 is a fabricated T-section having leg 196 lying in a vertical plane, perpendicular to the longitudinal centerline of car 20, between side web 103 (or 104) of main sill 36 and the trimmed transition of front flange member 166. The horizontal other leg 195 of member 178 lies in a horizontal plane between, and is welded to, the outer edge of bottom flange 106 of main sill 36 and the juncture of the back, or web 134, and upper flange 130 of medial side sill portion 45. An intermediate bulkhead sheet 180 is welded between web 104 (or 103 as may be) and overlapping flange member 166, the vertical leg of angle section member 174, channel stiffener member 176, and leg 196 of lower cross member 178.

A stringer in the nature of a U-section with the legs orientated up, longitudinally extending stiffening member, in the nature of a channel 198 extends from a hangar bracket web mounting on the underside of member 178 to the first cross-bearer 112. The lower framework of the medial deck portion, namely that extending between the lower flange of main sill 36, the top flange of side sill medial portion 45, and the top flanges of the cross-bearers of medial portion 29 and of channel 198 are overlain by, and welded to, the deck sheets 193 of medial portion 29.

Another longitudinally extending stiffener, in the nature of a channel member 179 is mounted between bolster 200, cross-tie 150 and cross member 174 about half way between main sill 36 and side sill end portion 43. The upper flange 102 of main sill 36 is carried at a height corresponding to the height of the end deck portions 27 or 28. The overlying shear panel sheet 199 lying at that height is welded to the upper flange 102 of main sill 36, overlaps the upper flange of side sill end portion 41 (or 43), and overlies the upper flanges of the cross-ties and bolsters of end decking portion 27 (or 28), and the upturned toes of channel member 179.

FIG. 4c shows the deep main bolster 200. Main bolster 200 has left and right hand arms 202 and 204 which each extend from the root, that is the laterally inner portion, of bolster 200 adjacent to center sill 36, to outer, or distal extremities 205 adjacent to side sill end portion 43. The root of main bolster 200 at the juncture of main sill 36 has a depth extending from the lower flange end portion 108 to the height of the upper deck. Distal extremities 205 have the same depth of section as side sill end portion 43. The lower surface of main bolster 200 is defined by bottom stepped flange 210 which extends from the root to distal extremities 205. Stepped flange 210 has inner shoulders 206 proximate to center sill 36, outer shoulders 209 and sloped intermediate portions 208 extending between inner shoulders 206 and outer shoulders 209. At this section, namely the longitudinally outboard section of main sill 36 the walls or webs, 103, 104 of main sill 36 are identified as plates 212, 214. A heavier top flange 216 forms the top plate of the end portion of main sill 36.

FIG. 4d shows the second last cross-tie 148 located at the longitudinal station longitudinally outboard of post 55 and main bolster 200. The coupler and draft gear pocket, indicated generally as 224 is defined in the bounded space formed by welding an internal web or cross plate 226 between plates 212 and 214 at a height partway between the height of lower flange portion 108 and upper flange 102. Plate 226 serves as the draft pocket cap plate, or top flange, of the draft pocket portion of main sill 36 at the height at which the top flange of main sill 36 might tend otherwise to be but for the depth of the step height at knees 47, 49. Pocket 224, and main bolster 200 are shown in FIG. 4e.

Each of center beam cars 70 and 80 has an array of center beam web posts, indicated generally as 54. As shown in FIG. 3b, a horizontal cross-section of post 56 generally has a hollow rectangular shape and has smoothly radiused corners as received, typically from a rolling mill or other roll forming or pressing apparatus. Post 57, by contrast, has a horizontal cross-section of a C-shaped channel, with its web being the back of the C, and the flanges being a pair of legs extending away from the back. Post 57 is preferably a roll formed sheet, or pressing, having smoothy radiused corners. Posts 56, 57 (and 55) thus present smooth, planar surfaces to the lading with smoothly radiused corners. Each diagonal member, whether struts 77, 78 (FIG. 2a) or braces 58, 59, 79, has a first end rooted at a lower lug such as lower lug 230, welded at the juncture of one of posts 56 (or 55) with main center sill 36; and a second diagonal end rooted in an upper lug 232 (FIG. 2a) at the juncture of another adjacent post 56 and top chord 62. Midway along its length, the diagonal member, whether struts 77, 78 or braces 58, 59, 79 passes through the post 57 intermediate the pair of posts 56 (or 55 and 56) to which the diagonal member is mounted. It is intended that the respective sides of posts 55 and 56, and flanges of posts 57 lie in the same planes on either side of the central plane 24 of car 20 to present an aligned set of bearing surfaces against which lading can be placed. The side faces of posts 56 lie roughly at right angles to end deck portions 27, 28 and medial deck portion 29. This facilitates the placement of generally square cornered bundles in stacks in the bunks defined to either side of central web assembly 30.

Each post 55 is, as noted above, a square steel tube extending upwardly from the deck above the respective truck centers. Post 55 is narrower (in the longitudinal direction of car 20) than the spacing of the webs of main bolster 200, and consequently narrower than main bolster web continuation plates 201, 203 mounted within main sill 36 in line with the bolster webs at the truck center. Similarly, post 55 is narrower (in the lateral direction across car 20) than the spacing of that portion of webs 103 and 104 of main sill 36 extending outboard of '$X_1$', past main bolster 200 toward coupler 38, namely plates 212, 214 defining the width of the draft pocket. Top flange 102 of main sill 36 has an access opening in the nature of a rectangular cut-out 101 at the truck center. Post 55 is welded, at its lower, or base end, to a matching rectangular plate 105 that mates with cut-out 101. A pair of first and second web continuation plates in the nature of gussets 207, 209 extend in longitudinally oriented vertical planes from the bottom side of plate 105. A pair of first and second flange continuation plates, in the nature of gussets 211 and 213 extend in transversely oriented vertical planes from the bottom of plate 105. Gussets 211 and 213 are welded along the side edges of gussets 207 and 209. Gussets 211 and 213 extend beyond gussets 207 and 209 to meet web continuation plates 202 and 204. This structure provides longitudinal and lateral reinforcement to the built-in connection of post 55 to main sill 36.

Figure 4F:
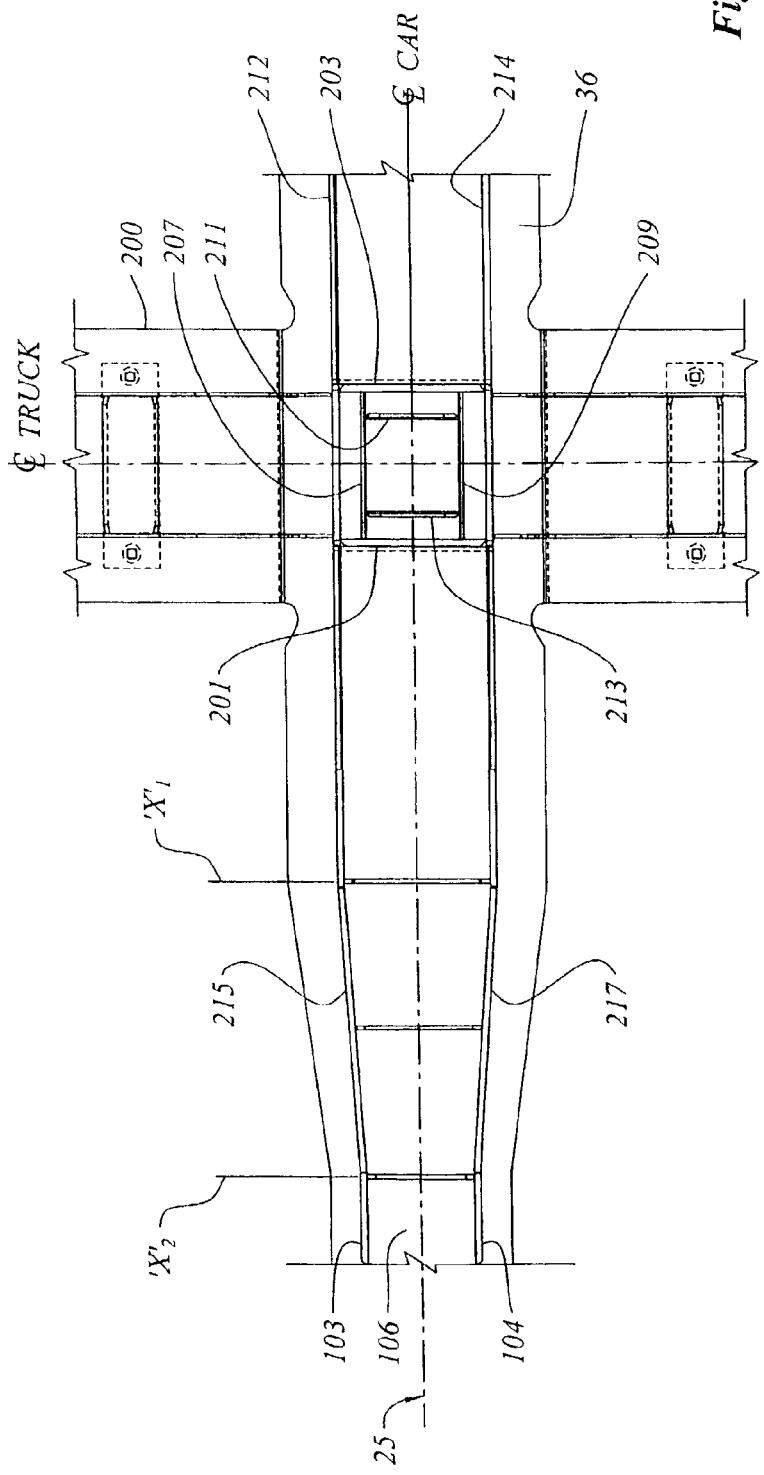
FIG. 4f is a partial top view of the center sill of FIG. 4e, in a region inboard of the main bolster with top flange removed.
Figure 4G:
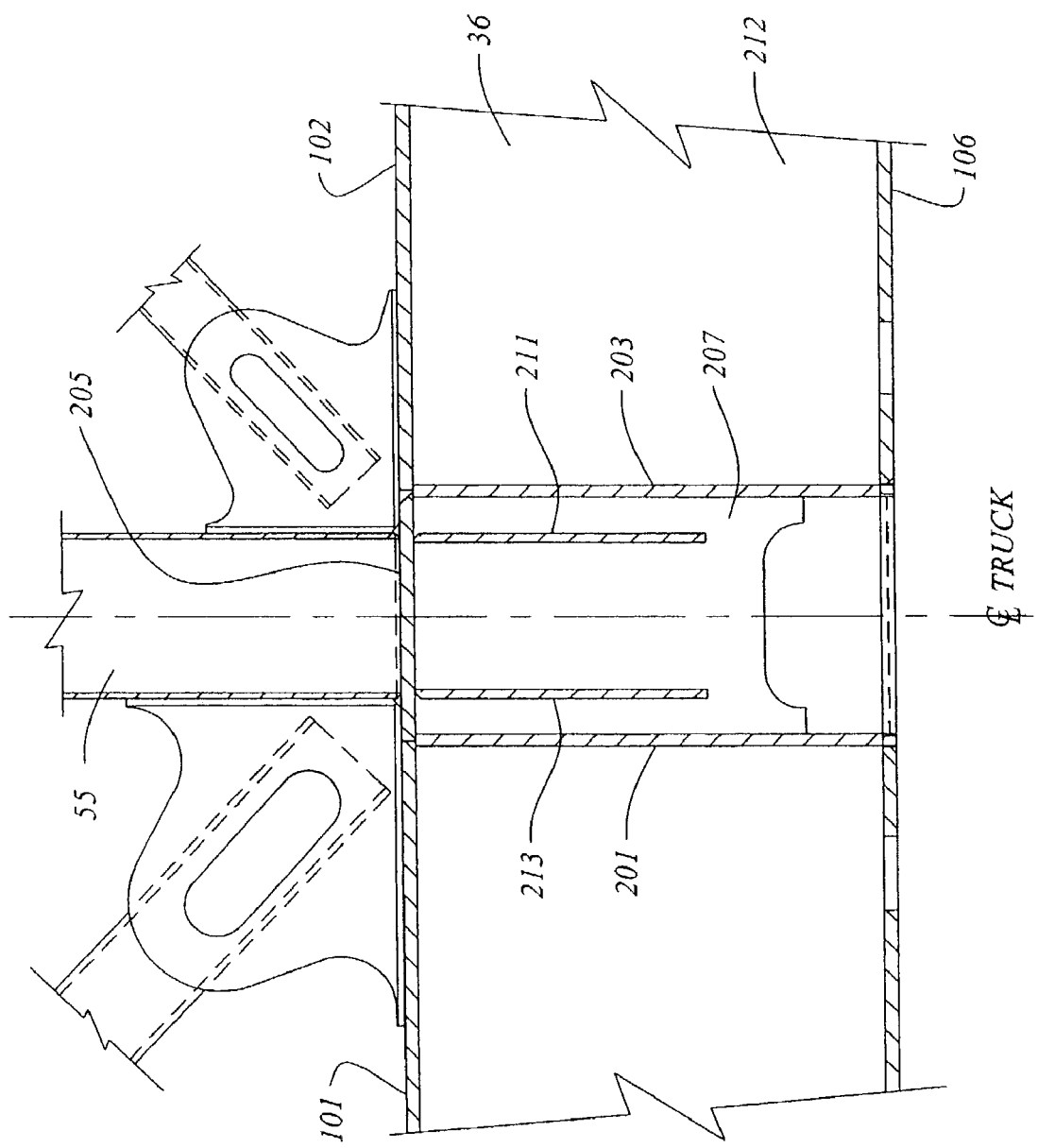
FIG. 4g is a partial sectional view of a detail of the center sill of FIG. 4f taken at the main bolster.
Figure 4I:
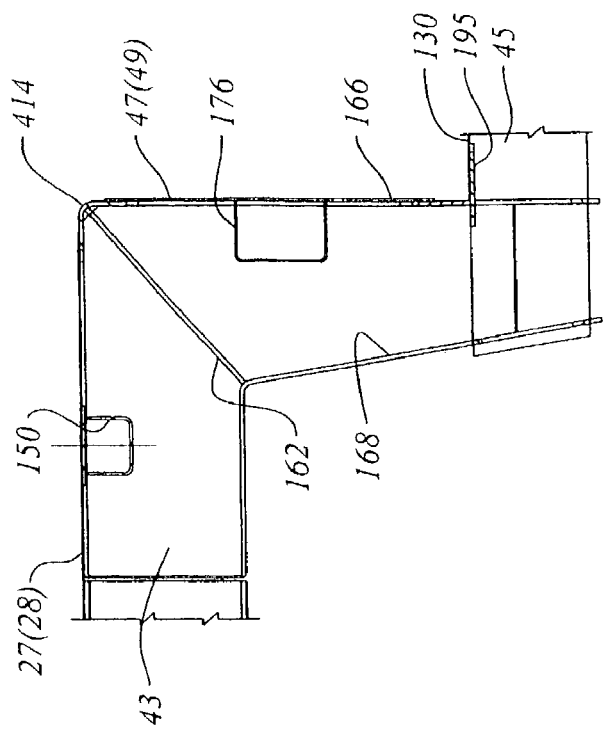
FIG. 4i shows a cross section of a deck knee of the rail car of FIGS. 1c or 1d.
Figure 4H:
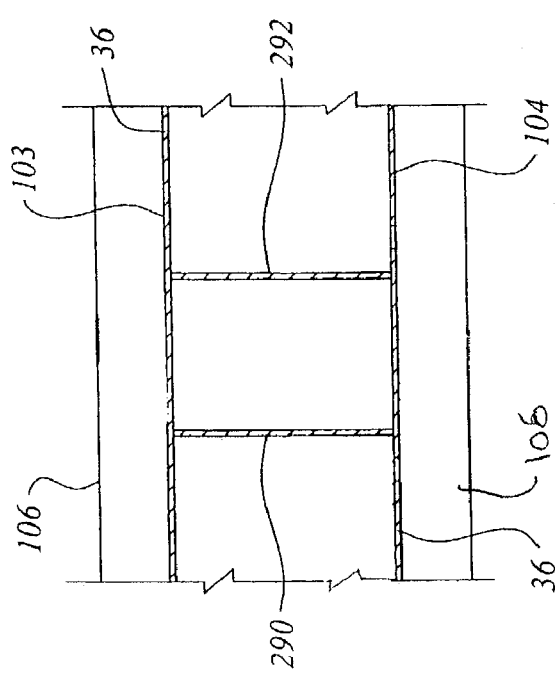
FIG. 4h is a cross section of a portion of the center sill of FIG. 4e as viewed from above.
Figure 5A:
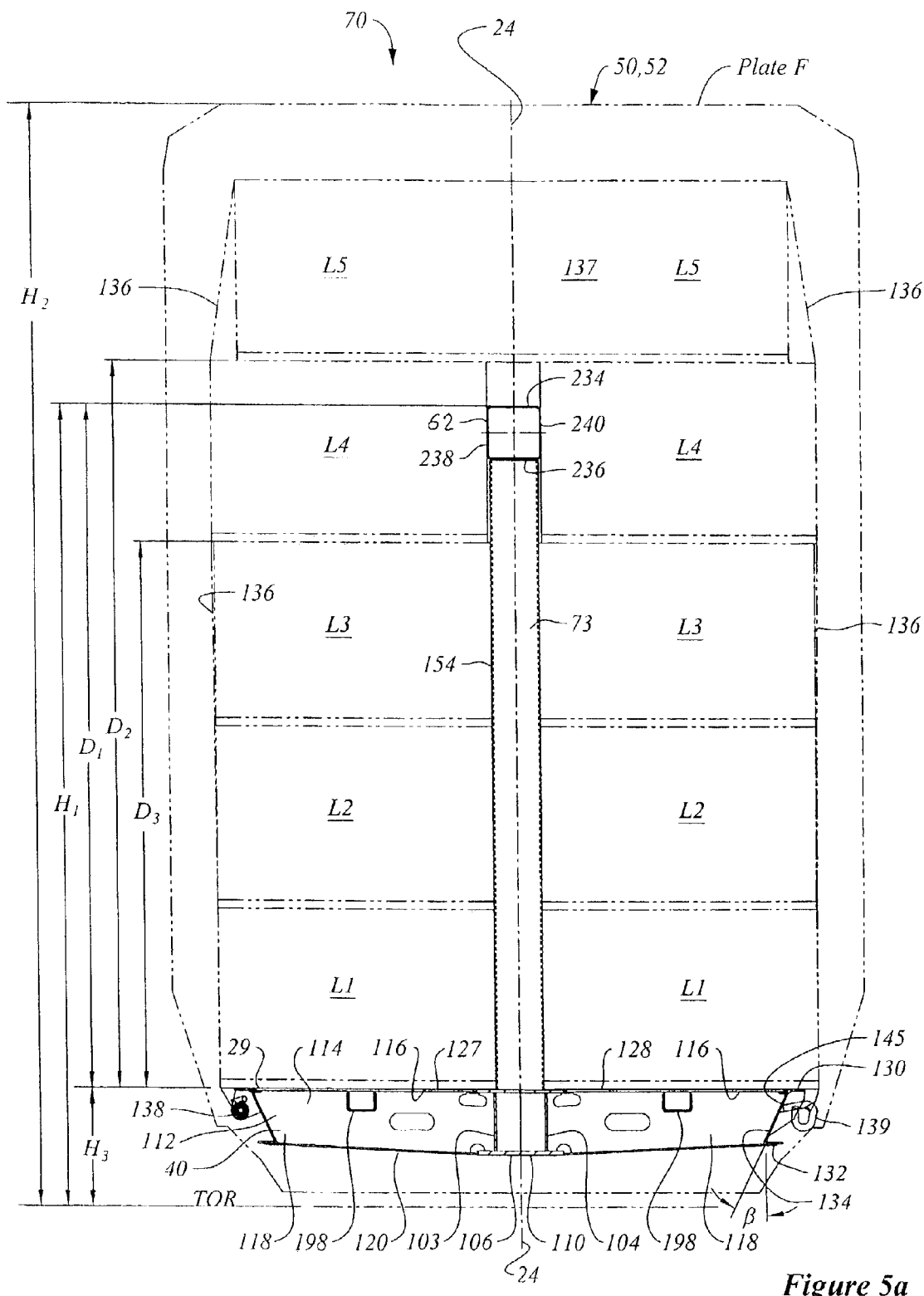
FIG. 5a shows a cross-section of the car of FIG. 1d similar to section '4a—4a'.
Figure 5B:
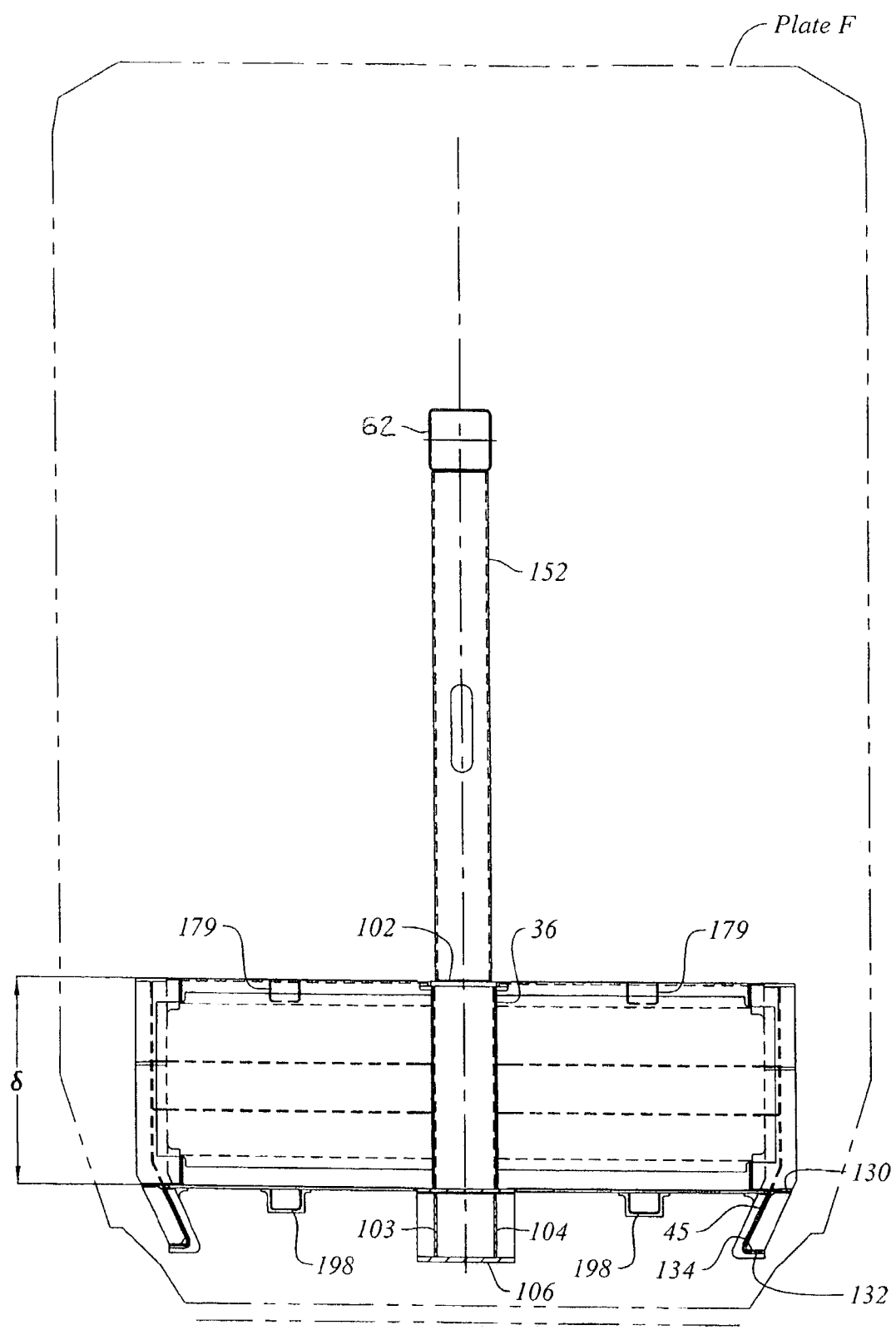
FIG. 5b shows a cross-section of the car of FIG. 1d similar to section '4b—4b'.
Figure 5C:
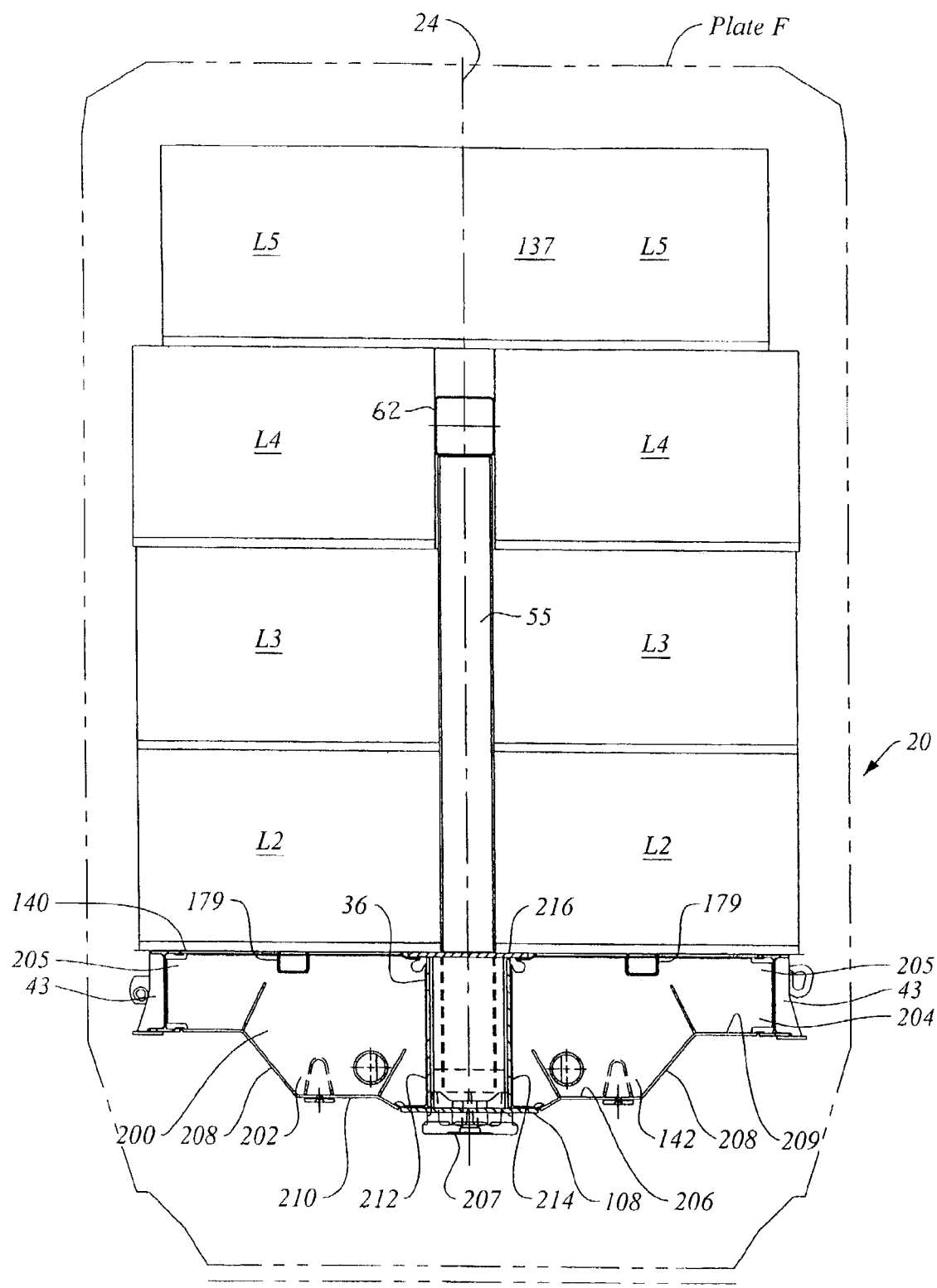
FIG. 5c shows a cross-section of an end deck looking toward the main bolster of the car of FIG. 1d similar to section '4c—4c'.
Figure 5D:
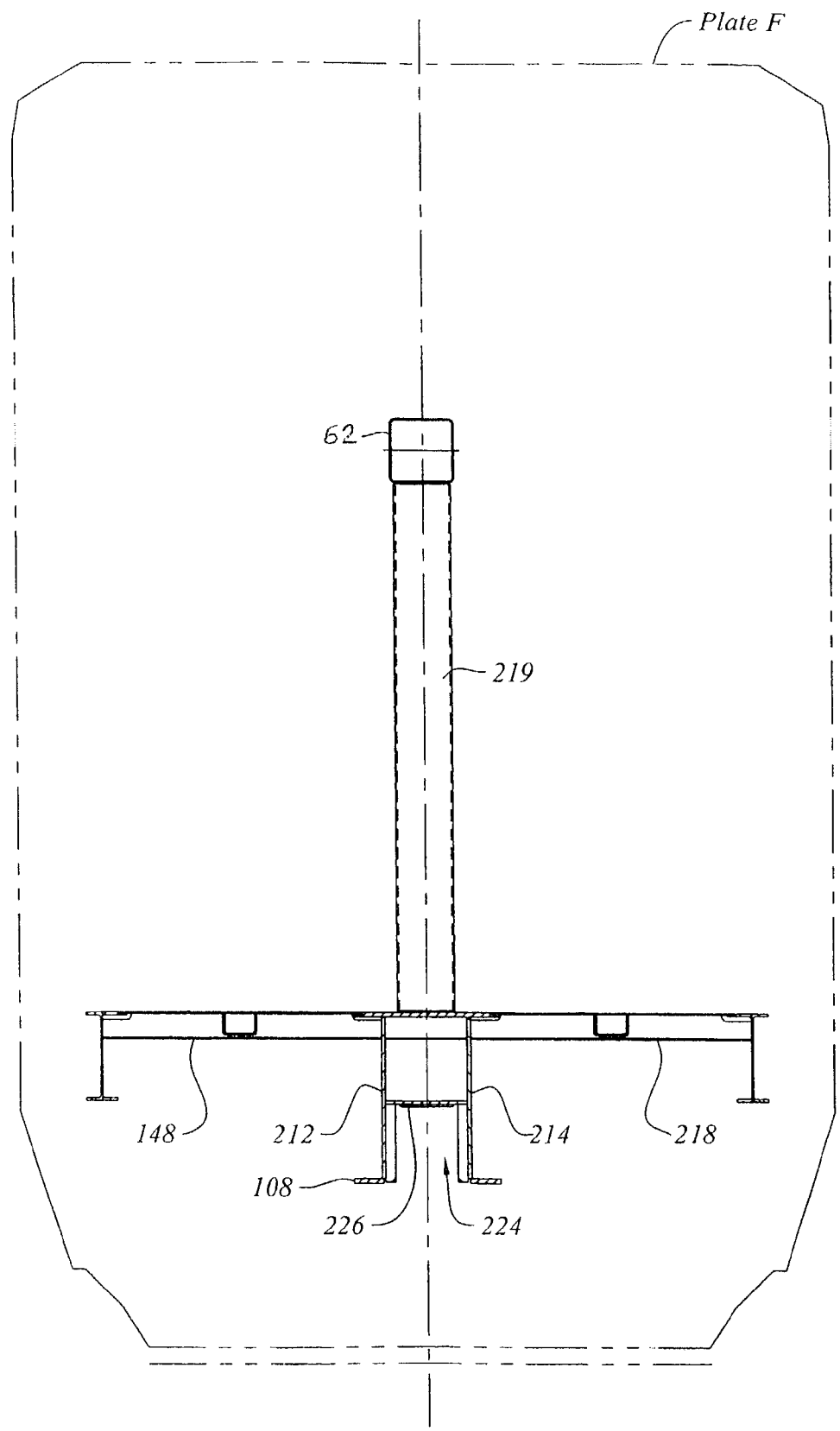
FIG. 5d shows a cross-section of an end deck looking toward a cross-tie of the car of FIG. 1d similar to section '4d-4d'.

FIG. 4h shows a horizontal cross-section of a portion of center sill 36 underneath a four sided hollow section post 56. Center sill 36 is reinforced along its length with vertically extending, transversely oriented webs separator plates, indicated as webs 290, 292 extending between vertical webs 103 and 104. Transverse webs 290, 292 are situated so as to provide web reinforcement to center sill 36 at the location of posts 56 and 57 respectively, tending to encourage the cross-section of main sill 36 to remain rectangular. Transverse webs 296 are shown in FIG. 4e at the location of the webs of C-channel posts 57.

As shown in FIG. 4f plates 212 and 214 terminate longitudinally inboard of the truck center at a location indicated as 'X$_1$'. Similarly, the inboard, mid-span portion of webs 103 and 104 of center sill 36 ends at a location indicated as 'X$_2$'. In the transition region, or portion, between 'X$_1$' and 'X$_2$', main sill 36 narrows on a taper defined by converging side sill web portions 215, 217. When viewed in the side view of FIG. 4e, it can be seen that portions 215 and 217 are trapezoidally shaped, and that while main sill 36 is narrowing in the lateral direction, it is also deepening in the vertical direction, as noted above. Internal gusset plates 219, 221 are mounted inside center sill 36 at locations 'X$_1$' and 'X$_2$' and tend to maintain the desired sectional profile at the transition junctions. By providing this transition section, center sill 36 has a first, relatively wide portion extending longitudinally outboard from location 'X$_1$', and a second, relatively narrow middle, or waist, portion lying between 'X$_2$' at either respective end of the car longitudinally inboard of the transition. In he preferred embodiment the outboard portion is 12⅞" inside to suit the draft gear and coupler, and 14" outside, measured across the webs; the inboard portion is 9" inside and 10" outside width, measured across the webs.

Posts 55, 56 and 57 (FIG. 1) are surmounted at their upper ends by top chord 62. Top chord 62 extends longitudinally between end bulkheads 50 and 52. Top chord 32 is a four sided, preferably square, steel tube that presents horizontal top and bottom flanges 234, 236, (FIG. 4a) and a pair of first and second vertical webs 238, 240. Vertical webs 238 and 240 lie slightly proud of (that is, laterally outboard relative to) the planes of the flanges of posts 56 and 57, and present a smooth planar bearing surface against which bundles of lumber, or other lading, can bear.

As shown in FIG. 4a, the longitudinal web structure of the rail road car 20 (or 70) that includes array 54 of vertical posts 56 and 57, and top chord member 62 extends to a first height H$_1$ at the level of the top of the top chord, measured from top of rail, and the top of the end bulkheads, 50 and 52 extends to a second height H$_2$, measured relative to top of rail. In car 70 H$_2$ is equal to H$_1$. In car 80, H$_2$ is greater than H$_1$, that is, the end bulkheads are taller than the central web structure. In the preferred embodiment H$_2$ exceeds the maximum height permitted under AAR Plate C, but falls within the maximum height envelope of AAR Plate F.

As seen in the end view of FIGS. 4a and 4c, bundles of lumber are stacked in layers and labelled, in ascending order, as L$_1$, L$_2$, L$_3$, L$_4$ and L$_5$. In car 80, the height of top flange 234 of top chord 62 is lower than the height of the bottom of the uppermost bundles of lumber, L$_5$, that can be stacked in the bunks. In this way the left and right hand top bundles, L$_5$, can seat laterally inboard relative to the remainder of the bundles upon which they are stacked, and can abut each other sideways above top chord 32 along the longitudinal centerline plane 24 of rail road car 80. That is, as measured upwardly from medial deck portions 29, the top of the top chord, positioned at height H$_1$, lies a distance D$_1$ above the height H$_3$ of medial decking portion 29, (relative to TOR) that is less than D$_2$. D$_2$ is the distance obtained by multiplying (N−1) by the bundle height plus dunnage, roughly 33⅝ inches. N is the maximum number of layers of bundles that can be stacked on medial decking portion 29 within the AAR plate limit, be it AAR plate F, as in the preferred embodiment, or AAR plate C, or some other plate, and 33⅝ is roughly the height, in inches, of the average layer of nominal "32 inch" bundles. In that way the height of N bundles (that is, the top of bundle L$_5$, as indicated) is the last incremental bundle height that falls within the Plate F limit and so tends to define the load limit height for bundles carried on the car Where the end deck portions 27 and 28 are located one bundle upwardly of medial decking portion 29, the relative height of lading on the end deck portions is one bundle less. Similarly D$_3$, being (N−2) multiplied by 33⅝ inches, represents roughly the height of the top of bundle L3, is less than the height of bottom flange 240. In car 80, the load limit height, measured upwardly from the medial decking portion exceeds the height of the uppermost portion of the top chord by more than a full bundle height, i.e. at least 33⅝ inches. It is preferred that the load limit height of 5 bundles exceed Plate C, but fall within Plate F.

In car 70, the lateral inboard force on bundles L$_5$ is reacted by the large, smooth bearing faces of webs 238 and 240 of top chord 62.

The end portions of center sill 36 at the location of the draft pocket are relatively tall, being more than 18 inches deep, and preferably about 27 inches deep. The end portions of center sill 36 lying outboard of bolster 200 have an aspect ratio of height (measured over the outboard end portion of upper flange 102 and the outboard portion 108 of lower flange 106), to width (measured across the inside faces of the webs that accommodate the draft gear) greater than 1:1, lying in the range of 1.5:1 to 3.0:1, and, in the preferred embodiment, of about 2:0:1, namely 27 inches as compared to 12⅞ inches. As above, a relatively taller main sill end portion may tend to simplify construction.

Returning to FIG. 1a, dropped deck center beam rail road car 20 has a web structure 30 and an upper beam assembly 60 substantially the same as initially described above. Car 20 differs from center beam rail road cars 70 and 80 insofar as car 20 has tapered posts, and risers 48 having an upper inclined surface to complement the taper of the posts, i.e., (to co-operate to form a right angled bunk for the lading), and a top truss 64 with laterally extending wings. Detailed views of the center beam car of FIG. 1a are provided in the sectional views of FIGS. 6a–6e and the detail views of FIGS. 7a to 7e. In these views, the center sill previously indicated generically as 36 is indicated as 356. Center sill 356 has a top flange plate 358, left and right hand side webs 360, 361, and a bottom flange 364, all welded in a box structure in the same manner as described above in the context of cars 70 and 80. Side webs 360 and 361 stand directly under the base end of the flanges of the upright posts, 73, 74, so that there is web continuity in passing loads from those flanges to the center sill. Cross-bearers 368 are mounted transversely below main sill 356, in the same general manner as cross bearer 112, the web 370 of cross bearers 368 having transverse web continuity provided by an in-plane internal gusset 367 installed on assembly of main sill 356 and having left and right hand portions extending to either side of main sill 356, generally similar to the embodiment of FIG. 4e described above. Hollow structural members, in the nature of hollow steel tubes, identified as risers 374, locate over the top flanges of cross-bearers 368, each having an inboard end seated upon the upper side of bottom flange 364, abutting respective side webs 360 and 361. The upper flange of cross bearers 368 can be inclined relative to the horizontal to complement the angle of inclination of the flanges of posts 73, 74, or, alternatively, cross bearers 356 may have horizontal flanges and the risers placed thereupon may be tapered to give the desired 90 degree angle between the lading bearing interface of the medial deck portion and the post flanges. In the further alternative, a flat deck sheet can be used, without risers, and with underlying stringers as in car 70, but with the deck sheets and upper flanges of the cross-bearers being inclined at the appropriate angle to complement the post flanges.

As above, the dropped deck portion of the deck ends at left and right hand knees, indicated as 47, 49.

In this embodiment it will be noted that the upper flange of main sill 356 is carried at a height corresponding to the height of the medial deck portions. FIG. 6c shows the deep main bolster 200. At this section, the walls or webs 103, 104 of main sill 36 are bracketed by two heavier, vertical plates 452, 454. Plates 452 and 454 form the inner end of the end portion of the center sill 356 of car 20. A heavier top flange 456 forms the top plate of the end portion of main sill 356.

Figure 6E:
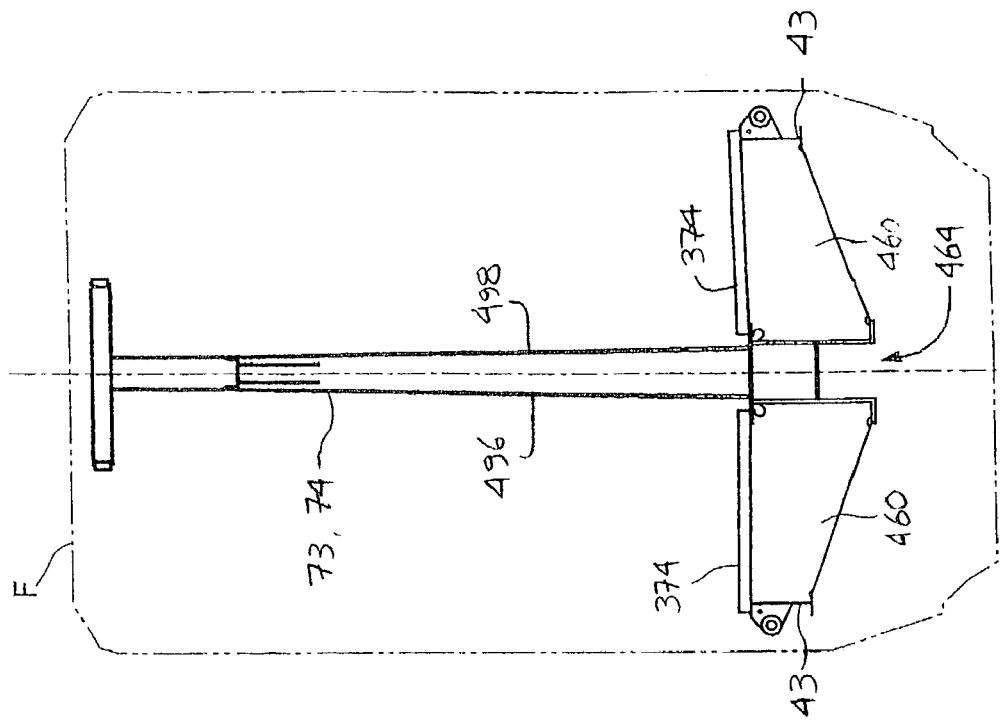
FIG. 6e shows a cross-section of the car of FIG. 1a taken on section '6e—6e'.
Figure 6D:
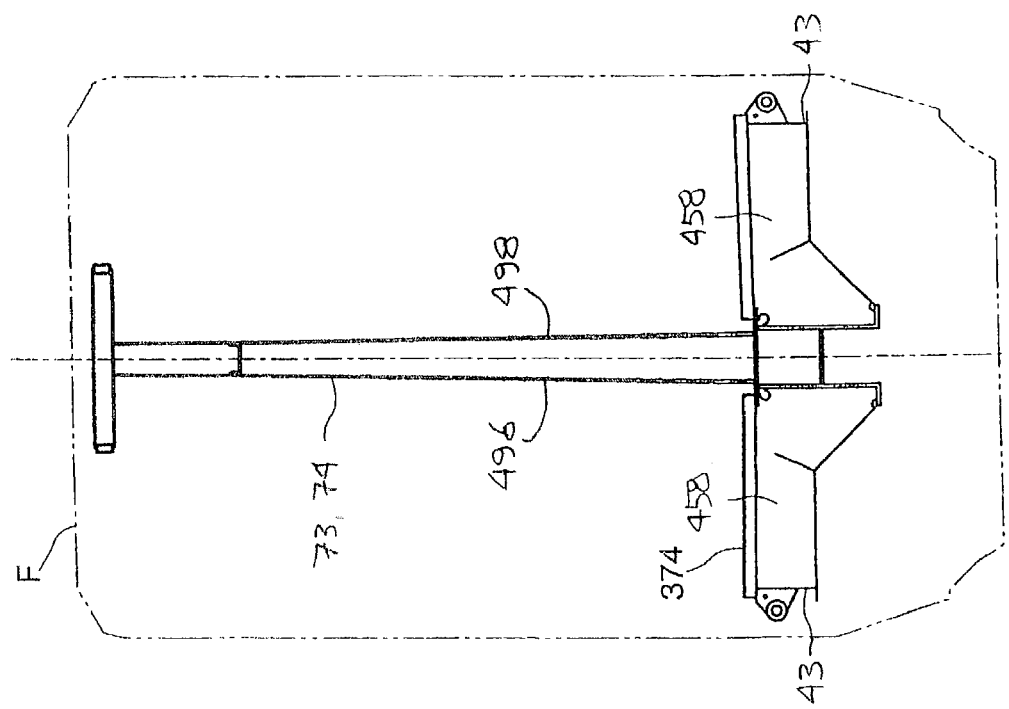
FIG. 6d shows a cross-section of the car of FIG. 1a taken on section '6d—6d'.

FIGS. 6d and 7d show the penultimate cross-bearer 458 located at the longitudinal station between upright post 459 and main bolster 200. A coupler pocket 464 is formed by welding a lower web 466 between plates 452 and 454. Pocket 464, and smoothly tapered cross member 460 are shown in FIG. 6e.

The incline of flanges 496, 498 is roughly at right angles to the inward taper of risers 374 (or 48 as the case may be). This permits generally square cornered bundles to be stacked neatly in the clearance opening of the bunk defined between the underside of the top truss 64 and risers 48 (or 374).

In the one embodiment, cars 20, 70, 80 or 90 may have a well deck portion intended to provide 40 ft of usable internal length, being about 40–41 ft in length, namely 40 ft-6 in. long. The internal lading height of the well, that is, the nominal loading height of the bunk defined between the medial decking portion load bearing interface and the wings 65, 67 (FIG. 11a) of top truss 64 (or, if no truss wings, then the clearance height to plate 'F' is 165 inches or more. As such, the height of top truss 64 from TOR, at roughly 16 ft-7 in., significantly exceeds the AAR Plate C maximum allowable height of 15 ft-6 in. The upper flange of main sill 36 is carried at a height, relative to TOR, that is high enough to permit the top surface of the coupler to fit within main center sill 36 as in a socket. The centerline coupler height is 34½ inches above TOR. For a Plate F car, the height of the top of the coupler head is roughly 40¾ inches above TOR for a car, as new, with un-worn wheels, unloaded. Thus the top surface height of a ¾" thick main center sill top flange is roughly 41½ inches above TOR. In the case of the staging, or false floor structures described above, the level of the false floor sheeting and hence of all points on the associated tapered risers, is above the level of the top flange 102 of main center sill 36, that is, at a level that is at least 42 inches from TOR. In the preferred embodiment of FIG. 3a, this height, taken at the truck centers, for a new car with no lading and un-worn wheels, is 12½ inches above the level of the center sill, or roughly 53½ inches above TOR (+/−1 inch). Further, when loaded with 51 inch wide bundles of kiln dried softwood of a density of 1740 lbs per 1000 board feet, the fully loaded center of gravity of car 20, 70, 80, 90 does not exceed 98 inches above TOR, that is, the center of gravity falls within a range whose upper limit is 98 inches. Lesser volumes of higher density lumber up to 2000 Lbs. per 1000 board feet can also be carried.

Although a 40 ft., 6 in. medial deck, or well deck, is preferred, a shorter well deck could be employed, such as 28 ft. 6 in., 32 ft. 6 in., or 36 ft. 6 in., it being advantageous that the well deck be at least 28 ft. long.

Each of center beam cars 20 and 90 has an array of center beam web posts, indicated generally, and generically, above as 54. Each of these arrays includes fabricated tapered posts, having a generally H-shaped cross-section, and roll formed posts having a generally C-shaped cross-section or square or rectangular steel tubes as previously noted. In these embodiments the posts mounted on the end portions of the respective railcars are formed to have web and flange continuity with main sill extensions, such as gussets 192 and 194.

A description of post 73 will serve also to describe the other posts having H-shaped cross-section in the various embodiments of rail road cars described herein. Similarly, a description of post 74 will serve to describe the other posts having C-shaped cross-sections in the various embodiments. Each of posts 73 has a central web lying in a vertical plane perpendicular to the plane 24 of car 20 or 90. The web of post 73 is tapered from a wide bottom adjacent main center sill 36 to a narrow top. At the outboard extremities of the web there are left and right hand flanges 496 and 498 (FIG. 11a) that each lie in a longitudinal plane inclined at an angle $\alpha$ defined (from the vertical) by the slope of the taper of web 494. At the top of each post 73, 74 web 494 has been trimmed back to a pair of tabs 500, 502 at the ends of flanges 496, 498. This yields a seat, socket, relief, or rebate in the nature of a generally U-shaped notch or slot 504 into which top chord assembly 62 can seat.

A horizontal cross-section of post 73 will generally have an H-shape, with web 494 lying centrally relative to flanges 496 and 498. Post 74, by contrast, although tapered in a similar manner to post 474, has a horizontal cross-section of a U-shaped channel, with its web being the back of the U, and the flanges being a pair of legs extending away from the back.

Whether parallel sided or tapered posts are used, each diagonal member 58 (or 59 or struts 77, 78 or braces 79) has a first end rooted at a lower lug 97 welded at the juncture base of one of posts 55, 56 or 73 adjacent to the juncture of that post with main center sill 36, and a second diagonal end rooted in an upper lug 99 at the juncture of another adjacent post 56 or 73 and top chord assembly 62. Midway along its length, diagonal member 58 (or 59 or struts 77, 78 or braces 79) passes through post 57 or 74 intermediate the pair of posts 55, 56 or 73 (as may be) to which diagonal 58 (or 59 or struts 77, 78 or braces 79) is mounted. It is intended that the respective laterally outwardly facing sides, or flanges, of the various posts lie in the same planes on either side of the central plane 24 of car 20 (or 70, 80, or 90) to present an aligned set of bearing surfaces against which lading can be placed, that aligned set of surfaces running from the top flange of the center sill at a level corresponding to the load bearing interface of the medial and end portions of the deck structure, up to the top chord. The sides of the top chord may also be co-planar with the posts.

The variations of top chord will now be described. In the case of the embodiments of FIGS. 1b, 1c and 1d, the top chord member is a beam whose overall width may generally the same as the width of the adjoining posts such that a smooth continuous bearing surface is provided. Alternatively, it may be somewhat wider than the adjoining posts to permit a better butted weld joint to be formed between the squared top end of the post flanges and the underface of the top chord. There are many possible variations of top truss. Although cars 70 and 90 do not have top trusses, they could have, and, in those cases, the various embodiments of the FIGS. 9a to 21b described hereafter can be adapted to suit those cars as well.

As a preliminary matter, each of the top chord members of cars 70, 80 or 90 of FIGS. 1b, 1c, and 1d, can be provided with a cover, such as is indicated in FIG. 10a as cover member 512. Cover member 512 may be of a roll formed UHMW polymer, such as a roll formed nylon channel. An apparently desirable material for this purpose is sometimes referred to as "puck board", it being the same material as used for dasher boards along the edge of the ice surface in hockey rinks. Whether by roll-forming or by other fabrication means, an interference fitting channel is desirable, such that, when slipped over the top chord, the cover will tend to fit snuggly and hold itself in place in FIGS. 8a and 8b.

Figures 8A, 8B:
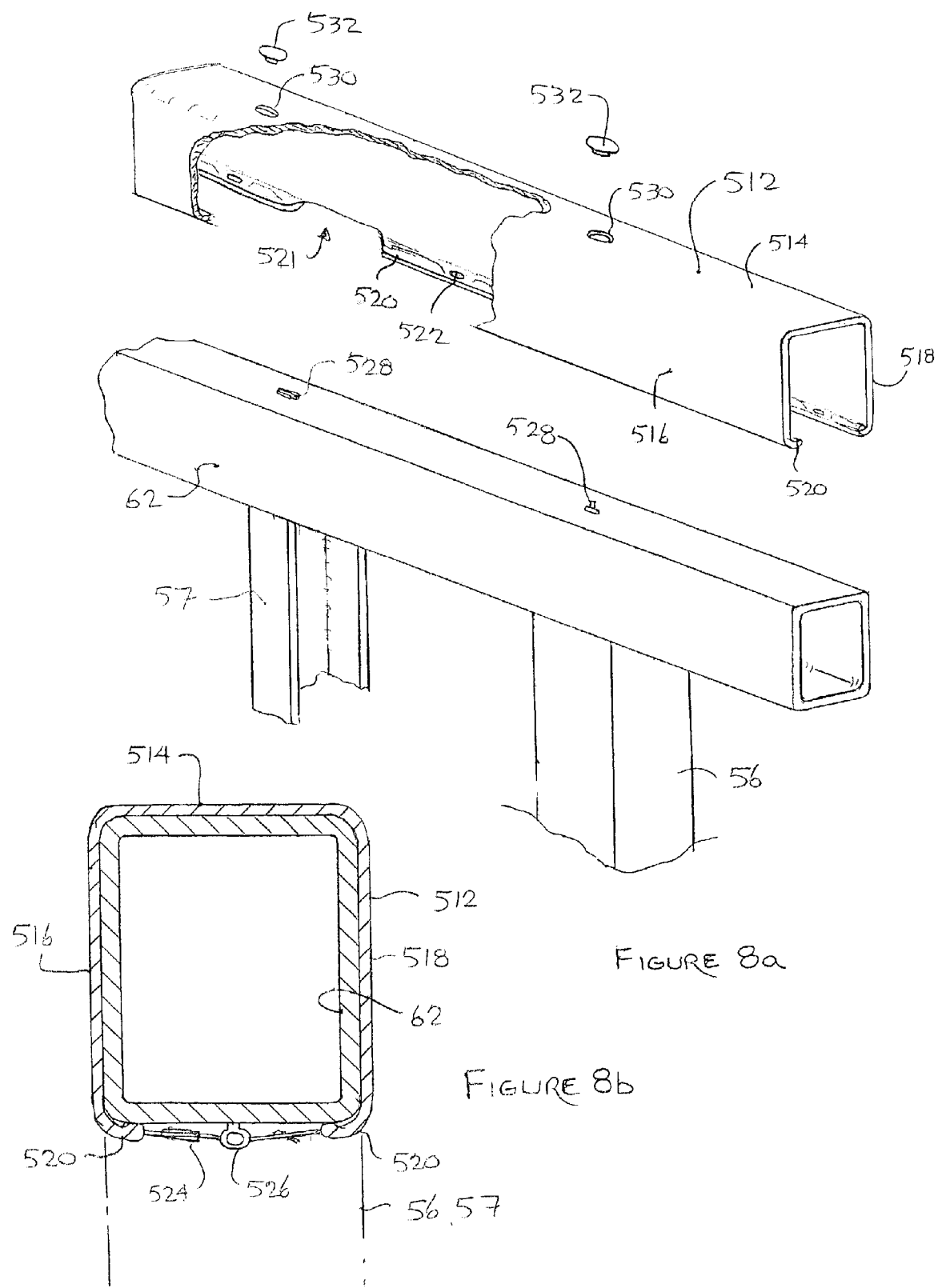
FIG. 8a shows a three-quarter view of a section of the top chord of the center beam rail road car of FIG. 1e or 1d, and a cover therefor.
FIG. 8b shows a cross-sectional view of the top chord of FIG. 8a with the cover installed.

Further, cover 512 may have the channel shape shown, having a back or web 514, and legs 516, 518. The distal tip of legs 516, 518 may have an inwardly formed bead or lip 520 running therealong for the purpose of achieving a "snap fit" on the top chord. Bead 520 may be formed as a series of intermittent blisters with a gap 521 between the blisters to accommodate the flanges of the posts. In a further alternative, a securement fitting, which may be in the nature of a hard eye 522 may be provided in each lip, or bead, 520 to permit mechanical fasteners 524 to secure cover 512 in place. A cleat or stud 526 may protrude downwardly from the top chord to provide a securing point for the mechanical fastener 524. The mechanical fasteners may include turnbuckles, cables, or nylon tie wraps. In a still further alternative or additional feature, the upward face of the top chord member may be provided with securement fittings, such as an upwardly standing cleat or stud 528 for co-operation with an aperture 530 formed in cover 512. A mating capture member for securing cover 512 in place, in the nature of a threaded nut, or cap 532 may then engage cleat or stud 528, as may be, to discourage cover 512 from moving. While it may be possible to provide cover 512 in a single extending fully between the end bulkheads, (typically about 72 to 73 ft) it may be preferable to obtain cover 512 in modular sections, of about 6, 8 or 12 ft in length. Of these, section for placement on 8 ft centers would be preferred. On installation, legs 516, 518 are splayed apart to allow lips 520 to be pushed over top chord 62. When lips 520 reach the lower edges of top chord 62, they may tend to seat as shown in FIG. 8b.

Figure 9B:
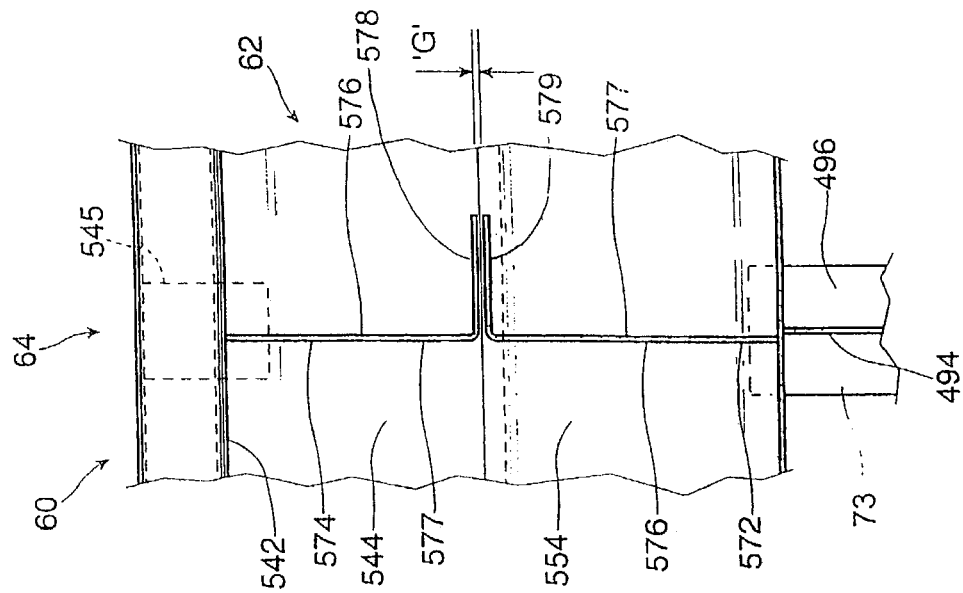
Figure 9A:
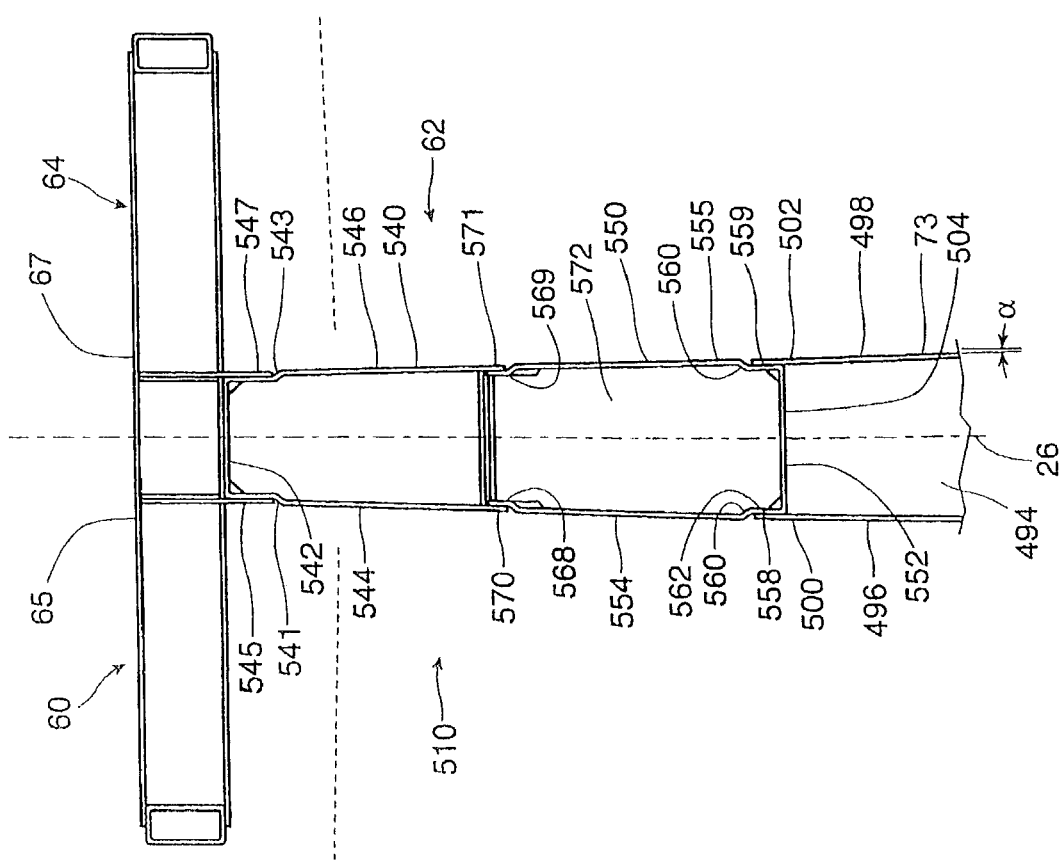
FIG. 9a shows a detail of the upper beam structure of the car of FIG. 1d.

In the embodiment of FIGS. 9a and 9b, upper beam assembly 510 can be defined as the combination of top chord assembly 62 and top truss 64. It has a cross section in the shape, generally, of a 'T', with the cross-bar of the T being defined by wings 65 and 67 of top truss 64, and the stem of the 'T' being defined by top chord assembly 62, described more fully below.

Straps 136 (FIG. 4a) are provided to attach to the outboard, distal extremities of wings 65 and 67 of top truss 64, to be wrapped outboard of the load, and to be tightened by a come-along, a winch, a pawl-and-ratchet type of mechanism, noted above as 138, or similar tightening device mounted to the respective side sill 42 or 44. An operator turns mechanism 138 with the aid of an extension bar or handle (not shown). When tightened, straps 136 bear against the outboard, upper corners of bundles indicated as 137, tending to force their inboard, upper regions, indicated generally as 518, most tightly against the upright center beam web structure of the railroad car that extends along plane of symmetry 24, namely array 54 and the outer shank, or skirt, of the stem of upper beam assembly 60.

The embodiment illustrated in FIGS. 9a and 9b has an inside loading clearance of 169⅜ inches perpendicular to risers 48. It also has a loading limit extending perpendicular to the slope of flange 496, at a height 163½ inches above, and measured perpendicular to, risers 48. The nominal load height is then 165 inches for 5 bundles at 33 inches each, including dunnage. No dunnage is required atop the last bundle, hence 163½ inches. The nominal load height, in general, for 31½ inch bundles of kiln dried lumber is thus the largest integer multiple of 33 inches that is less than the load limit height. In the illustrations of FIGS. 11a and 11b, 4a and 4b, this loading limit permits 51 inch wide bundles to fall within the loading envelope defined by AAR plate 'F'.

Deep beam section 510 is shown in cross-section in FIG. 9a. It includes a first, or upper formed section 540 in the shape of an inverted U, having a back 542 and left and right hand legs 544, 546. Legs 544, 546 are splayed outwardly relative to the vertical at angle α to match the angle of the taper of the flanges of posts 73 and 74. Upper formed section 540 also has inwardly stepped shoulders 541 and 543 to accommodate the mating ears of gusset plates 545 and 547 which join top truss 64 to top chord assembly 62. Deep beam section 510 also includes a second formed section 550 that is generally U-shaped, having a back 552, and a pair of left and right hand legs 554 and 555. Legs 554 and 555 each have a proximal region 558, 559 relative to back 552 that is stepped inwardly to form a shoulder 560 and a neck 562 of a size to nest between tabs 500, 502 of post 73 or 74, as the case may be. Tabs 500, 502 are formed by trimming web 494 to conform to the depth of shoulder 560. Legs 554, 555 also each have an inwardly stepped toe 568, 569 stepped inward a distance equal to the wall thickness of legs 554, 555 such that toes 570, 571 of legs 544, 546 of member 540 can overlap, and seat outside of, outside toes 568, 569 respectively, and be fillet welded in place. Legs 554 and 555 are angled inward to yield slope continuity with both legs 544 and 546 and also with flanges 496 and 498 of post 73 (or corresponding flanges of posts 74 as may be). That is, legs 554, 555 are toed inward at the same angle from the vertical at which legs 544, 546 are splayed outward so that the exterior surfaces are flush with, and lying in the planes of, the respective flanges of posts 73 and 74. The exterior surfaces so defined can be termed skirts.

Gussets 572 and 574 are welded inside formed section 550 and 540 respectively at longitudinal stations along the length of car 20, (or 70, 83, 85, 90, 92, 94, 350) corresponding to the various longitudinal stations of the webs of posts 73 and 74 respectively, thus providing a substantially continuous web from main sill 36 to top truss 64. There is, however, a web discontinuity between gusset 572 and gusset 574 indicated by gap 'G', seen in FIG. 9b. In light of this discontinuity, gussets 572 and 574 have main web legs 576, 577 that, when installed, lies in the vertical plane of web 494 and a toe 578, 579 extending at a right angle therefrom, lying in a horizontal plane. The lateral edges of toes 578 and 579 are welded along the inside faces of toes 568, 569 and 570, 571 respectively and extend a distance comparable to the width between the respective toes at that point. In the preferred embodiment the overall height of top chord assembly 62 is 27 inches, with ⁄1;4 inch wall thickness on legs 544, 546, 554 and 555. In one embodiment, the length of legs 544, 546 is 13½ inches, and the overall length of legs 554, 555 is 14½ inches. Nominally, shoulder 560 overlaps tabs 500 and 502 by 2 inches. That is, tabs 500, 502 extend 2 inches beyond web 494. Toes 578 and 579 are both 6 inches long, and the nominal width of gap 'G' is about 6¾ inches.

In this way, when assembled, legs 554, 555 and 544, 546 form respective left and right hand outwardly facing bearing surfaces against which a load may bear, and over which a reaction force to tension in the tightening straps can be spread. In the span between the stations of adjacent posts ( whether 73 or 74), the skirts, or bearing surfaces, formed in this way are reinforced by the laterally inward web, (that is, back 552) which connects both skirts (that is, legs 544 and 554, and legs 546 and 555). The laterally inward reinforcement need not be immediately behind the respective skirt or facing, but rather can be offset, as illustrated in FIG. 9a, with the influence of the web stiffening the face some distance away. The web is "inward" of the skirts in the sense of lying behind, or shy of, the profile of the contact interface with the wood bundles, since the reinforcement lies toward the centerline of the rail car, rather than proud of, the respective skirt faces. In this way an inwardly disposed stiffener will not protrude and rub against an object bearing against the outwardly facing surface of the respective skirt.

In an alternative embodiment shown in FIGS. 10a and 10b, a deep beam section 590 has a pair of left and right hand formed sections 592, 594 surmounted by a rectangular tube 596, upon which top truss 64 is mounted. Each of sections 592, 594 has a main sheet 600, an inwardly stepped shoulder 602, an inwardly extending leg 604 and an upturned toe 606. In place of gussets 572 and 574, section 590 has gussets 608, 610 having a main, vertical leg 612, 613 and a horizontal leg 614, 615. Vertical legs 612, 613 are contoured to match the inside wall shape of formed sections 592, 594 respectively, and are located at longitudinal stations to correspond to the longitudinal stations of the webs of posts 73 and 74 as above. Vertical legs 612, 613 are separated by a vertically extending gap having a width 'H'. Once gussets 608, 610 are welded in place, formed sections 592, 594 are welded along the seam where legs 604 of sections 592, 594 abut along the centerline of car 20 or 70, 83, 85, 90, 92, 94, 350. As above, the step in sections 592, 594 is of a size to seat between tabs 500 and 502 of posts 73, or 74, and the distal tips of main sheets 600 are fillet welded to the side faces of tube 596. As above, there is slope continuity between main sheets 600 and the corresponding flanges 496, 498.

In the alternative embodiment of FIGS. 11a and 11b, a deep upper beam assembly 620 has a pair of angle irons 622 and 624 welded longitudinally inside tabs 500 and 502 of posts 73 and 74. Angle irons 622 and 624 each have an inwardly extending toe 626, 627 which bottoms on the cut edge of web 494, and an upwardly extending leg bent to conform to the slope of flanges 496 and 498. Beam 620 also has a pair of left and right formed sections 628, 629 each having a main sheet portion 630, 631, an inwardly extending leg 632, 633 and a re-entrant toe 634, 635.

On assembly, L-shaped gussets 636, 637 are welded in each of sections 628, 629. Gussets 636 and 637 each have a profile to match the inside profile of the upper regions of main sheet portions 630, 631, legs 632, 633 and toe 634, 635. The toes of gussets 636 and 637 are welded along their outboard edges to the inside face of main sheet portions 630, 631. Sections 628 and 629 are welded along the centerline seam between abutting toes 634 and 635. A further, main, gusset 640 is trimmed to a shape to permit welding of its top edge to the underside of the toes 638, 639 of gussets 636, 637, its side edges to the inner face of the lower regions of main sheet portions 630 and 631; once welded in this manner, the base leg 642 of gusset 640 can be welded to toes 626 and 627 of angle irons 622 and 624, with a plug weld formed to fill the longitudinal gap therebetween. Gusset 640 is also trimmed to have reliefs 644, 645 to permit entry between the upwardly extending legs of angle irons 622, 624. Gussets 636, 637 and 640 are located at longitudinal stations that correspond generally to the longitudinal stations of posts 56 and 57 as the case may be. Legs 632, 633 of sections 628, 629 form, ideally, a flat surface to weld to top truss assembly 64, as before. Similarly, when installed, main sheet portions 630, 631 have slope continuity with flanges 496 and 498.

Figures 12A, 12B:
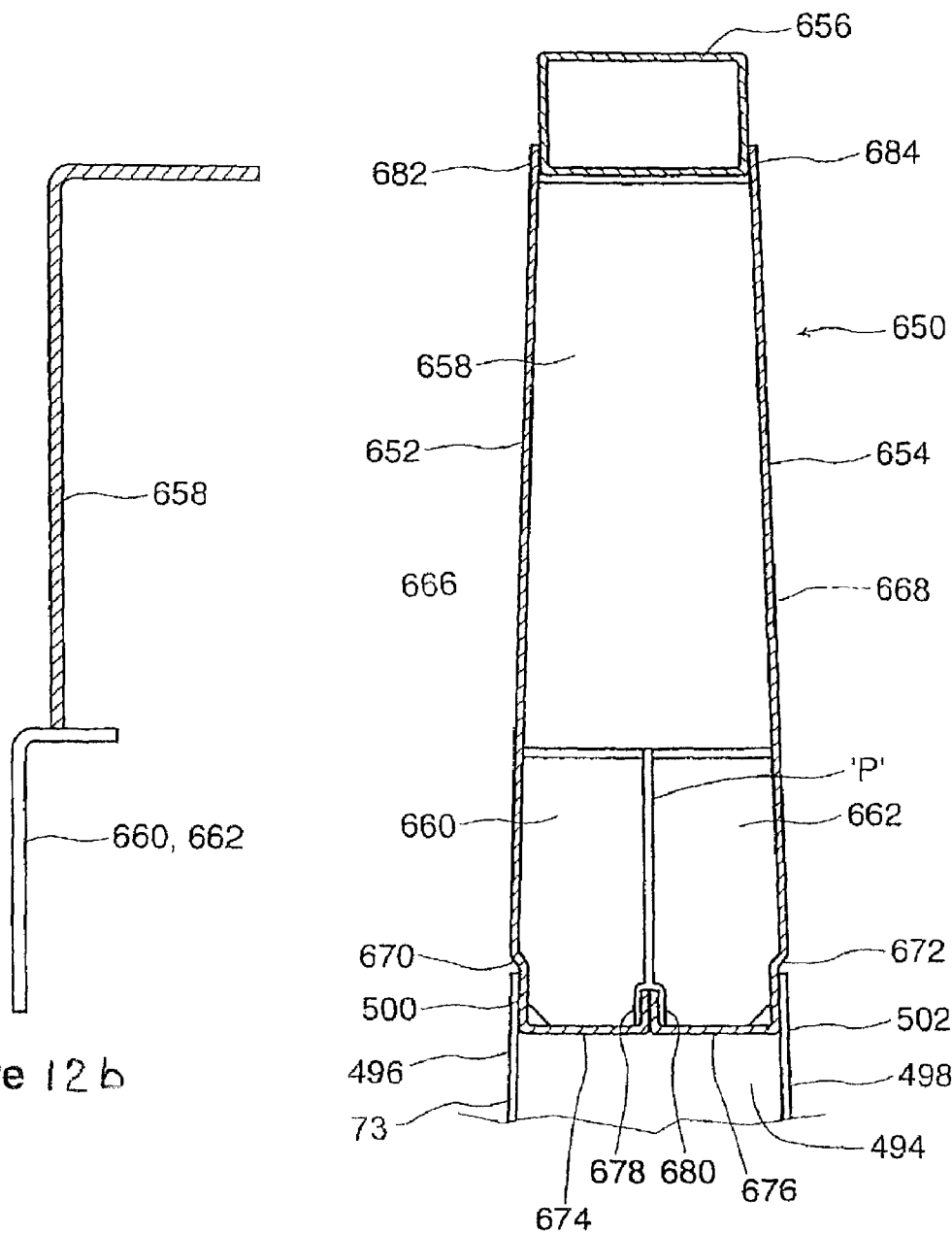

In the alternative embodiment of FIGS. 12a and 12b, a deep upper beam 650 has a pair of formed sections 652, 654, a rectangular steel tube 656, a main gusset 658 and minor gussets 660 and 662. On assembly, minor gussets 660 and 662 are welded inside the lower regions of formed section 652 and 654, being shaped to conform to the shape of the lower region of outer main sheets 666, 668, inwardly stepped shoulder 670, 672, and inwardly extending legs 674, 676. A gap 'P' is left between the respective inboard edges of gussets 660 and 662, and their outboard edges are welded to the inner face of main sheets 666, 668. Gussets 660, 662 are trimmed to be clear of re-entrant toes 678, 680. Main gusset 658 is welded upon minor gussets 660, 662, with its lateral edges welded to the inside face of main sheets 652 and 654. Tabs 682, 684 at the distal ends of main sheets 666, 668 embrace the outer side faces of steel tube 652.

Figures 13A, 13B:
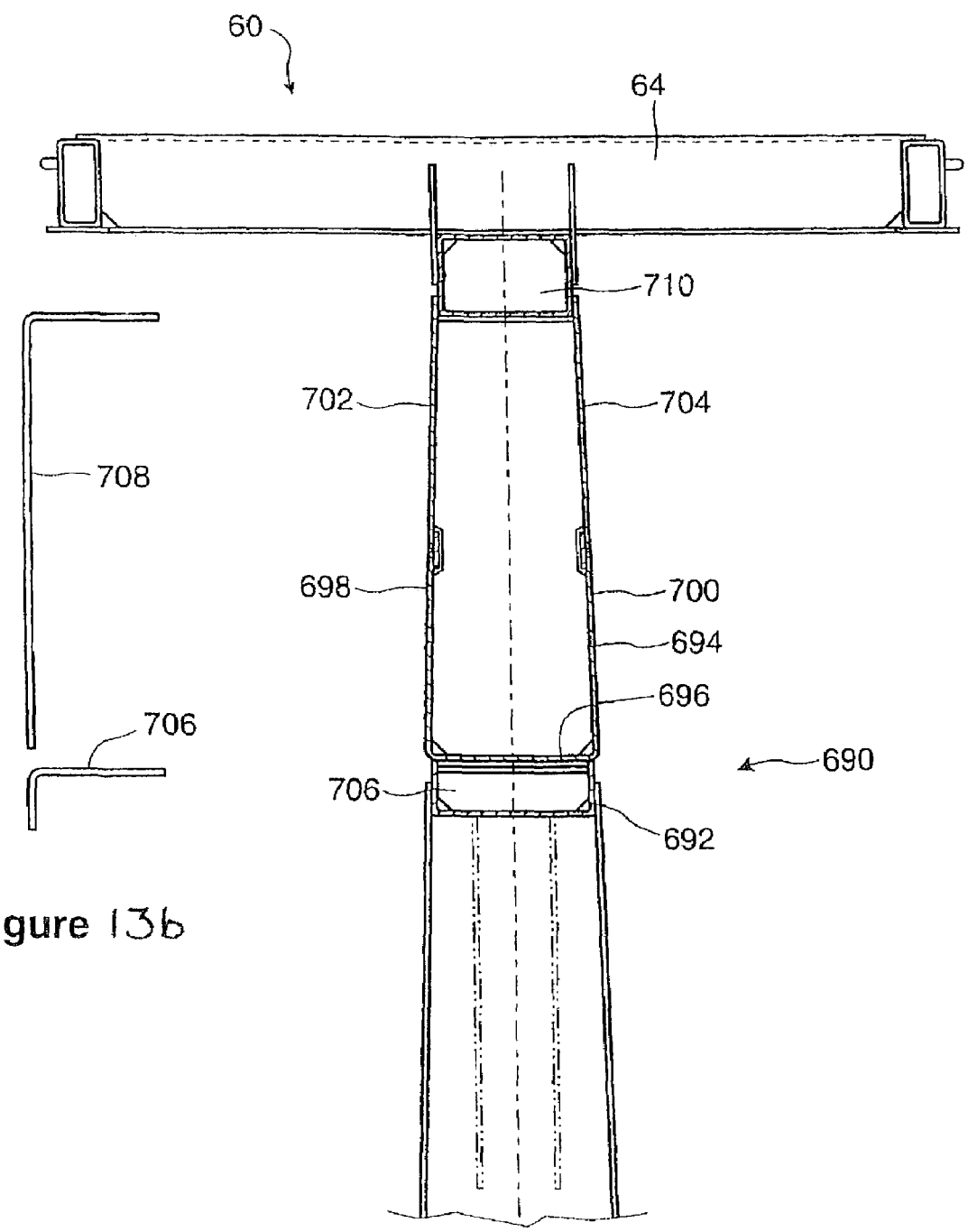

In the alternative embodiment of FIGS. 13a and 13b, a deep upper beam assembly 690 has a longitudinally extending inverted C-channel 692 upon which is welded a generally U-shaped formed section 694 having a back 696 and upwardly extending legs 698, 700 bent to lie on the slopes of the flanges of posts 73 and 74, as above. The distal ends of legs 698 and 700 abut the lower edges of a pair of skirt plates 702 and 704. A weld is formed along the abutting edges of the legs and skirts. At their furthest ends, skirt plates 702, 704 are welded to the outside faces of a steel tube 710. Top truss assembly 64 surmounts assembly 690. Minor gussets 706 are welded inside C-channel 692 at the longitudinal stations of posts 56 and 57, as above, and gussets 708 are welded inside legs 698, 700 and plates 702, 704 thereby providing a form to define the angular profile upon which they lie. As before, that profile is such as to yield a surface lying flush with the outer surfaces of posts 73 and 74.

Figures 14A, 14B:
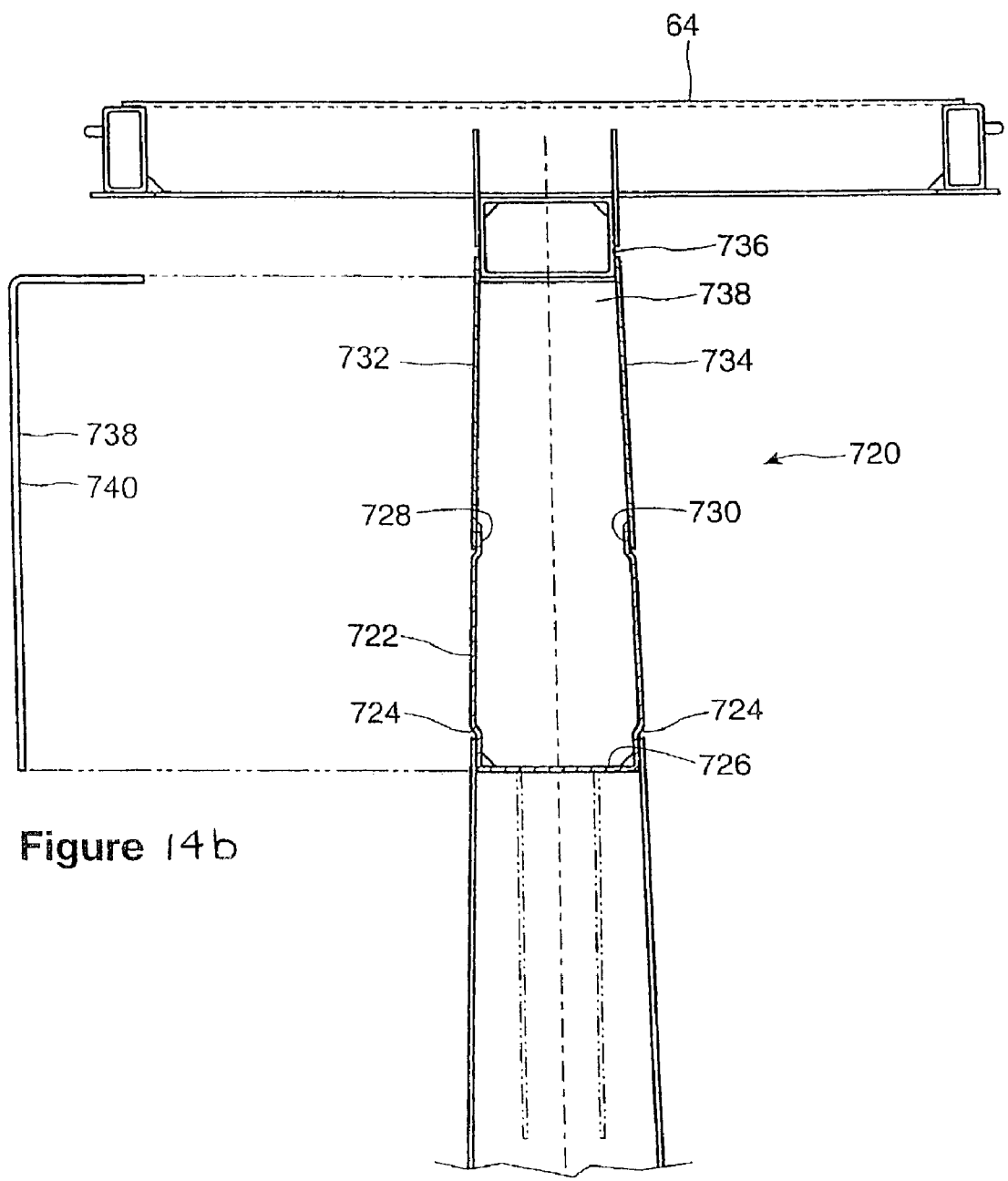

The alternate embodiment of deep beam 720 of FIGS. 14a and 14b is similar to that of FIGS. 13a and 13b, but differs insofar as C-channel 692 and formed section 694 have been combined into a singular formed section 722 having inwardly stepped shoulders 724 to yield a plug shaped head 726, similar to that described in the context of FIG. 9a. Further, rather than straight legs 698 and 700, formed section 722 has inwardly stepped toes 728 and 730, again, similar to those shown in FIG. 9a. Skirt plates 732 and 734, similar to skirt plates 702 and 704, again extend between toes 728 and 730 to terminate on the outer side faces of a rectangular steel tube 736.

In this instance a large gusset 738 is welded inside section 722, and plates 732 and 734. Gusset 738 has a vertical leg 740 having a profile cut to yield the desired slope continuity with the flanges of posts 73 and 74.

Figure 15:
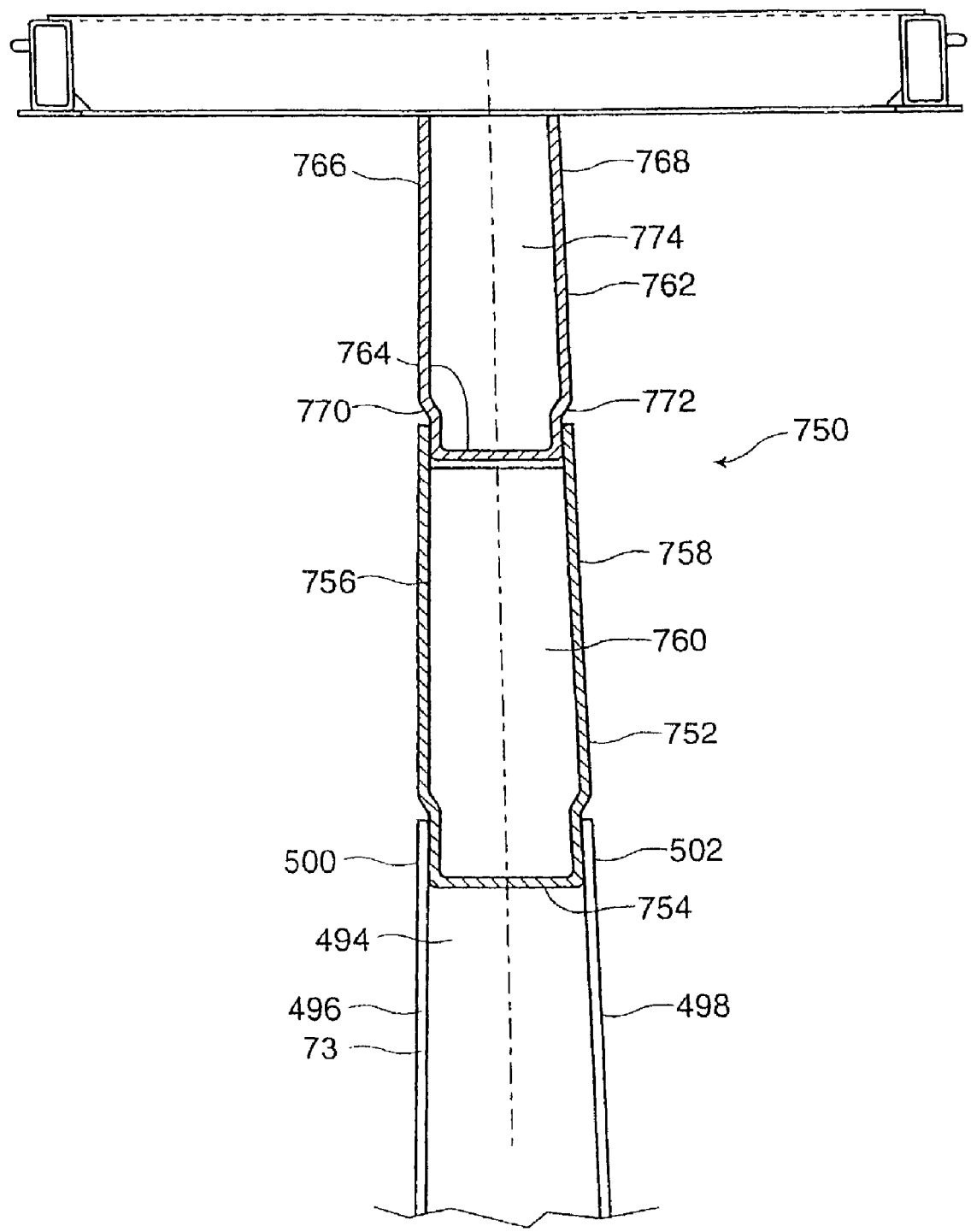

The alternate embodiment of deep beam 750 of FIG. 15 is similar to that of FIG. 13a. However, as in FIG. 14a, C-channel 692 and formed section 694 have been supplanted by a single formed section 752 having a back 754, a pair of legs 756, 758 having inwardly stepped shoulders and a pair of distal toes. A gusset 760 is mounted within formed section 752 at each of the longitudinal stations of car 20 corresponding to the longitudinal stations of the webs of posts 73 and 74, as described above. However, gussets 760 terminate in a horizontal leg lying shy of the tips of the distal toes of legs 758 and 756 such that another formed section 762 can seat between them. Formed section 762 has a back 764, legs 766, 768 and shoulders 770, 772. An internal stiffener in the nature of a gusset 774 is located at each of the longitudinal post stations. Back 764 provides a horizontal web sufficiently close to top truss assembly 64 that no rectangular steel tube is employed. As before, the outer faces of legs 766, 768 and legs 758, 756 are intended to lie in the same planes as the flanges of posts 73 and 74. The external faces of each of formed sections 752 and 762 each extend about a foot in depth, relative to top truss assembly 64, and present, more or less, a 2 foot wide skirt, or band, that overlaps the load limit, and the maximum loading height.

Figure 16:
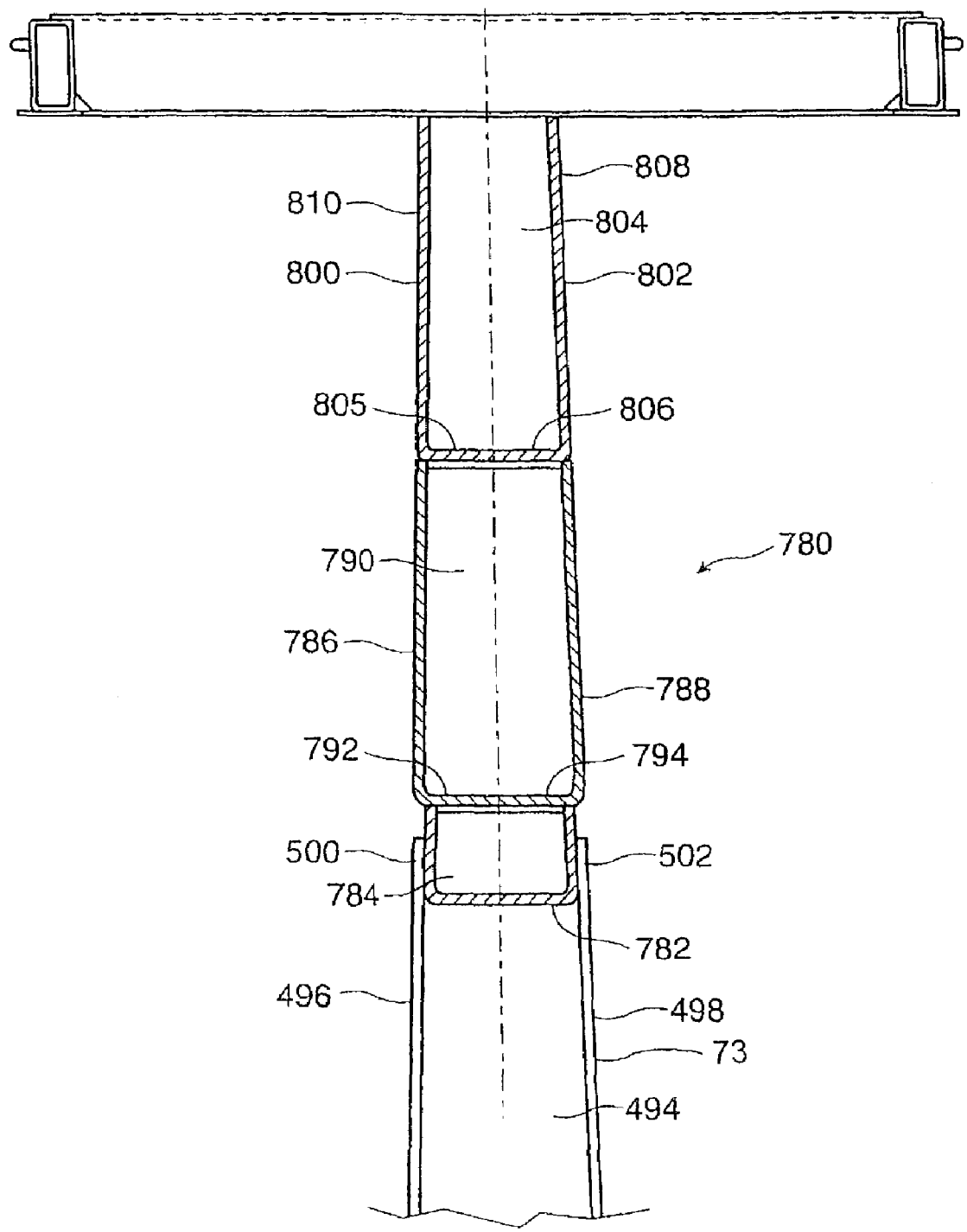

In the embodiment of FIG. 16, a deep beam assembly 780 is generally similar to deep beam assembly 750, but rather than have step-shouldered formed sections it has a C-channel 782 for mounting between tabs 500 and 502 as in FIG. 15a above, with gussets 784 mounted as described in FIG. 15a. Above this is a first pair of angle irons 786, 788, bent to present outer faces lying on the desired slope of the flanges of posts 73 and 74 as the case may be. Formed angles 786, 788 are welded on a series of lateral gussets 790, again, at the longitudinal stations of vertical posts 73 and 74. Formed angles 786 and 788 are also butt welded to each other along the tips of their inwardly extending toes 792, 794. Another pair of angle irons 800, 802 are welded on an array of gussets 804, and along a butt welded seam at their inwardly extending toes 805, 806, and mounted above angle irons 786 and 788, as shown, such that their generally upwardly extending legs 808, 810, and the consequent skirt-like surface they present, lie flush with, and on the same slopes as, the respective flanges of posts 73 and 74.

Figures 17A, 17B:
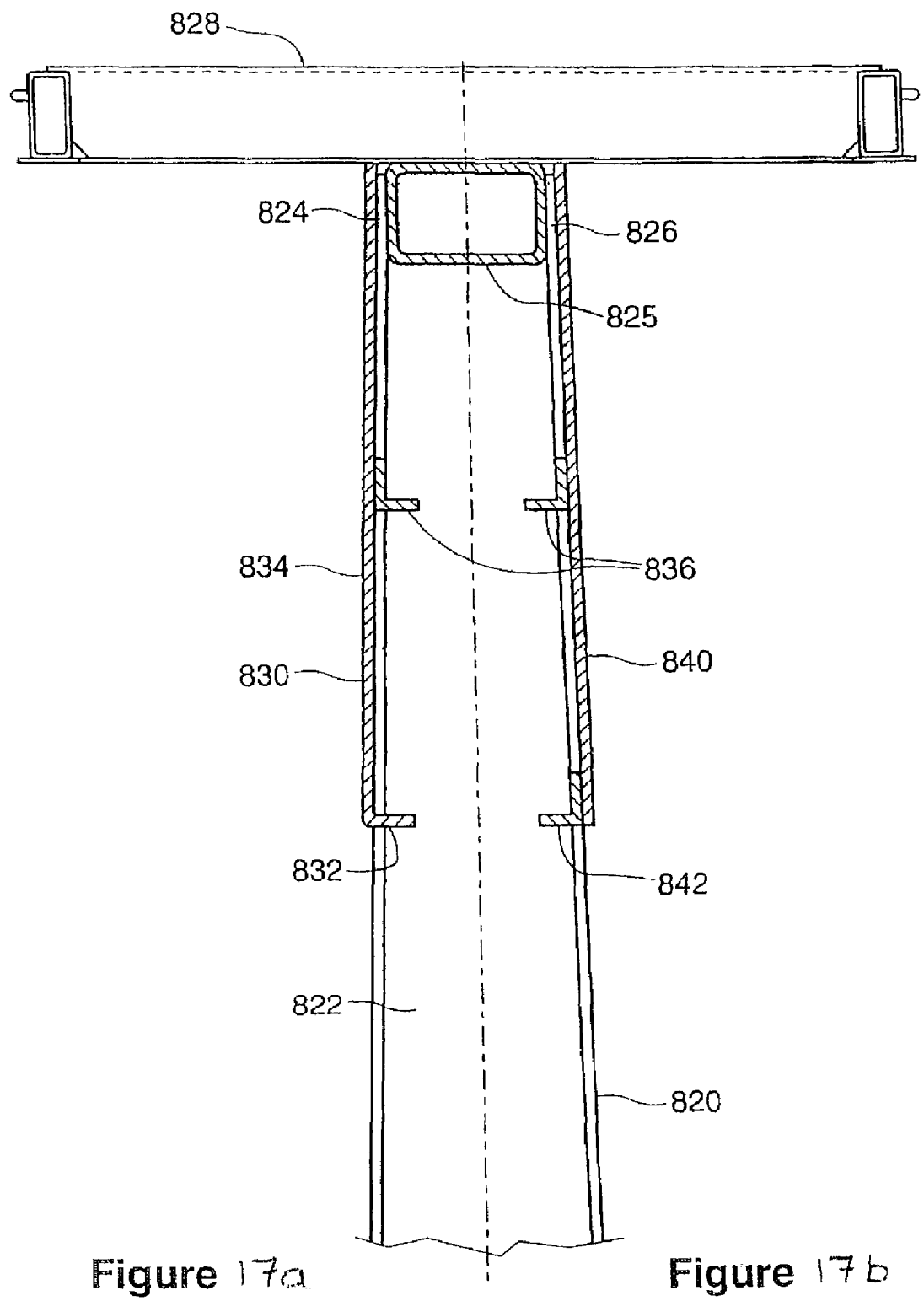

The embodiment of FIG. 17a shows a half view of a retro-fit installation. (As the section is symmetrical about the center line of the car, only one half is illustrated.) An existing center beam post is shown as 820. It has a web 822 trimmed down to leave tabs 824 and 826 which lie to either side of, and are welded to, a rectangular steel tube 825 upon which a top truss assembly 828 is mounted. A skirt panel 830 is formed with a stiffener in the nature of an inwardly bent toe 832. The length of main leg 834 is roughly 2 feet, such that its outer face overlaps both the maximum load height and the load limit height. Toe 832 is trimmed to accommodate the flanges of post 820 (analogous to posts 56 or 57). An additional reinforcement, or longitudinal stiffener, in the nature of angle 836 of a length to lie between successive posts 820, is welded to the inner face of main leg 834 at an intermediate level roughly halfway between top truss assembly 828 and toe 832. Angle 836 will tend to cause main leg 834 to resist lateral deflection between adjacent posts 820, thereby tending to maintain main leg 834 in a position to spread loads placed against it.

Panel 830 could be as thick as ½ or ⅝ inches. Although panel 830 is preferably a metal sheet welded to posts 820, a different fastening means, such as rivets, bolts or the like, could be used. A smooth steel face is preferred, but other metals, such as aluminum, could be used, or a suitable, rot resistant, UV resistant polymer could be selected, either as a solid sheet or as a face coating or layer, or sheet, upon a metal substrate. It is preferred that the material chosen be a non-consumable material, that is, one that may tend not to be prone to require frequent replacement such as may be required if softwood lumber battens are used, and also one that has little or no tendency to develop wood rot or to support the growth of molds Panel 830 need not be integrally formed with bent toe 832, but could be fabricated by using a flat sheet 840 as the external face plate, with an angle iron 842, or similar stiffener, welded along the inward facing bottom edge of the face plate between pairs of posts 820, as indicated in the other half view shown in FIG. 17b.

FIG. 17c is again a half section, showing a hollow cell panel 844 in place of panel 830. Hollow cell panel 844 has an external skin 846, an internal skin 848, and an intermediate hollow cell core 847 for carrying shear between skins 846 and 848. The hollow cells usually have a hexagonal columnar shape, the columns running perpendicular to the skins. The thickness of hollow cell panel 844 has been exaggerated for the purposes of illustration. Although skins 846 and 848 may be made of steel, they may also be made of other substances, such as structural polymers, reinforced polymers, aluminum, or other suitable material.

Figures 17C, 17E:
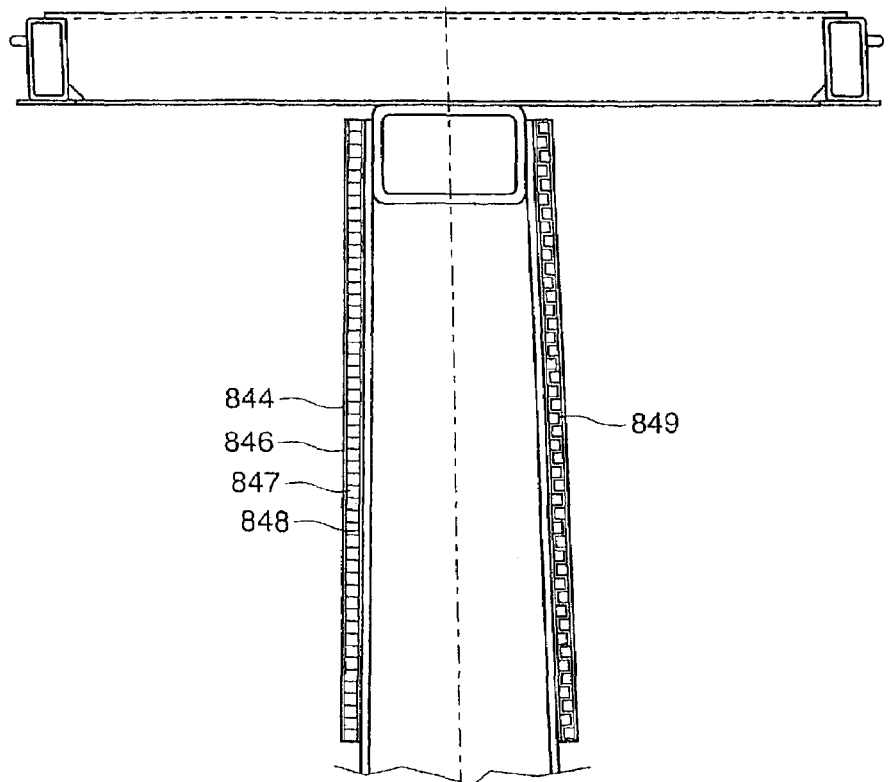
Figures 17D, 17F:
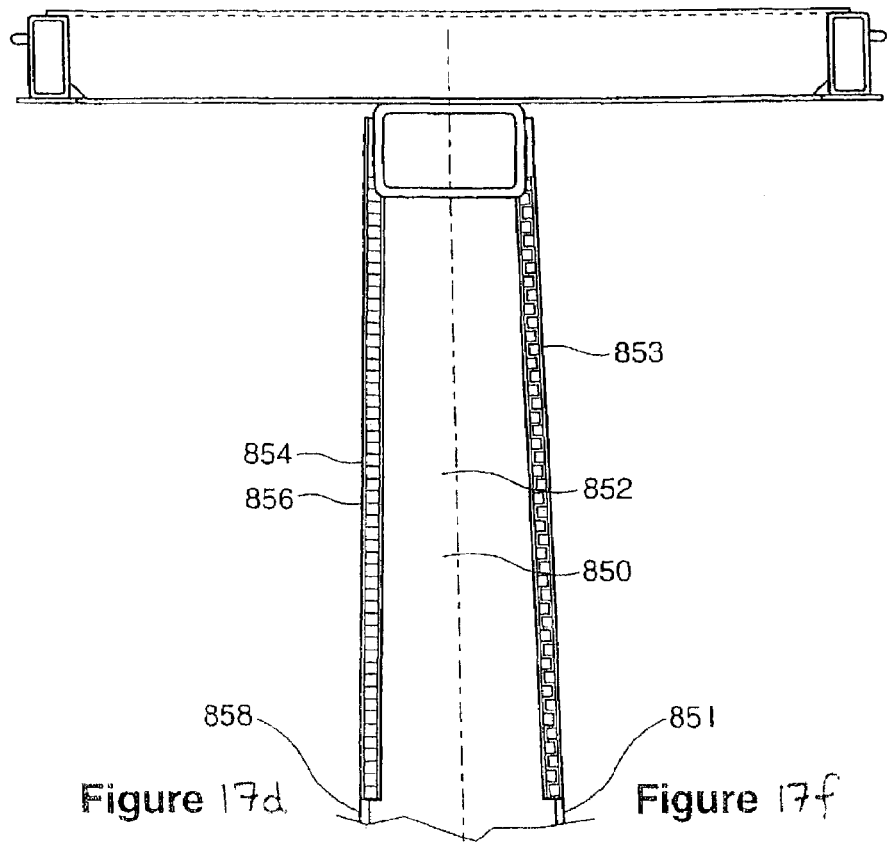
FIG. 17d shows an alternate detail to that of FIG. 17c.
FIG. 17f shows an alternate detail to that of FIG. 17d.

FIG. 17d is similar to FIG. 17c, but web 850 of post 852 has been trimmed back to permit outwardly facing external face 854 of hollow cell panel 856 to lie flush with flange 858 of post 852. Hollow cell panel 856 is similar in construction to hollow cell panel 844, having a pair of skins and a hollow core.

FIGS. 17e and 17f correspond to FIGS. 17c and 17d respectively, and illustrate the use of a corrugated core sandwich, either standing proud of the flange of the post, as illustrated by sandwich 849 in FIG. 17e, or flush with a trimmed down flange 851 as shown by sandwich 853 in FIG. 17f. The corrugated sandwiches have inner and outer metal skins, with a reverse folded, corrugated core maintaining the skins in a spaced apart, parallel planar relationship.

In each of the embodiments illustrated in FIGS. 17a, 17b, 17c, 17d, 17e and 17f the vertical extent of the skirt can be chosen according to the lading customarily carried by the car. As noted above, in general the skirt overlaps the nominal loading height, and extends a modest distance below the nominal loading height, whether 6 inches, 12 inches, 18 inches, 24 inches, 30 inches, or 36 inches. The skirt may also tend to overlap the maximum load limit height, and, further still, to be joined at a welded lap joint to the top chord, or top chord assembly.

Figure 18:
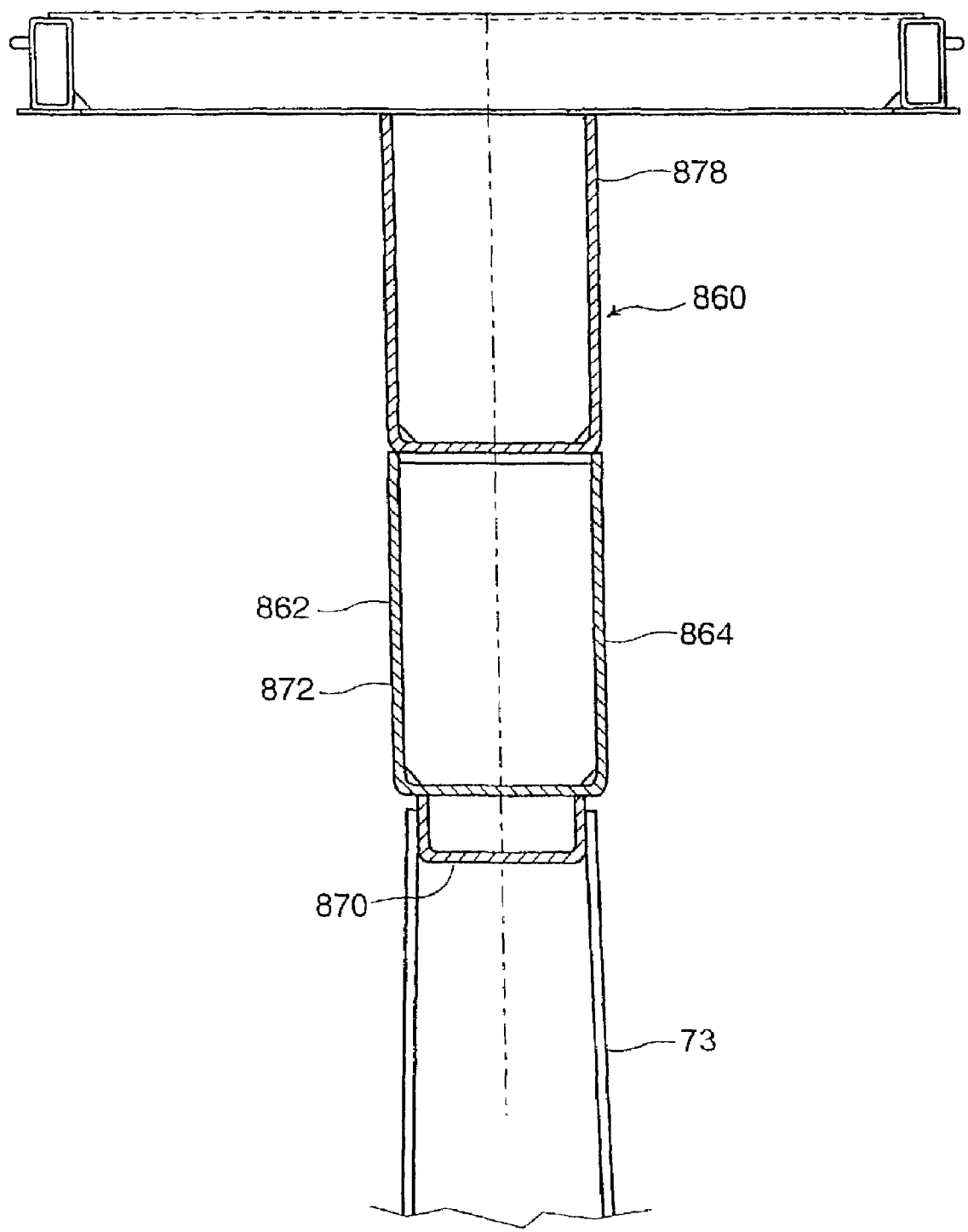

The embodiment of FIG. 18 shows a deep beam assembly 860 that is similar to deep beam assembly 780 of FIG. 16 but does not have slope continuity with the flanges of posts 73 and 74. Rather, the sides 862 and 864 of deep beam assembly 860 are parallel, and rise generally vertically. A channel 870 is welded along the back of pressing 872 to engage the notch formed in the upper end of post 73 (or 74, as may be). A further U-shaped pressing 878 is welded above pressing 872.

Figure 19:
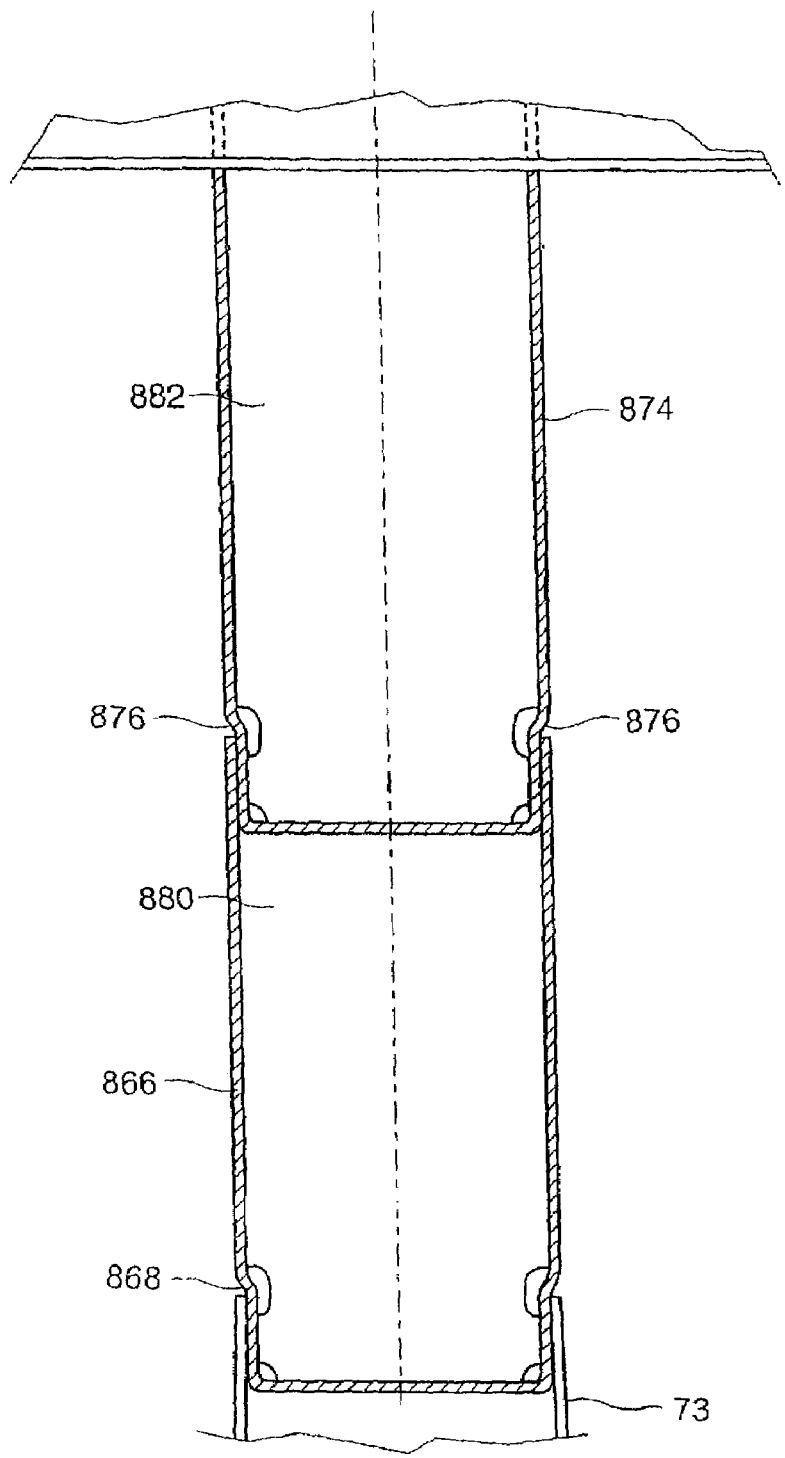

The embodiment of FIG. 19 is similar to the embodiment of FIG. 18, except insofar as it has a single formed section 866 with shoulders 868 in lieu of a C-channel 870 and section 862. Similarly, its upper formed section 874 also has shoulders 876, in contrast to upper section 878 of assembly 860. Gussets are indicated as 880 and 882.

Figure 20:
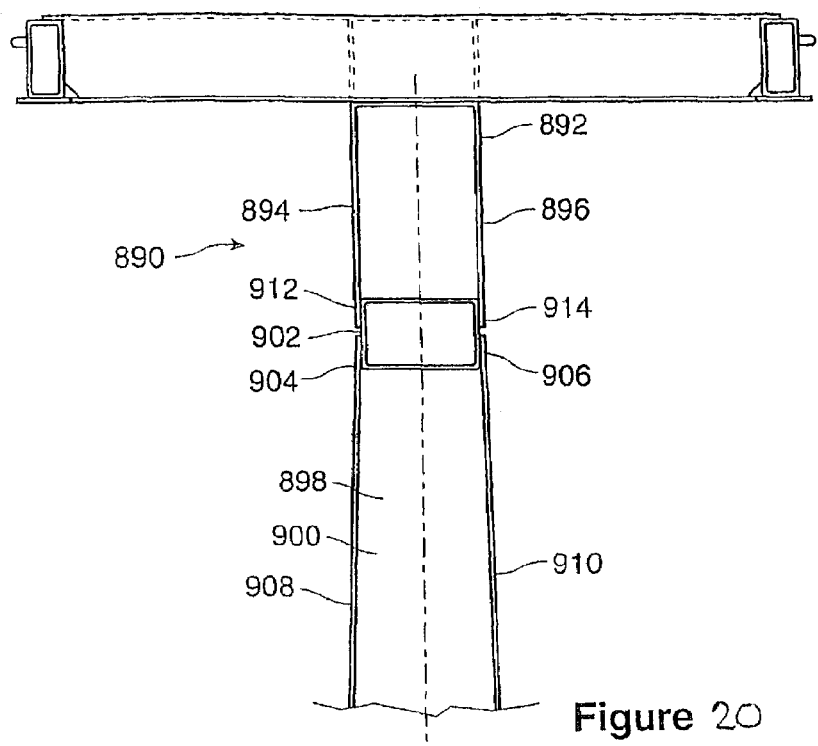
Figure 21:
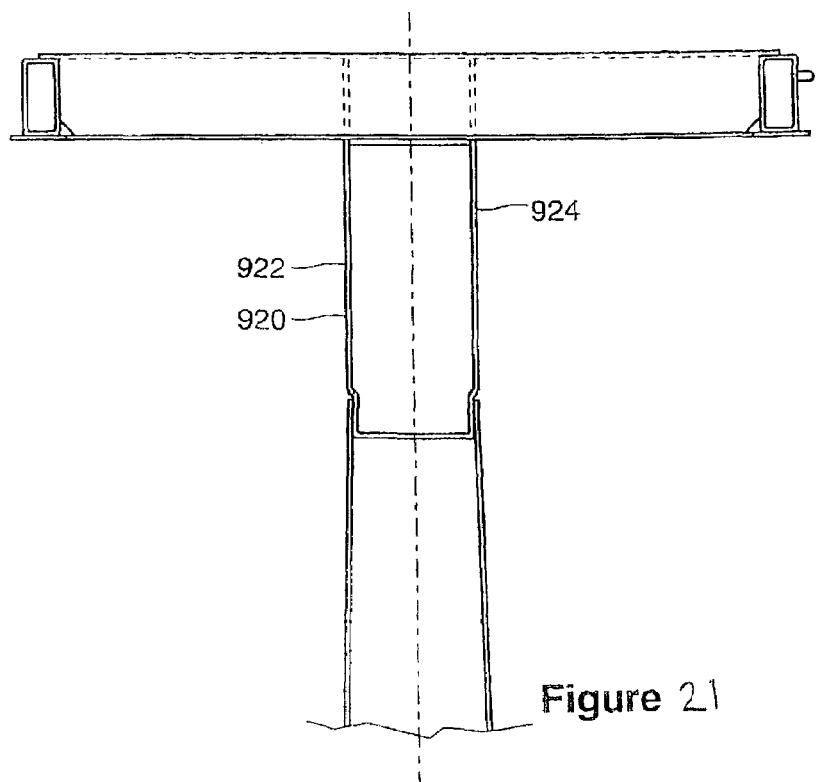

In the embodiment of FIG. 20 deep beam assembly 890 has an inverted U-shaped formed section 892 having parallel legs 894, 896. A notch has been cut in web 898 of post 900 such that a longitudinally extending rectangular steel tube 902 can seat between tabs 904 and 906 of flanges 908 and 910. The distal tips 912 and 914 of legs 894 and 896 are welded along the side faces of tube 902. In the embodiment of FIG. 21 a formed section 920 is used in place of rectangular steel tube 902. In the cases of both FIG. 20 and FIG. 21, the overall depth of the side skirts defined by legs 894, 896 or 922, 924, is roughly half that of the embodiments of FIGS. 9a, 10a, 11a, 12a, and 13a, being roughly 1 ft. This width overlaps both the load limit height and the maximum load height.

In the embodiment of FIG. 9a, legs 544 and 546 extend from a root at the join to top truss 64, to a level below the upper load limit. Legs 544 and 546 are roughly 24 inches long so that the bottom edge of legs 544 and 554 will extend down roughly half the height of the top bundle to act as a skirt against which a larger bearing area of the bundle can bear, as compared to the width of the flanges of the posts by themselves. The skirt has a mid level reinforcement between its upper and lower extremities, namely web stiffener 504 to discourage lateral deflection of the skirt, or bowing inward.

In alternative embodiments, the level of the bottom edge of the legs could be as little as one board (1 and ½ inches, kiln dried wood) below the top edge of the design bundle height, but is expected to be most commonly 12 inches, 24 inches (as in the preferred embodiment) or 30 inches deep when measured from the join to the top truss.

It is possible to manufacture a generally similar center beam car to fall within the loading profile defined by AAR plate 'F', or some other height. In that case, the desired load limit height is the height that is the largest integer multiple of 33 that is less than the clearance opening. The minimum height of the bottom edge of the leg, or skirt, is desirably 1 and ½ inches or more below the nominal load height, typically such that the overall height of the skirt is, nominally, an integer multiple of 6 that is at least 12 inches. Preferably, the skirt extends to a height that is at least half way down the top bundle of the nominal design load, and possibly to a height that is the full depth of the top bundle.

Although the main deck could be a continuous decking structure, this need not necessarily be so. The main deck, or lower beam structure could be in the form of an open truss, or grid work. Car 20, and the other rail road cars described herein, are preferably of all-steel construction. However, although the web work assembly of the center beam, and the top truss section is preferably a welded steel fabricated structure, it could be made of aluminum.

Various embodiments of the invention have now been described in detail. Since changes in and or additions to the above-described best mode may be made without departing from the nature, spirit or scope of the invention, the invention is not to be limited to those details, but only by the appended claims.

We claim:

1. A dropped deck center beam rail road car comprising:
   a lading support structure carried on rail road car trucks for rolling motion along rail road tracks, said lading support structure having upstanding bulkheads mounted at opposite ends thereof, a laterally extending deck structure, and a central beam assembly standing upwardly of said laterally extending deck structure;
   a coupler mounted at one of said ends of said lading support structure, said coupler having a coupler centerline height;
   said deck structure having a pair of end portions and a medial portion, said end portions being stepped upwardly relative to said medial portion;
   each of said end portions and said medial portion of said deck structure having lading bearing interfaces upon which lading can be placed;
   said central beam assembly including a webwork assembly extending upwardly of said medial portion of said deck structure to a longitudinally extending top chord member; and
   at least a portion of said web work assembly extending to a height lower than said coupler centerline height.

2. The dropped deck center beam rail road car of claim 1 wherein said web work assembly includes a laterally outwardly facing continuous load contacting surface that extends over a range of height greater than 140 inches from bottom to top.

3. The dropped deck center beam rail road car of claim 2 wherein a coupler is mounted to at least one of said ends of said lading support structure, said coupler has a coupler centerline height, and at least a portion of said web work assembly extends lower than said coupler centerline height.

4. The dropped deck center beam railroad car of claim 1 wherein said webwork assembly includes an array of posts extending between said deck structure and said top chord, and at least a first portion of said array of posts extending upwardly of said medial portion of said deck structure includes posts having a lower end extending below said coupler centerline height.

5. The dropped deck center beam car of claim 1 wherein said web work assembly extends upwardly from a centersill, and a portion of said center sill has a top flange lying at a height lower than said coupler centerline height.

6. A dropped deck center beam rail road car, comprising:
   a center sill carried by rail car trucks for rolling motion along rail road tracks;
   a deck structure upon which lading can be side loaded, said deck structure extending laterally outward from said center sill and having a depressed medial portion;
   upstanding bulkheads mounted at opposite end of said deck structure;
   a central beam assembly standing upwardly from said center sill and running longitudinally between said bulkheads; and
   said center sill having end portions and a downwardly stepped medial portion, said end portions having uppermost flange members, and said downwardly stepped medial portion having an uppermost flange member; and
   said uppermost flange member of said medial portion lying at a lower height than said uppermost flange member of one of said end portions.

7. The center beam rail road car of claim 6 wherein a coupler is mounted at one end of said rail road car, said coupler having a coupler centerline height; and said uppermost flange member of said medial portion lying at a lower height than said coupler centerline height.

8. The center beam rail road car of claim 7 wherein said medial portion has a cross-sectional area, said cross sectional area having a centroid, and said centroid lies between 12 and 18 inches below said coupler centerline.

9. The center beam rail road car of claim 6 wherein said depressed medial portion of said deck structure has a load bearing interface upon which to place lading, and said uppermost flange member of said medial portion of said center sill lies in a location chosen from the set of locations consisting of (a) flush with said load bearing interface of said medial portion of said deck structure; and (b) shy of said load bearing interface of said medial portion of said deck structure.

10. The center beam rail road car of claim 6 wherein said downwardly stepped medial portion of said center sill is located between two end portions of said center sill, said end portions being upwardly stepped relative to said medial portion of said center sill, a longitudinally extending reinforcement member is spaced upwardly from said medial portion of said center sill, said longitudinally extending reinforcement member being connected to carry longitudinal loads between said end portions of said center sill.

11. The center beam rail road car of claim 10 wherein said end portions of said center sill include respective center sill top flange portions, and said longitudinally extending reinforcement member has a flange portion mounted at a height to pass loads between said top flange portions of said end portions of said center sill.

12. The center beam rail road car of claim 10 wherein said rail road car has a coupler, and a coupler centerline height, said longitudinally extending reinforcement member has a cross-sectional area, said cross-sectional area has a centroid, and said centroid of said cross sectional area lies at a level that is at least as high as said centerline height of said coupler.

13. The center beam rail road car of claim 12 wherein said centroid lies 12 to 18 inches above said coupler centerline height.

14. The center beam rail road car of claim 13 wherein said medial portion of said center sill has a cross-sectional area, and said cross-sectional area of said medial portion of said center sill lies at a height between 12 and 18 inches lower than said coupler centerline height.

15. The center beam rail road car of claim 14 wherein a first distance is defined between said centroid height of said reinforcement member and said coupler centerline height, a second distance is defined between said coupler centerline height and said height of said centroid of said medial portion of said center sill, and a ratio R is defined as (a) the product of said first distance multiplied by said cross sectional area of said reinforcement member, divided by (b) the product of said second distance multiplied by said cross sectional area of said medial portion of said center sill, and said ratio R lies in the range of 0.70 to 1.40.

16. The center beam rail road car of claim 14 wherein a first distance is defined between said centroid height of said reinforcement member and said coupler centerline height, a second distance is defined between said coupler centerline height and said height of said centroid of said medial portion of said center sill, and a ratio R is defined as (a) said first distance divided by (b) said second distance, and said ratio R lies in the range of 0.5 to 2.0.

17. A dropped deck center beam rail road car, comprising:
a lading support structure carried on rail road car trucks for rolling motion along rail road tracks, said lading support structure having upstanding bulkheads mounted at opposite ends thereof, a laterally extending deck structure, and a central beam assembly standing upwardly of said laterally extending deck structure;
a coupler mounted at one of said ends of said lading support structure, said coupler having a coupler centerline height;
said deck structure having a pair of end portions and a medial portion, said end portions being stepped upwardly relative to said medial portion;
said central beam assembly including a webwork assembly extending upwardly of said medial portion of said deck structure to a longitudinally extending top chord; and
said web work assembly presenting a laterally outwardly facing lading contact surface against which lading can be placed;
said laterally outwardly facing lading contact surface being continuous from said medial portion of said deck structure to said top chord; and
said web work assembly includes an array of posts extending between said deck structure and said top chord, and at least a first portion of said array of posts extending upwardly of said medial portion of said deck structure includes posts having a lower end extending below said coupler centerline height.

18. The dropped deck center beam rail road car of claim 17 wherein said outwardly facing lading contact surface of said web work assembly has slope continuity with said top chord.

19. The dropped deck center beam rail road car of claim 17 wherein said top chord has side faces against which lading can be secured.

20. The dropped deck center beam rail road car of claim 17 wherein said top chord is chosen from the set of top chords consisting of (a) a top chord mounted at a partial height elevation relative to said end bulkheads, wherein lading can be placed to either side of said top chord, and also carried thereabove; (b) a top chord mounted at a full height elevation relative to said bulkheads, and lading can be placed to either side thereof to bear laterally thereagainst, said top chord being unencumbered by laterally extending top truss members; and (c) a top chord member surmounted by a top truss mounted at a full height elevation relative to said bulkheads.

21. A dropped deck center beam rail road car, comprising:
a lading support structure carried on rail road car trucks for rolling motion along rail road tracks, said lading support structure having upstanding bulkheads mounted at opposite ends thereof, a laterally extending deck structure, and a central beam assembly standing upwardly of said laterally extending deck structure;
a coupler mounted at one of said ends of said lading support structure, said coupler having a coupler centerline height;
said deck structure having a pair of end portions and a medial portion, said end portions being stepped upwardly relative to said medial portion;
said central beam assembly including a webwork assembly extending upwardly of said medial portion of said deck structure to a longitudinally extending top chord; and
said web work assembly presenting a laterally outwardly facing lading contact surface against which lading can be placed;
said laterally outwardly facing lading contact surface being continuous from said medial portion of said deck structure to said top chord; and
said web work assembly extends upwardly from a centersill, and a portion of said center sill has a top flange lying at a height lower than said coupler centerline height.

* * * * *